United States Patent [19]

Vaidyanathan

[11] Patent Number: 5,481,620
[45] Date of Patent: Jan. 2, 1996

[54] ADAPTIVE VISION SYSTEM

[75] Inventor: Akhileswar G. Vaidyanathan, Hockessin, Del.

[73] Assignee: E. I. Du Pont de Nemours and Company, Wilmington, Del.

[21] Appl. No.: 767,339

[22] Filed: Sep. 27, 1991

[51] Int. Cl.$^6$ .............................. G06K 9/30; G06K 9/20
[52] U.S. Cl. .......................................... 382/169; 382/291
[58] Field of Search .................................. 382/6, 18, 48, 382/50, 51; 364/555; 377/10, 11

[56] References Cited

U.S. PATENT DOCUMENTS

| | | | |
|---|---|---|---|
| 3,736,432 | 5/1973 | Sweet | 250/222 PC |
| 3,811,036 | 5/1974 | Perry | 235/92 PC |
| 3,873,974 | 3/1975 | Bouton et al. | 382/48 |
| 3,999,047 | 12/1976 | Green | 382/51 |
| 4,183,013 | 1/1980 | Agrawala et al. | 377/10 |
| 4,453,266 | 6/1984 | Bacus | 382/6 |
| 4,618,989 | 10/1986 | Tsukume et al. | 382/25 |
| 4,637,053 | 1/1987 | Schalkowsky | 382/6 |
| 4,747,153 | 5/1988 | Kuono et al. | 382/25 |
| 4,809,349 | 2/1989 | Herby et al. | 382/50 |
| 4,959,869 | 9/1990 | Hongo | 382/51 |
| 5,046,118 | 9/1991 | Ajewole et al. | 382/51 |
| 5,083,313 | 1/1992 | Reinsch | 382/8 |

FOREIGN PATENT DOCUMENTS

| | | |
|---|---|---|
| 2602074 | 7/1986 | France . |
| 62-60069 | 12/1987 | Japan . |

OTHER PUBLICATIONS

1985 IEEE Workshop on Languages For Automation. 29 Jun. 1985, Palma De Mallorca, Spain pp. 265–269, S. Miyamoto et al. "Enchancement of Laser Radar Images By A Class of Piecwise Linear Transformations of Gray Levels Based on Entropy Criteria".

D. Marr, "Early Processing of Visual Information", Image Understanding 1984, eds. S. Ullman and W. Richards, Ablex Publishing Company, 1984.

C. E. Shannon, "A Mathematical Theory of Communication", Bell Syst. Tech. J., vol. 27, Jul. 1948, pp. 379–423.

T. Pun, "Entropic Tresholding, A New Approach", Comp. Graphics and Image Proc., vol. 16, 1981, pp. 210–239.

J. N. Kapur, P. K. Sahoo and A. K. C. Wong, "A New Method for Grey–Level Picture Thresholding Using the Entropy of the Histogram", Comp. Graphics and Image Proc. 29, 1985, pp. 273–285.

S. K. Pal and N. R. Pal, "Entropic Thresholding", Signal Processing, vol. 16, 1989, pp. 97–108.

R. M. Haralick, K. Shanmugam and I. Dinstein, "Textural Features for Image Classification", IEEE Transactions on Systems, Man, and Cybernetics, vol. SMC–3, No. 6, 1973, pp. 610–621.

S. Wang and R. M. Haralick, "Automatic Multithreshold Selection", Computer Vision Graphics and Image Processing, vol. 25, 1984, pp. 46–67.

M. A. Fernandes, P. J. H. Jackman, S. A. Clark and S. R. Gunard, "Detection and Quantification of Microorganisms in a Heterogeneous Foodstuff by Image Analysis", Cabios, vol. 4, No. 2, 1988, pp. 291–295.

(List continued on next page.)

*Primary Examiner*—Yon J. Couso
*Assistant Examiner*—David Fox

[57] ABSTRACT

The present invention relates to image analysis methods and systems for identifying objects in a background by generating a description, which may be either a histogram or co-occurrence matrix, of the gray level space of the image by using an entropic kernel to recursively analyze the gray level space for candidate objects and validating the presence of valid objects by comparing the candidate object attribute values to a defined set of valid object attribute values contained in a driver. The present invention includes recursive, iterative and parallel processing methods. The methods may be used in a wide variety of industrial inspection techniques, including colony counting and the identification of discrete features in carpets and of pigment elements embedded in a polymer.

64 Claims, 56 Drawing Sheets

Microfiche Appendix Included
(106 Microfiche, 2 Pages)

OTHER PUBLICATIONS

Domino Image Analysis System, Perceptive Instruments (Essex, England).

Image 40-10 Analyzer, Analytical Measuring Systems (Cambridge, England).

Bio-Foss Colony Counting System, Foss Electric (York, England).

Artek 810 Image Analyzer, Dynatech Laboratories, Inc. (Chantilly, Va.).

Optimas Image Analyzer, Bio Scan (Edmonds, Wash.).

Video Densitometer II, Biomed Instruments, Inc. (Fullerton, Calif.).

Image-Pro Plus, Media Cybernetics (Silver Spring, Md.).

G. Johannsen and J. Bille, "A Threshold Selection Method Using Information Measures", Proc. 6th Int. Conf. On Pattern Recognition, 1982.

P. K. Sahoo, S. Soltani, A. K. C. Wong, "A Survey of Thresholding Techniques", Computer Vision, Graphics and Image Processing, vol. 41, 1988, pp. 233-260.

A. S. Abutaleb, "Automatic Thresholding of Grey-Level Pictures Using Two Dimensional Entropy", Computer Vision, Graphics, and Image Processing, vol. 47, 1989, pp. 22-32.

S. U. Lee and S. Y. Chung, "A Comparative Performance Study of Several Global Thresholding Techniques for Segmentation", Computer Vision, Graphics, and Image Processing, vol. 52, 1990, pp. 171-190.

A. K. C. Wong and P. K. Sahoo, "A Grey Level Threshold Selection Method Based on Maximum Entropy Principle", IEEE Transactions on System, Man and Cybernetics, vol. 19, 1989, pp. 866-871M.

Mehmet Celenk, "A Color Clustering Technique for Image Segmentation", Computer Vision, Graphics and Image Processing, vol. 52, 1990, pp. 145-170.

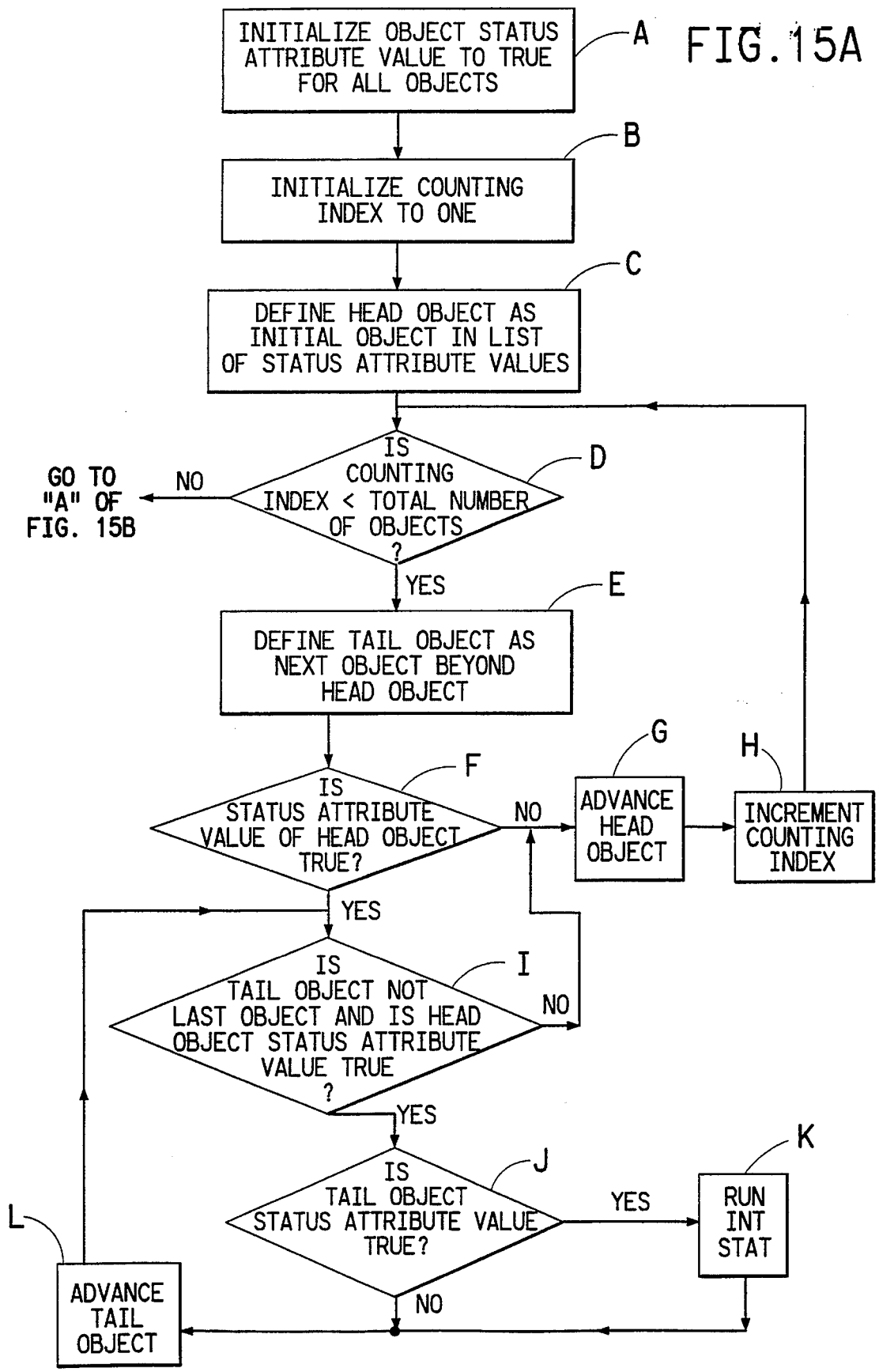

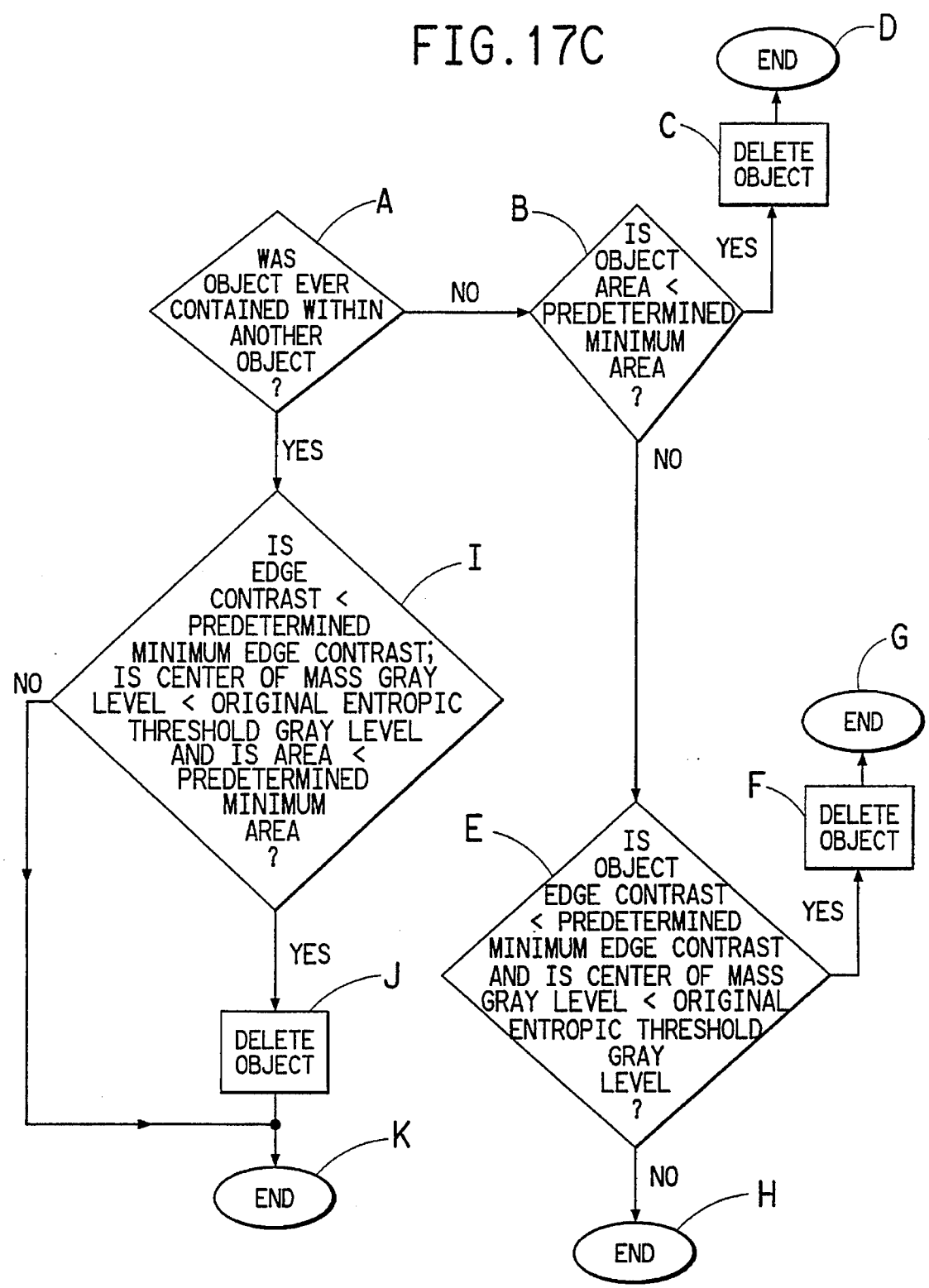

(106 Microfiche, 2 Pages)

ADAPTIVE VISION SYSTEM

MICROFICHE APPENDIX

Attached hereto are microfiche containing 104 frames of modules which can be employed in the described embodiments and in other embodiments. These microfiche are included as a portion of the disclosure of this patent document.

COPYRIGHT NOTICE

A portion of the disclosure of this patent document contains material which is subject to copyright protection. The copyright owner has no objection to the reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to image analysis methods and systems for automatically identifying objects in a background by generating a description, which may be either a histogram or a co-occurrence matrix, of the gray level space of an image of the object and the background.

2. Description of the Related Art

Analyzing a representation of gray level space of an image has previously been proposed by D. Marr in an article entitled "Early Processing of Visual Information", Image Understanding, eds. S. Ullman and W. Richards, Ablex Publishing Company, 1984. The concept of entropy in information theory for signal processing was first proposed by Shannon in an article entitled "A Mathematical Theory of Communication" Bell System Technology J., Vol 27, July 1948, pp. 379–423. Shannon showed that the entropy function:

$$H(p_1, p_2, \ldots, p_n) = -\lambda \sum_{k=1}^{n} p_k \ln p_k \quad (1)$$

uniquely satisfies the following three properties:

(1) $H(p_1, p_2, \ldots p_n)$ is a maximum for $P_k=1/n$ for $k=1, \ldots n$;

(2) $H(AB)=H(A)+H_A(B)$, where A and B are two finite partitions and $H_A(B)$ is the conditional entropy of partition B given partition A;

(3) $H(p_1, p_2, \ldots p_n, 0) = H(p_1, p_2, \ldots p_n)$

In addition, $H_{max}(1/n, \ldots 1/n) = \ln n$.

The idea of using entropy to analyze a gray level histogram of an image was originally proposed by Pun in an article entitled "Entropic Thresholding, A New Approach", Comp. Graphics and Image Proc., Vol. 16, 1981, pp. 210–239. The entropy analysis of Pun was further refined by Kapur et al. in an article entitled "A New Method for Grey-Level Picture Thresholding Using the Entropy of the Histogram", Comp. Graphics and Image. Proc. 29, 1985, pp. 273–285. As shown by Pun and refined by Kapur, the concept of entropy can be extended to two dimensions if the gray level histogram of the image is used to define a probability distribution:

$$P_s = f_s/N \text{ for } s=1, \ldots, N_{gray} \quad (2)$$

where $f_s$=frequency of gray level s

N=# pixels in image $N_{gray}$=# gray levels

It follows that the entropy function of a histogram describing an image with a uniform gray level distribution is at a maximum. The more peaks in the distribution, the lower the entropy.

Pal and Pal, in an article entitled "Entropic Thresholding" Signal Processing, Vol 16, 1989, pp 97–108, recognized that a gray level histogram does not contain information regarding the spatial relationship between the gray levels and suggested the use of a two-dimensional data structure as an alternative to the gray level histogram. The structure suggested is a Haralick co-occurrence matrix as described by Haralick et al. in "Textural Features for Image Classification" IEEE Transactions on Systems, Man, and Cybernetics, Vol. SMC-3, No. 6, 1973, pp. 610–621.

The techniques described above for analyzing the gray level space of an image compute a single entropic threshold and do not contemplate a system for recursively analyzing the gray level space of the image by automatically computing multiple entropic thresholds. Moreover, the above-discussed articles are not concerned with object validation and do not propose a driver for object comparison and validation.

In an article entitled "Automatic Multi-threshold Selection" Computer Vision Graphics and Image Processing Vol. 25, 1984, pp. 46–67, Wang and Haralick describe an attempt at multi-threshold selection using gray level distributions in local neighborhoods of each pixel in an image. This technique does not employ image entropy. Rather, it adaptively computes the local background of an object as an image is scanned by a priori selection of a gray level neighborhood.

Automated bacterial colony counting systems are commercially available for determining the number of visible bacteria in or on a culture medium such as a Petri dish. Examples include a Domino Image Analysis System made by Perceptive Instruments (Essex, England), a Seescan Imaging Plate Reader made by Seescan Imaging Limited (Cambridge, England), a Protos Colony Counter and Image 40–10 Analyzer, made by Analytical Measuring Systems (Cambridge, England), Bio-Foss Colony Counting System made by Foss Electric (York, England), an Artek 810 Image Analyzer made by Dynatech Laboratories, Inc. (Chantilly, Va.), an Optimas Image Analyzer made by Bio Scan (Edmonds, Wash.), a Video Densitometer II made by Biomed Instruments, Inc. (Fullerton, Calif.), and an Image-Pro Plus made by Media Cybernetics (Silver Spring, Md.). All of these instruments require the input of a single predetermined threshold per each image. None are capable of using image entropy to recursively compute multiple thresholds for object identification.

A semi-automated system for detection and quantification of microbial growth in sections of food has been described by Fernandes et al. in "Detection and Quantification of Microorganisms in Heterogeneous Foodstuffs by Image Analysis" Cabios Vol 4, No 2, 1988, pp 291– 295. The system described in this article relies on manually examining the gray level histogram to identify a single threshold.

A number of patents have issued on colony counting systems, such as U.S. Pat. No. 4,637,053 to Schalkowsky, U.S. Pat. No. 3,811,036 to Perry, U.S. Pat. No. 3,736,432, and French Patent Application No. 2,602,074 to Segui et al. None of these patents discloses the concept of using image entropy to adaptively segment an image for colony enumeration and identification. "Adaptively segmenting" means thresholding the image with more than one threshold gray level.

Accordingly, it is an object of the present invention to provide methods and systems which use an entropically selected threshold gray level to search an image for automatic object identification.

It is also an object of the present invention to provide methods and systems which use entropically selected threshold gray levels to recursively search an image for automatic object identification.

It is further an object of the present invention to provide a method and a system for automatic object identification which can be used in colony counting, colony screening, identification of discrete features in carpets and identification of pigment elements embedded in a polymer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, there is provided a method of identifying at least one valid object having at least one predetermined attribute value in a background. The method comprises the steps of generating an image of the object and the background and generating a gray level histogram of the image, where the gray level histogram has an entropy function. A threshold gray level is entropically selected such that the entropy function of the histogram is maximized. The image is searched for at least one candidate object, where the candidate object has at least one candidate object attribute value. The candidate object having the valid object predetermined attribute value is validated to identify the valid object.

In the preferred embodiment of the present invention, the gray level histogram is subdivided into an upper histogram and a lower histogram using the entropic threshold gray level used to maximize the entropy function of the histogram as an upper delimiter and a lower delimiter. The selecting, searching and validating steps are recursively repeated for each of the upper and lower histograms, thereby recursively partitioning the gray level histogram to identify the valid objects until a predetermined minimum number of new valid objects is identified.

The method of the present invention is best suited for automatic identification of fairly simple objects in a complex environment. In such situations, interior regions of the objects close to the boundaries (i.e., edge regions) are usually fairly uniform in gray level. The recursive nature of the method of the present invention makes it an adaptive technique, well-suited for searching widely varying backgrounds. For cases of identification of a complex object in a relatively simple environment, it may be necessary to recursively partition a co-occurrence matrix.

The method of the present invention can be applied to on-line industrial inspection techniques to enhance quality control in manufacturing processes where the product can be described fairly simply, but the environment of the product is unknown.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred embodiments given below, serve to explain the principles of the invention.

FIGS. 15A–15B comprise a flow chart illustrating the steps of a module FINAL CHK which is used to perform a final check to resolve redundancies in inhomogeneous and homogeneous objects.

FIG. 17C is a flow chart illustrating the steps of the part of CALCON as shown in FIG. 17A which applies a medium filter.

DESCRIPTION OF THE PREFERRED EMBODIMENTS

Reference will now be made in detail to the present preferred embodiments of the invention as illustrated in the accompanying drawings.

Figure 1:
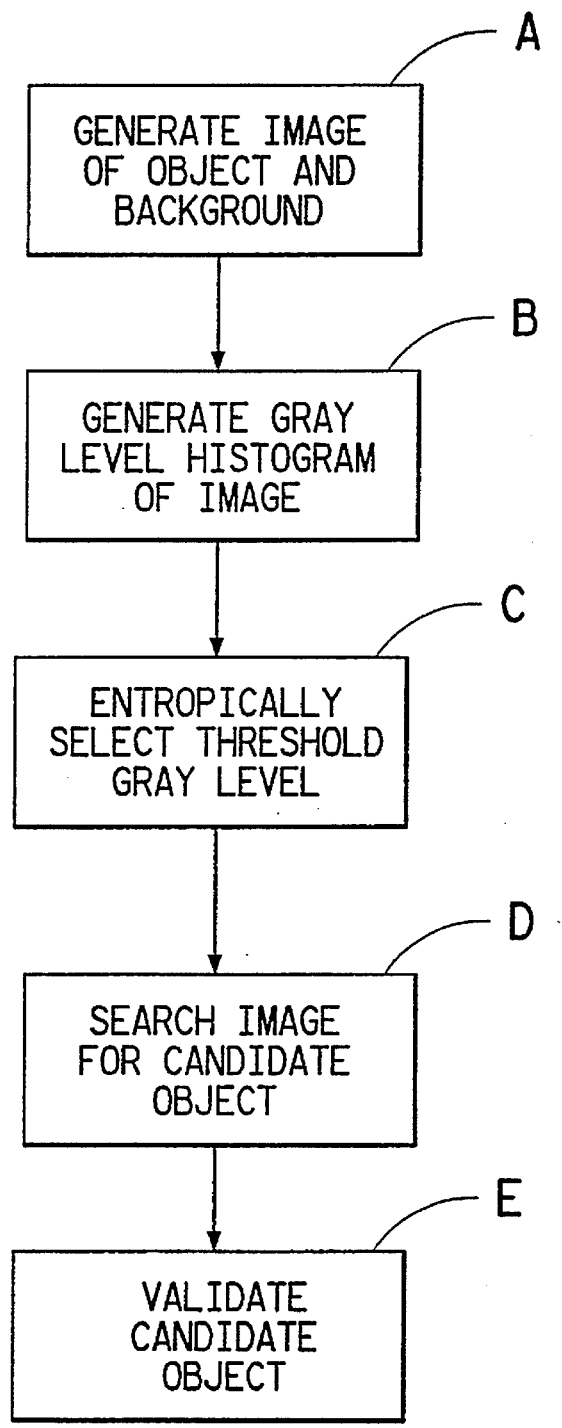
FIG. 1 is a block diagram showing the steps of the overall method according to a first embodiment of the present invention.

In accordance with a first embodiment of the present invention, there is provided a method of identifying at least one valid object in a background. FIG. 1 is a block diagram showing the overall method of the present invention. The method of the first embodiment is also referred to as recursive entropic thresholding in natural analysis.

The method of the present invention comprises the step of generating an image of the object and the background. An image is generated as shown in block A of FIG. 1. Also, the hardware used to implement the method of the present invention must first be initialized when the image is generated. The image of the object and the background may be generated by a camera. Although a CCD camera is generally used with the present invention, any type of camera may be used without departing from the general principles of the present invention. The image is then digitized and stored by a frame grabber or a video digitizer.

Figure 2:
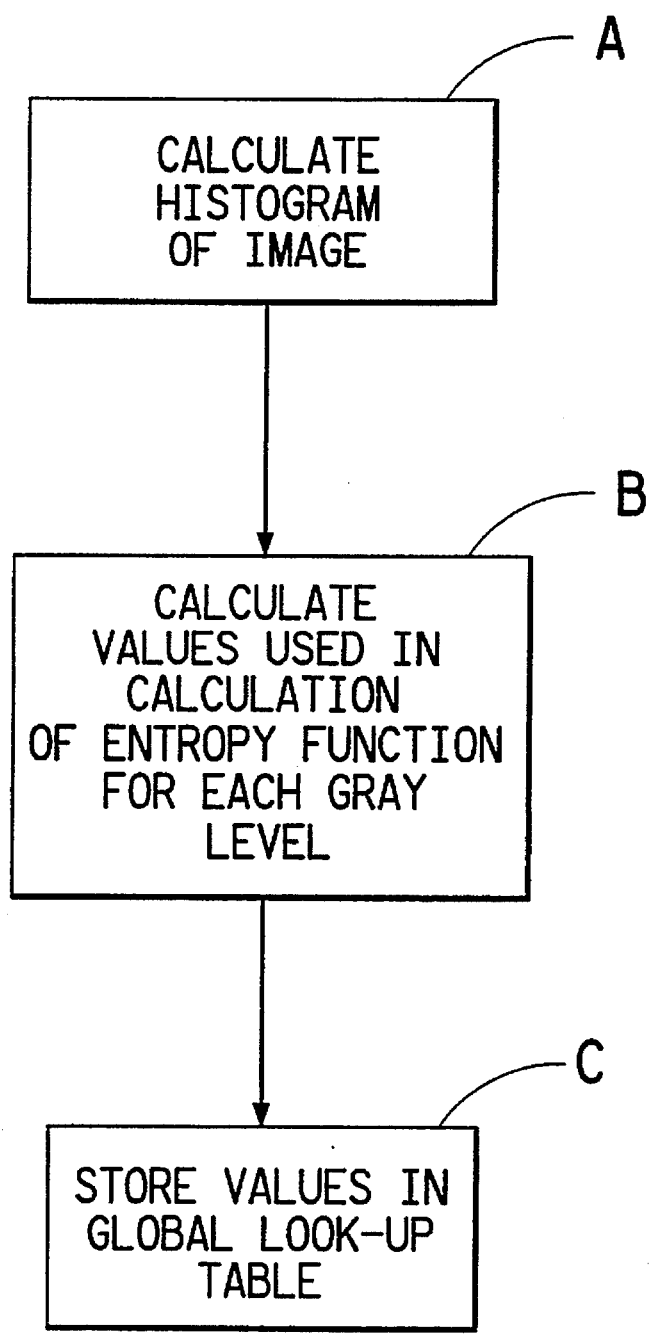
FIG. 2 is a flow chart illustrating the steps of a module HISTOGRAM which is used to generate a gray level histogram of an image.

The method of the present invention also comprises the step of generating a gray level histogram of the image, where the gray level histogram has an entropy function. This step is shown in block B of FIG. 1. A module, HISTOGRAM, is used to generate the gray level histogram of the region of interest of the image. The steps for generating the gray level histogram are shown in the flow of FIG. 2. As shown in block A of FIG. 2, HISTOGRAM first calculates a histogram of the region of interest of the image. It then calculates the values to be used subsequently in the calculation of the entropy function, Hs, for each gray level, s, as shown in block B of FIG. 2. The results of this calculation are stored in a global look-up table as shown in block C. This ensures that for subsequent calculations of the entropic threshold gray level, only a simple look-up operation is required.

Figure 3:
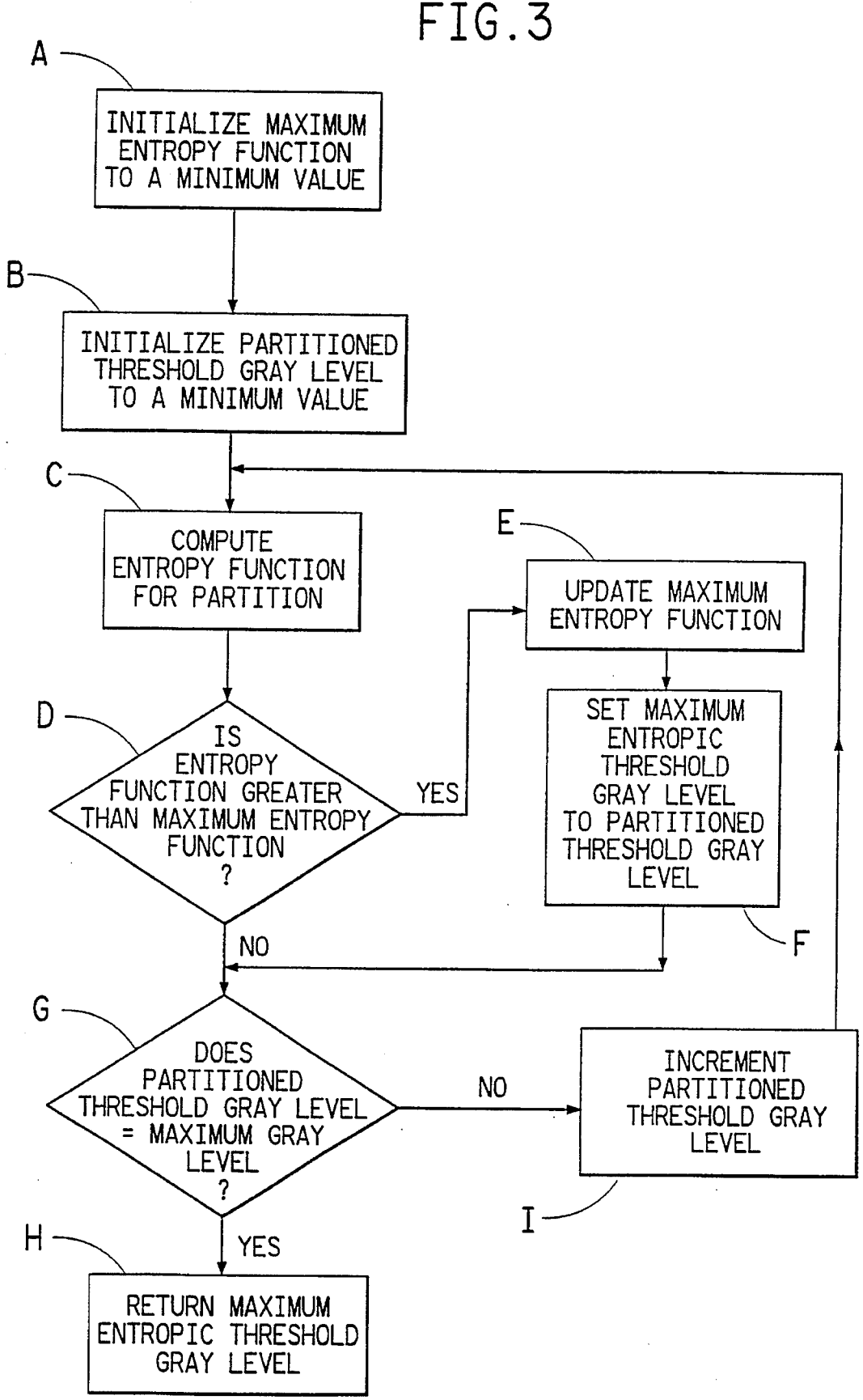
FIG. 3 is a flow chart illustrating the steps of a module ENTROPY which is used to entropically select a threshold gray level such that the entropy function of the histogram is maximized.

The method of the present invention also includes the step of entropically selecting a threshold gray level such that the entropy function of the histogram is maximized. This step is performed by the ENTROPY module as shown in FIG. 3. As shown in block A of FIG. 3, the first step in maximizing the entropy function of the histogram is to initialize the maximum entropy function to a minimum value.

Figure 4:
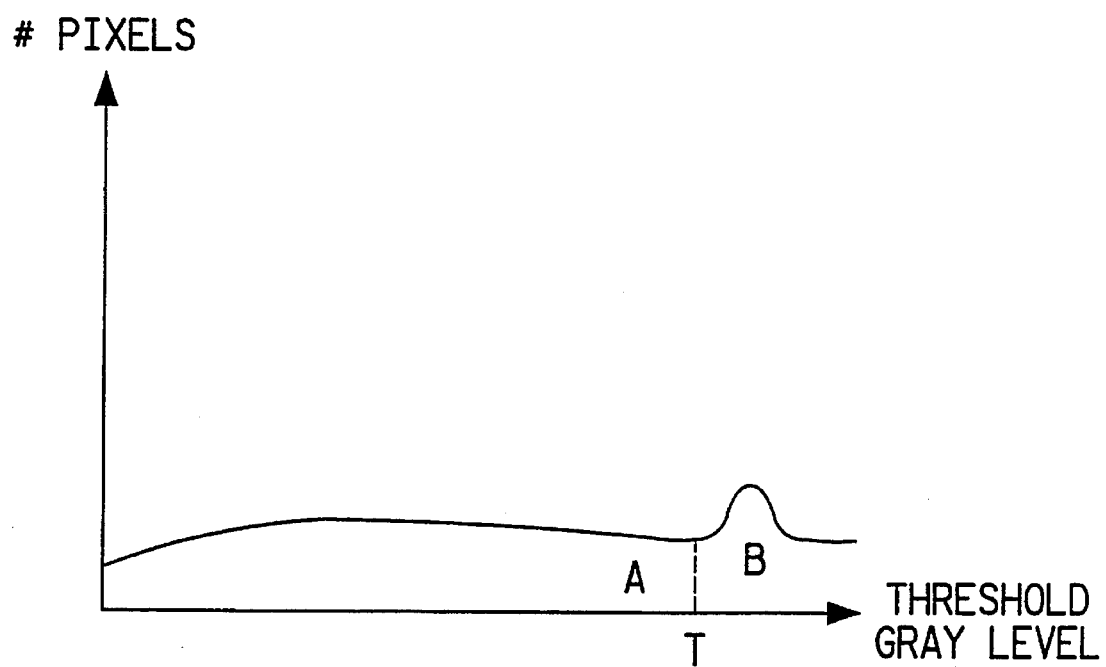
FIG. 4 is a gray level histogram of an image of a single, simple object in a varying background.

The step of entropically selecting a threshold gray level includes the sub-step of sequentially partitioning the gray level histogram at each gray level into a first partition and a second partition. To illustrate the simple case where a single, simple object in a varying background is identified, a gray level histogram of an image is shown in FIG. 4. The first and second partitions are shown in the histogram of FIG. 4, where the gray levels of the background are represented by a first partition A, and the gray levels of the valid object are represented by a second partition B. In the ENTROPY module the partitioned threshold gray level is initialized to a minimum value as shown in block B of FIG. 3.

The step of entropically selecting a threshold gray level also includes the sub-step of computing the entropy function for each partition, where the total entropy function of the histogram is defined as the sum of the entropy function $H_s(A)$ of first partition, A, and the entropy function $H_s(B)$ of second partition. This step is shown in block C of FIG. 3 and can be mathematically expressed as follows:

For a given threshold gray level, $s$,:

$$H_s(A) = -\sum_{i=1}^{s} \frac{p_i}{P_s} \ln\left(\frac{p_i}{P_s}\right) \quad (3)$$

$$\text{with } p_i = \frac{f_i}{N}, P_s = \frac{1}{N} \sum_{i=1}^{s} f_i \quad (4)$$

Thus, $$\frac{p_i}{P_s} = \frac{f_i}{\sum_{i=1}^{s} f_i} = \frac{f_i}{N_s} \text{ with } N_s = \sum_{i=1}^{s} f_i \quad (5)$$

So, $$\begin{aligned} H_s(A) &= -\sum_{i=1}^{s} \frac{f_i}{N_s} \ln\left(\frac{f_i}{N_s}\right) \\ &= \frac{-1}{N_s} \sum_{i=1}^{s} f_i \ln f_i + \ln N_s \end{aligned} \quad (6)$$

Similarly, $$H_s(B) = \frac{-1}{N_{s'}} \sum_{i=s+1}^{N_{gray}} f_i \ln f_i + \ln N_{s'} \quad (7)$$

where $$N_{s'} = N - N_s$$

and $$H_s(A) + H_s(B) = \quad (8)$$

$$\ln N_s + \ln N_{s'} - \frac{1}{N_s} \sum_{i=1}^{s} f_i \ln f_i - \frac{1}{N_{s'}} \sum_{i=s+1}^{N_{gray}} f_i \ln f_i$$

The sum $H_s(A)+H_s(B)$ represents the total entropy function of the gray level histogram of the image. The maximum entropic threshold gray level is the value of s which maximizes the total entropy function.

Decision diamond D of FIG. 3 asks whether the entropy function of the histogram is greater than the maximum entropy function as initialized in block A. If it is, then the maximum entropy function is updated using the partitioned threshold gray level as shown in block E of FIG. 3. The maximum entropic threshold gray level is then set to the partitioned threshold gray level as shown in block F. After the maximum entropy threshold gray level has been set, or if the entropic function of the histogram is not greater than the maximum entropy function, then decision diamond G of the ENTROPY module as illustrated in FIG. 3 asks whether the partitioned threshold gray level equals the maximum threshold gray level. If so, the maximum entropic threshold gray level is returned as shown in block H of FIG. 3. If not, then the partitioned threshold gray level is incremented as illustrated in block I of FIG. 3, and the incremented partitioned threshold gray level is returned to block C, where the entropy function of the incremented, partitioned threshold gray level is computed. The loop through C–G is repeated until the partitioned threshold gray level equals the maximum threshold gray level, at which point the maximum entropic threshold gray level is returned as shown in block H.

According to the present invention, in $H_s(A)$ and $H_s(B)$, the probability distributions are renormalized to include only the gray levels within each of the partitions. With this renormalization, the maximum entropy function occurs right at the edge of the object peak in the gray level histogram as shown at T in FIG. 4. Thus, a new threshold gray level is selected such that the entropy function of the histogram is maximized. With this maximum choice of threshold for the simple case as illustrated in FIG. 4, the renormalized distribution of the background becomes the least peaky and the most uniform. The total entropy function of the histogram is dominated by the entropy function of the background, since the number of gray levels in the background partition is much larger than the number of gray levels in the object partition.

Figure 5:
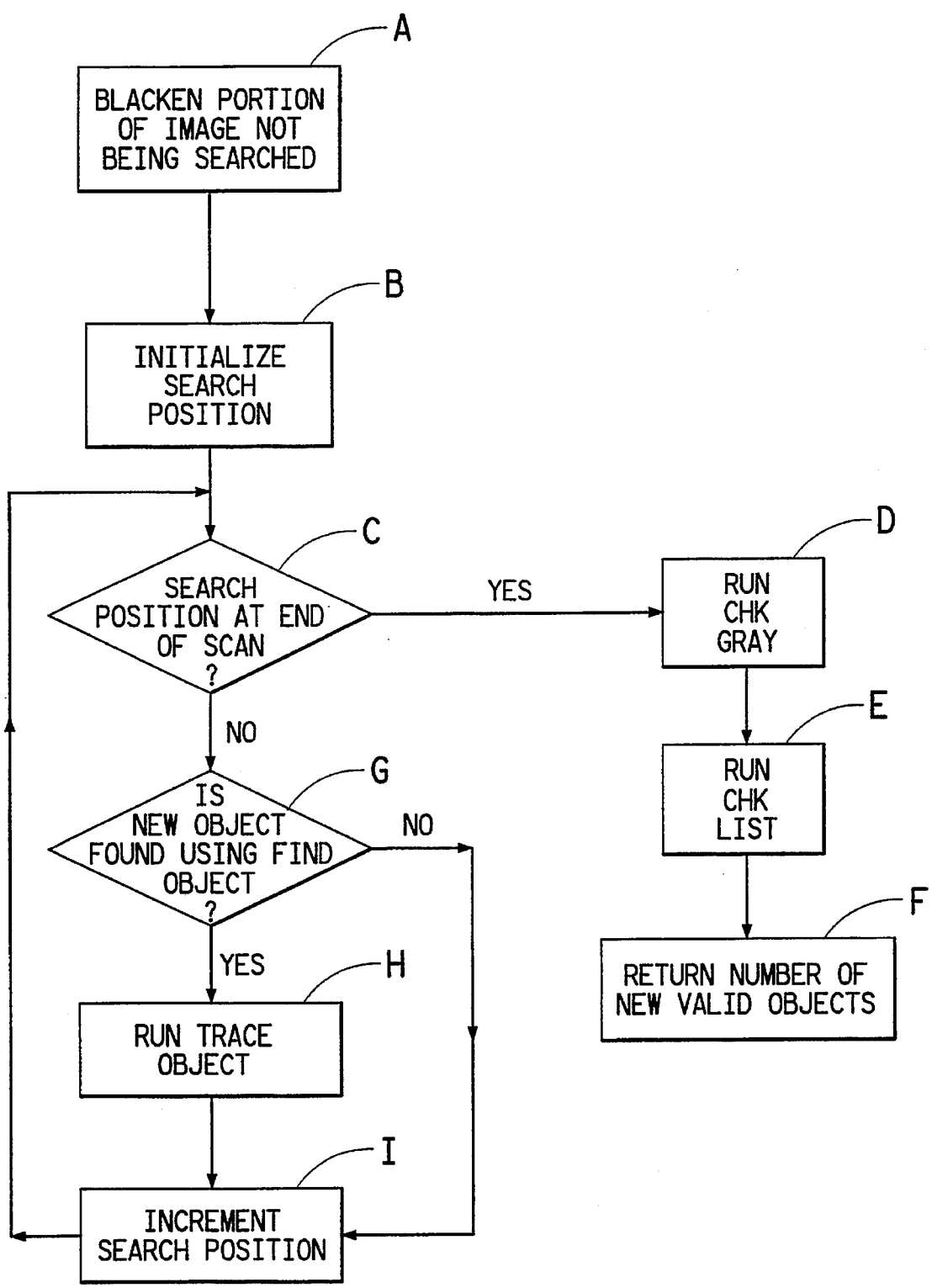
FIG. 5 is a flow chart illustrating the steps of a module SEARCH IMAGE which is used to search the image for at least one candidate object.

The method of the present invention also includes the step of searching the image using the entropically selected threshold gray level for at least one candidate object, wherein the candidate object has at least one candidate object attribute value. The searching step includes the sub-steps of scanning the image for at least one candidate object using the entropically selected threshold gray level and tracing the candidate object having boundary gray levels determined by the entropically selected threshold gray level. The searching step is performed by a module SEARCH IMAGE as shown in FIG. 5, a module FIND OBJECT of FIG. 6, and a module TRACE OBJECT as shown in FIG. 7.

The method of the present invention also includes the step of validating the candidate object having the valid object predetermined attribute value to identify the valid object. The validating step includes the sub-steps of calculating the candidate object attribute values and comparing the candidate object attribute values to the valid object predetermined attribute values to validate candidate objects. The calculating sub-step further includes the sub-step of storing the candidate object attribute values. The validating step is performed by the TRACE OBJECT module. In the first embodiment of the present invention, TRACE OBJECT uses only size and shape factor as valid object predetermined attribute values. In general, other attribute values may be used for the valid object predetermined attribute values.

The present invention employs a driver and a kernel. The driver stores the attribute values of the valid object, where each value represents the definition of a valid object, e.g., edge contrast, area, shape, etc. The driver of the present invention is specific to a given application. In an object-oriented environment, it is straight-forward in many instances to describe an object via a list of attributes such as size, shape, color, etc. For more complex objects where a simple parametric description might not be possible, one could use a neural network in the driver to identify the object. Parameters derived from the candidate object can be fed into the neural network, which has been trained to recognize specific objects. At this point, the architecture of the present invention begins to resemble a neural vision architecture where there is a feedback loop between the brain and the eye. In the present invention, a high-order driver is intertwined with a lower-order kernel. In this case, a more complex description of the object in the driver is used to drive the searching process, which in turn identifies further candidate objects.

The driver drives the kernel. The kernel performs several functions. It calculates an entropically selected threshold gray level, searches the image and calculates the attribute values for a candidate objects. In addition, it performs a validity check on the candidate objects by comparing the attribute values of the candidate objects with the predetermined attribute values for the valid objects, which, as noted above, are contained in the driver. It also performs a redundancy check to prevent multiple identification of a valid object.

Figure 8:
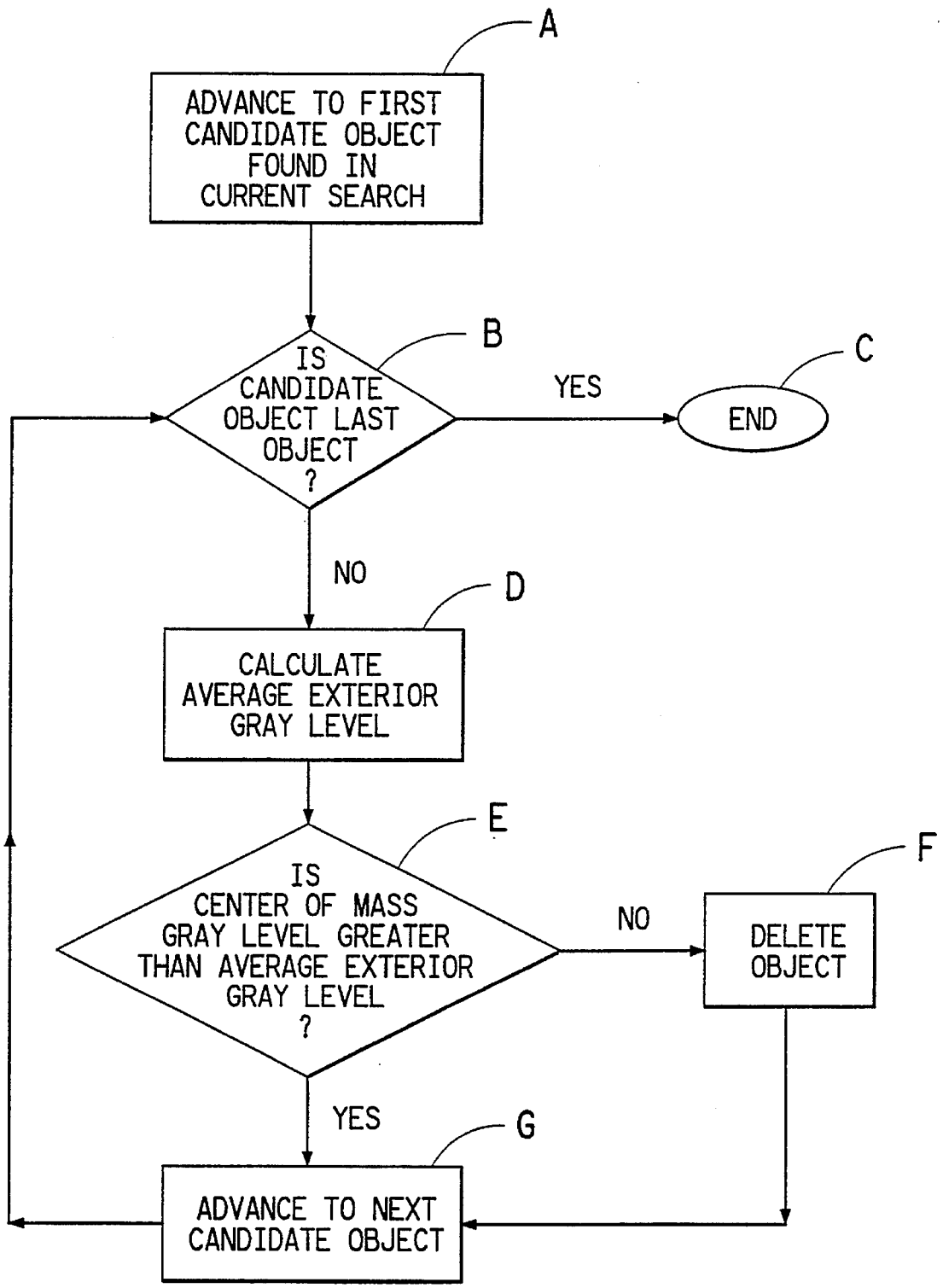
FIG. 8 is a flow chart illustrating the steps of a module CHK GRAY which is used to detect whether the candidate object is relatively lighter or darker than the background.

As illustrated by block A in FIG. 5, the first step in the SEARCH IMAGE module is to blacken a portion of the image not being searched. As shown in block B, the search position is then initialized. The module SEARCH IMAGE searches the region of interest with the current entropically selected threshold gray level. Decision diamond C of FIG. 5 then asks whether the search position is at the end of the scan. If so, then a module CHK GRAY, which is shown in FIG. 8 in detail and which will be described in greater detail below, is run as illustrated in block D. CHK GRAY retains only objects which are lighter than the background. To identify objects darker than the background, the image is inverted immediately after it has been generated. This allows CHK GRAY to retain objects which are darker than the background. Also, a module CHK LIST, which is shown in FIGS. 11A–C and FIGS. 13A and 13B in detail and which also prevents multiple identification of a valid object, is run as illustrated in block E. The number of new valid objects found by SEARCH IMAGE is returned as illustrated in block F of FIG. 5.

If the search position is not at the end of the scan, then the module SEARCH IMAGE searches the region of interest with the current entropically selected threshold gray level until it finds a point which has a gray level exceeding the entropically selected threshold gray level using a module FIND OBJECT. Such a point might be the first point of a new candidate object. Decision diamond G of FIG. 5 asks whether a new candidate object has been found using the module FIND OBJECT. If so, FIND OBJECT checks to see if the object has already been traced in the current search. If the object has not already been traced in the current search, the module SEARCH IMAGE proceeds to trace the object by running the module TRACE OBJECT, which is shown in detail in FIG. 7 as shown by block H of FIG. 5. After the object has been traced, the search position is incremented as illustrated in block I of FIG. 5. The loop through B–I is continued until the module SEARCH IMAGE is at the end of the search as indicated by decision diamond C. Alternatively, if a new candidate object has not been found as indicated by decision diamond G, then the search position is incremented as illustrated in block I, thus by-passing the tracing step and the loop through C–I is continued until SEARCH IMAGE is at the end of the search.

Figure 6:
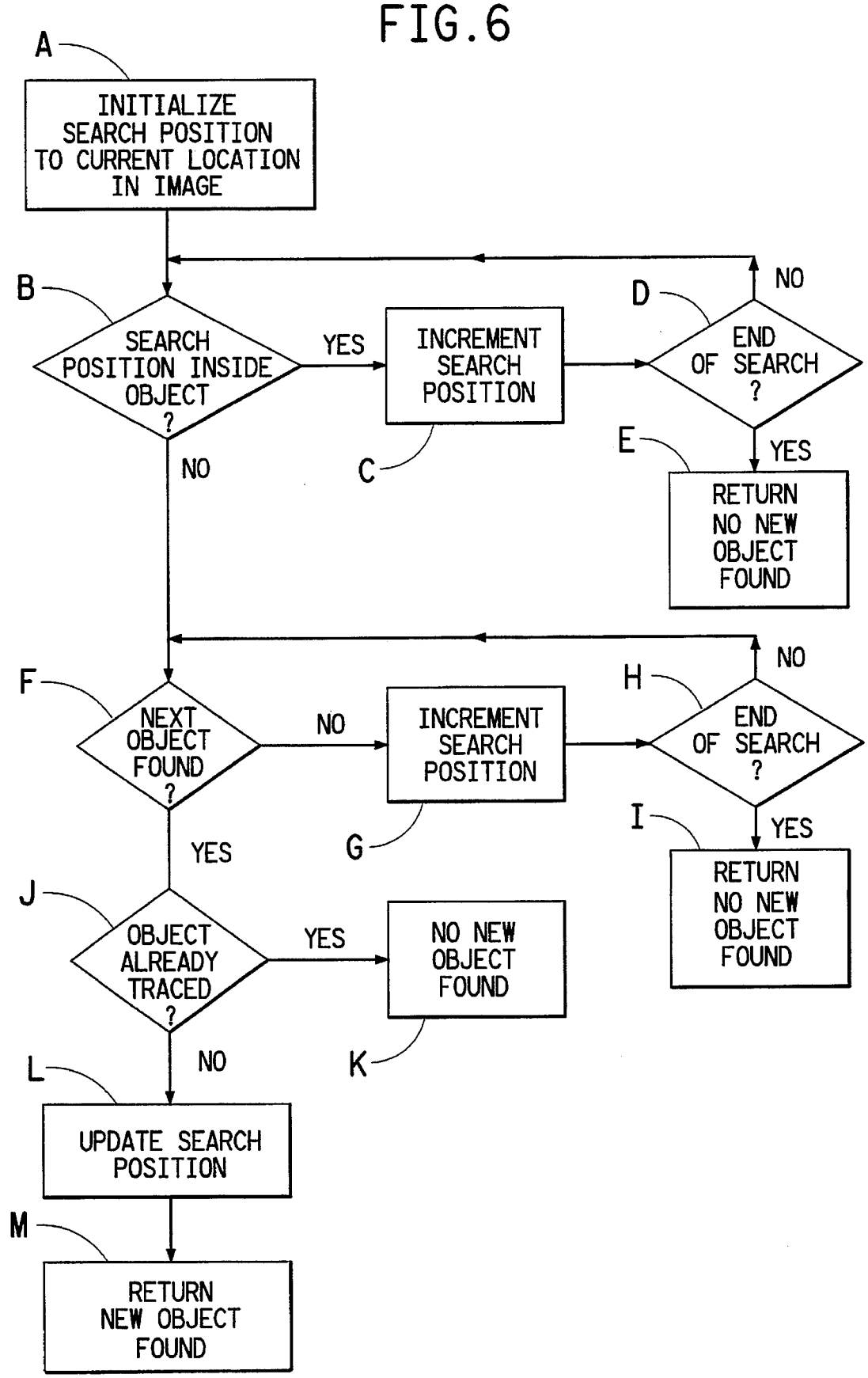
FIG. 6 is a flow chart illustrating the steps of a module FIND OBJECT which is also used to search the image.

The steps of the module FIND OBJECT are illustrated in FIG. 6. The first step in FIND OBJECT is to initialize the search position to the current location of the image being searched as shown in block A. Decision diamond B then asks whether the search position is inside the object. If so, then the search position is incremented as illustrated by block C, and decision diamond D asks whether FIND OBJECT is at the end of its search. If so, then no new object is found as indicated in block E. If not, then decision diamond B asks whether the incremented search position is inside the object. This process of looping through B–E continues until the search position is not inside the object. At this point, decision diamond F asks whether a next object has been found. If not, then the search position is incremented as illustrated in block G of FIG. 6, and decision diamond H asks whether the SEARCH IMAGE is at the end of the search. If so, then no new object found is returned as indicated by block I. If not, then decision diamond F again asks whether a next object has been found using the incremented search position. This process of looping through F–I continues until a next object has been found. Decision diamond J asks whether the object which has been found has already been traced. If so, then no new object found is returned as indicated by block K. If the object which has been found has not already been traced, then the search position is updated as illustrated by block L, and a new object found is returned as indicated by block M of FIG. 6.

Figure 7A:
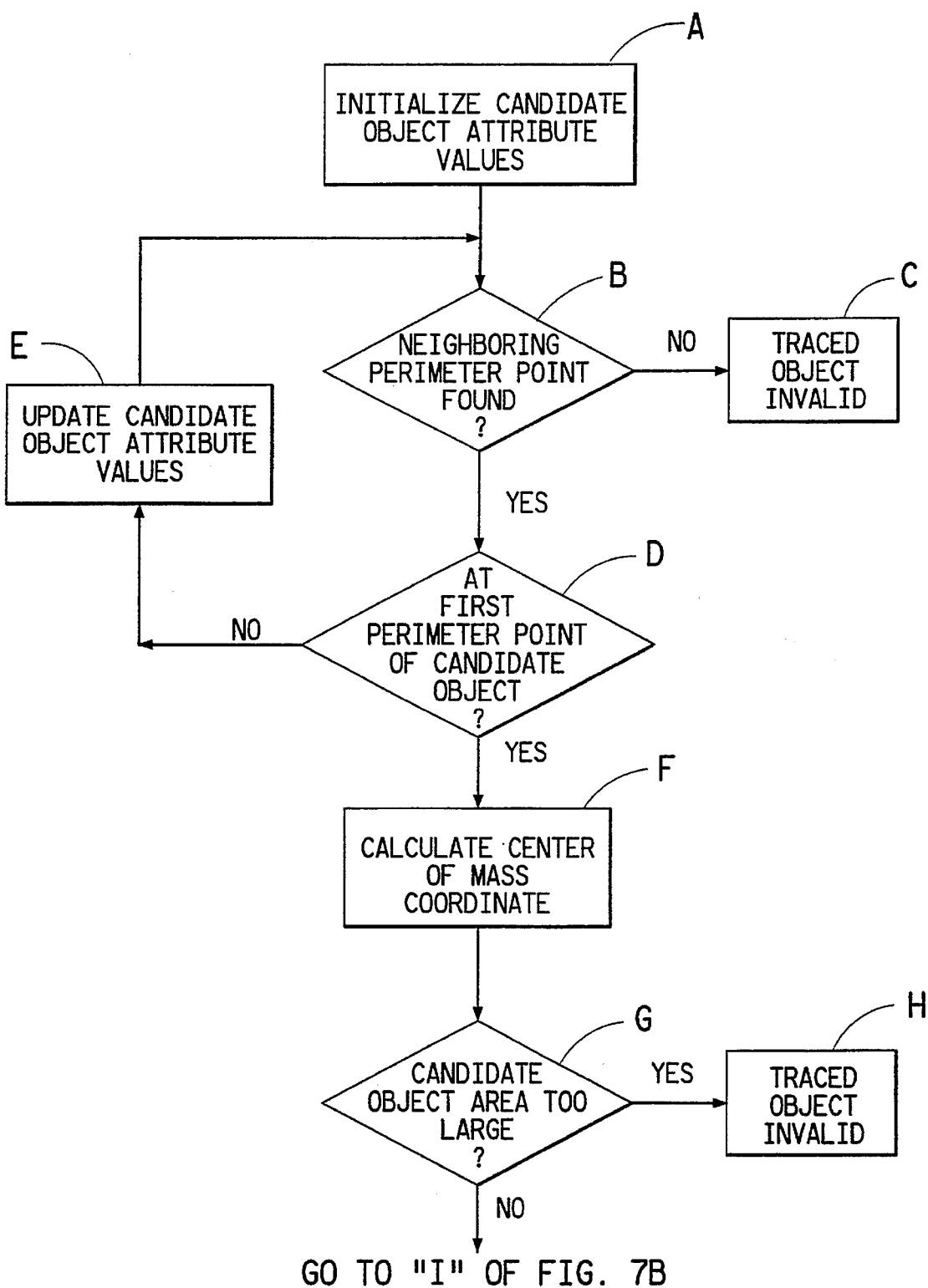
FIGS. 7A and 7B comprise a flow chart illustrating the steps of a module TRACE OBJECT which is used to trace and validate the candidate object.
Figure 7B:
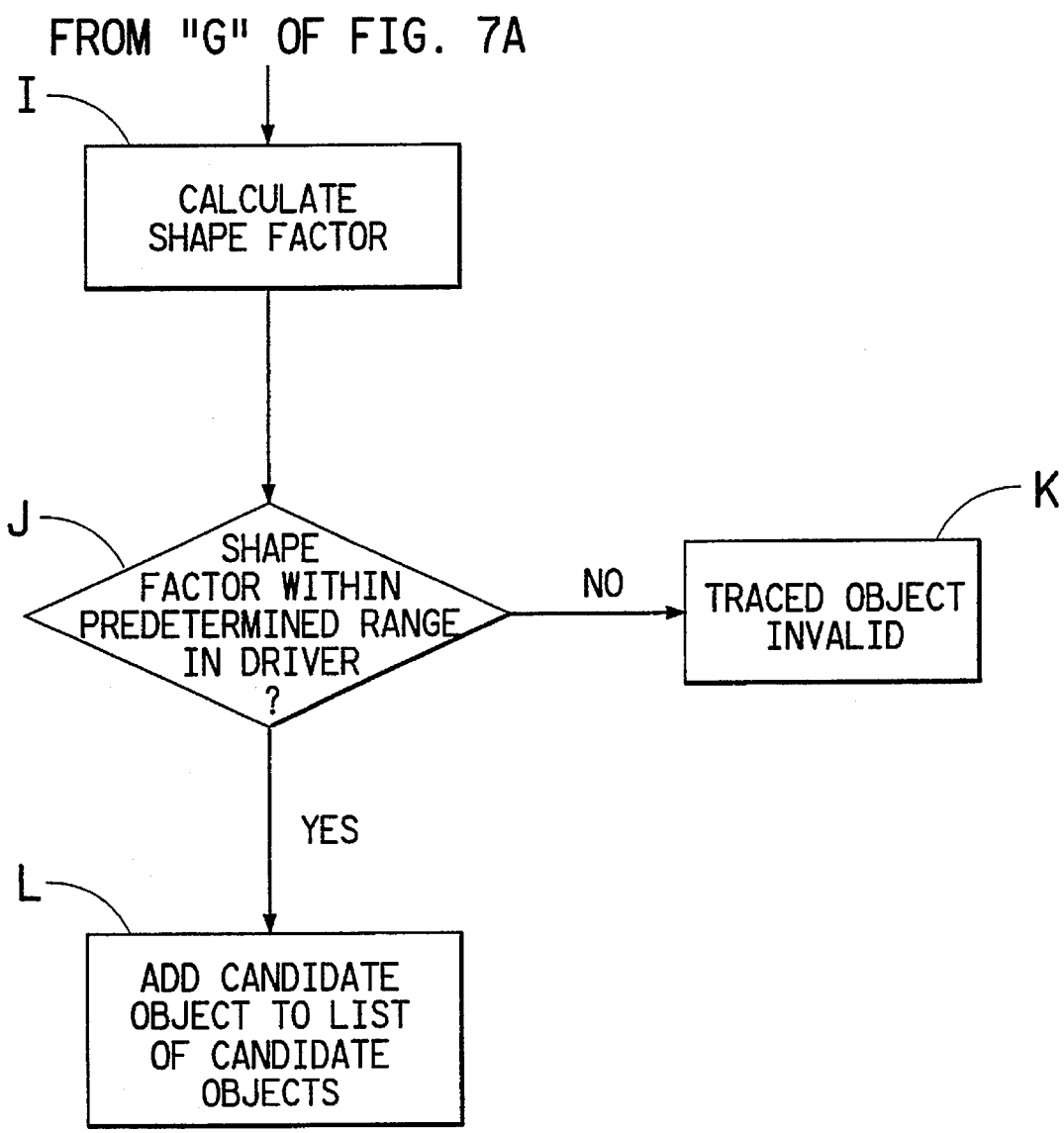

The steps of the module TRACE OBJECT are illustrated in FIGS. 7A and 7B. The basic principles of the TRACE OBJECT module are similar to those described in "Digital Image Processing" by Rafael C. Gonzalez and Paul Wintz, Second Ed., Addison-Wesley Publishing Company, Reading, Mass. (1987). As shown in block A of FIG. 7A, the first step in the TRACE OBJECT module is to initialize the candidate object attribute values. The TRACE OBJECT module then asks in decision diamond B whether a neighboring perimeter point has been found. If not, the traced object is invalid as illustrated by block C. If the neighboring perimeter point has been found, then decision diamond D asks whether the TRACE OBJECT module is at the first perimeter point of the candidate object. If not, then the candidate object attribute values are updated as illustrated in block E of FIG. 7A. The loop through B–E is then repeated using the updated candidate object attribute values until the TRACE OBJECT module is at the first perimeter point of the candidate object. The center of mass coordinate is then calculated as shown in block F of FIG. 7A. Decision diamond G then asks if the candidate object area is too large. If it is, the traced object is invalid as indicated by block H of FIG. 7A.

If the candidate object area is not too large, then a shape factor is calculated as shown in block I in FIG. 7B. The definition of the shape factor may vary, depending on the geometry of the object being identified. For instance, the definition of the shape factor for circular objects is:

$$\text{Shape Factor} = 1 - \frac{p^2}{4\pi A} \qquad (9)$$

Where:

p is the perimeter of a candidate object; and

A is the area of the candidate object.

TRACE OBJECT then checks if the shape factor is within a predetermined range as contained in the driver as shown in decision diamond J in FIG. 7B. If the shape factor does not fall within the predetermined range, then the traced object is invalid as illustrated by block K of FIG. 7B. If the shape factor falls within the predetermined range, then the candidate object is added to the list of valid objects maintained by the kernel as shown by block L.

After all the candidate objects have been traced in the current search, the module CHK GRAY as shown in FIG. 8 is called to check whether the candidate objects are relatively lighter than the background. As shown in block A of FIG. 8, the first step in the CHK GRAY module is to advance to the first candidate object found in the current search. Decision diamond B of FIG. 8 asks whether the candidate object is the last object in the list of candidate objects. If it is, the module stops running as shown by oval C. If the candidate object is not the last object in the list of candidate objects, then the average exterior gray level is calculated as illustrated by block D. Decision diamond E then asks whether the gray level of the center of mass is greater than the average exterior gray level of the four exterior points (i.e., the top, bottom, left and right points) surrounding the extremum points of the object. The exterior points are those points in the background which are immediate neighbors to the extremum points of the object. If not, the object is deleted as shown in block F of FIG. 8. If the gray level of the center of mass is greater than the average exterior gray level, then the candidate object is retained and the CHK GRAY module advances to the next candidate object as shown in block G. The CHK GRAY module then returns to decision diamond B to ask whether the candidate object is the last object. The loop as shown in B–G is repeated for the next candidate object until the next candidate object is the last candidate object, at which point CHK GRAY stops running. As noted above, the module CHK GRAY may be run to detect objects darker than the background. In this case, the image is initially inverted prior to performing the step of generating the image of the object and the background.

The method as described thus far can be referred to as a screening process. For example, it can be used to screen for the presence of pathological bacteria in food or in blood or soil samples. A screening process results in a yes—no answer; absolute quantitation is not necessary. For a more stringent identification process, it is necessary to implement the method of the present invention recursively as described below.

The method of the present invention further comprises the steps of subdividing the gray level histogram into an upper histogram and a lower histogram using the entropic threshold gray level which was selected to maximize the entropy function of the histogram as an upper delimiter and a lower delimiter. The selection, searching, validating and subdividing steps are recursively repeated for each of the upper and lower histograms. The repetition of the selection step selects a next successive entropic threshold gray level, thereby recursively partitioning the gray level histogram to identify the valid objects until a predetermined minimum number of new valid objects is identified. In the preferred embodiment, the predetermined minimum number is zero. However, there may be cases where the predetermined number is greater than zero, such as when a complete identification is not required.

Figure 9A:
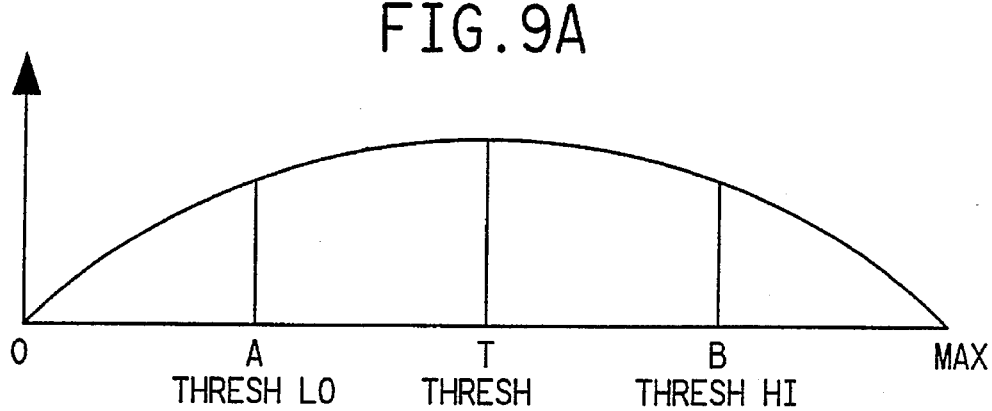
FIGS. 9A–9C are original, upper and lower gray level histograms, respectively, of an image.

FIG. 9 illustrates the concept of subdividing a histogram into an upper histogram and a lower histogram. An original histogram is shown in FIG. 9A. THRESH, as shown at T in FIG. 9A, is the entropically selected threshold gray level for the gray level histogram corresponding to the gray level region between the minimum gray level being searched and the maximum gray level being searched. For the original histogram as shown in FIG. 9A, the minimum gray level being searched is zero and the maximum gray level being searched is MAX. THRESH HI, as shown at B, is the entropically selected threshold gray level for the gray level histogram corresponding to the gray level region between THRESH and MAX. THRESH LO, as shown at A, is the entropically selected threshold gray level for the gray level histogram corresponding to the gray level region between zero and THRESH.

According to the present invention, the subdividing, selection, searching and validating steps are then recursively repeated. By recursion is meant the process of continuously dividing a histogram into upper and lower histograms, searching each upper histogram, which upper histogram is itself continuously divided into upper and lower histograms, for new valid objects until the number of new valid objects found in an upper histogram is less than or equal to a predetermined minimum number, and subsequently searching each lower histogram corresponding to the most recently searched upper histogram, which lower histogram is itself continuously divided into upper and lower histograms, until the number of new valid objects found in a lower histogram is less than or equal to the predetermined minimum number.

Figure 9B:
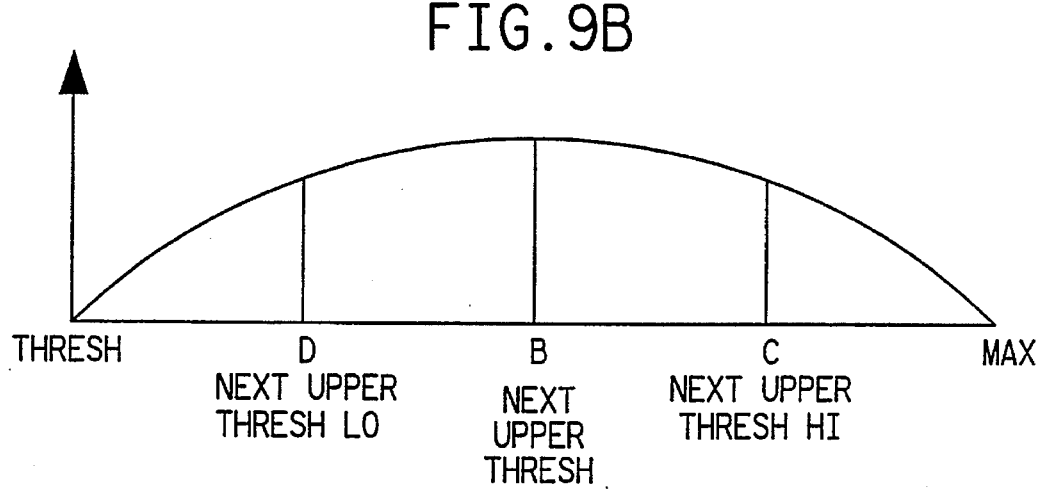

The upper histogram is shown in FIG. 9B. The repetition of the subdividing step subdivides the upper histogram into a next successive upper and lower histogram as shown in FIG. 9B. The repetition of the selection step for the upper histogram selects a next upper successive entropic threshold gray level, as shown at B in FIG. 9B. Thus, point B, which was THRESH HI in the original histogram, becomes the threshold for the upper histogram, or NEXT UPPER THRESH. In FIG. 9B, the minimum gray level being searched is now THRESH and the maximum gray level being searched is now MAX. The NEXT UPPER THRESH HI, shown at C, is the entropically selected threshold gray level for the gray level histogram corresponding to the gray level region between B and MAX. The NEXT UPPER THRESH LO, shown at D, is the entropically selected threshold gray level for the gray level histogram corresponding to the gray level region between THRESH and B. The selection, searching and validating steps are then repeated recursively using the next upper successive entropic threshold gray level, B, as the entropic threshold gray level.

Figure 9C:
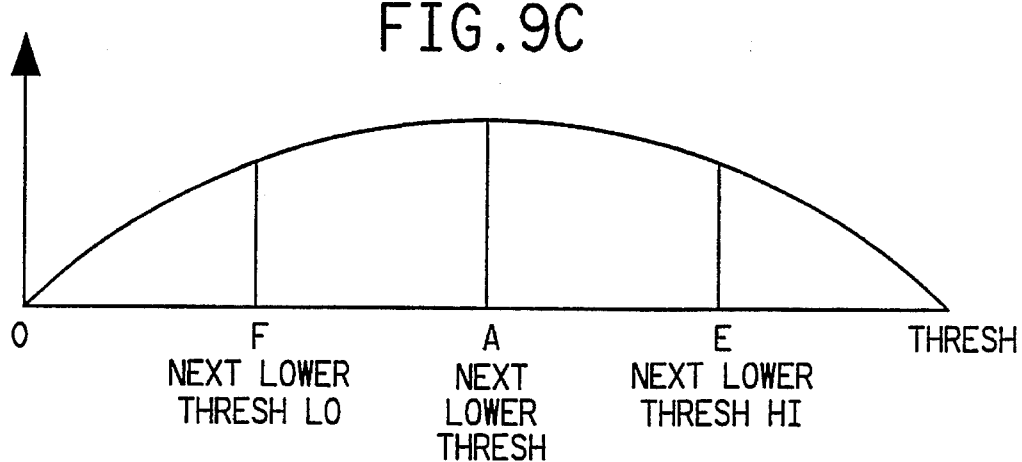

FIG. 9C shows the lower histogram. The repetition of the subdividing step subdivides the lower histogram into a next successive upper and lower histogram as shown in FIG. 9C. The repetition of the selection step for the lower histogram selects a next lower successive entropic threshold gray level, as shown at A in FIG. 9C. Thus, point A, which was THRESH LO in the original histogram, becomes the threshold for the partitioned lower histogram, or NEXT LOWER THRESH. In FIG. 9C, the minimum gray level being searched is now zero and the maximum gray level being searched is now THRESH. The NEXT LOWER THRESH HI, shown at E, is the entropically selected threshold gray level for the gray level histogram corresponding to the gray level region between A and THRESH. The NEXT LOWER THRESH LO, shown at F, is the entropically selected threshold gray level for the gray level histogram corresponding to the gray level region between zero and A. The selection, searching and validating steps are then repeated recursively for the lower histogram using the next lower successive entropic threshold gray level, A, as the entropic threshold gray level.

Figure 10:
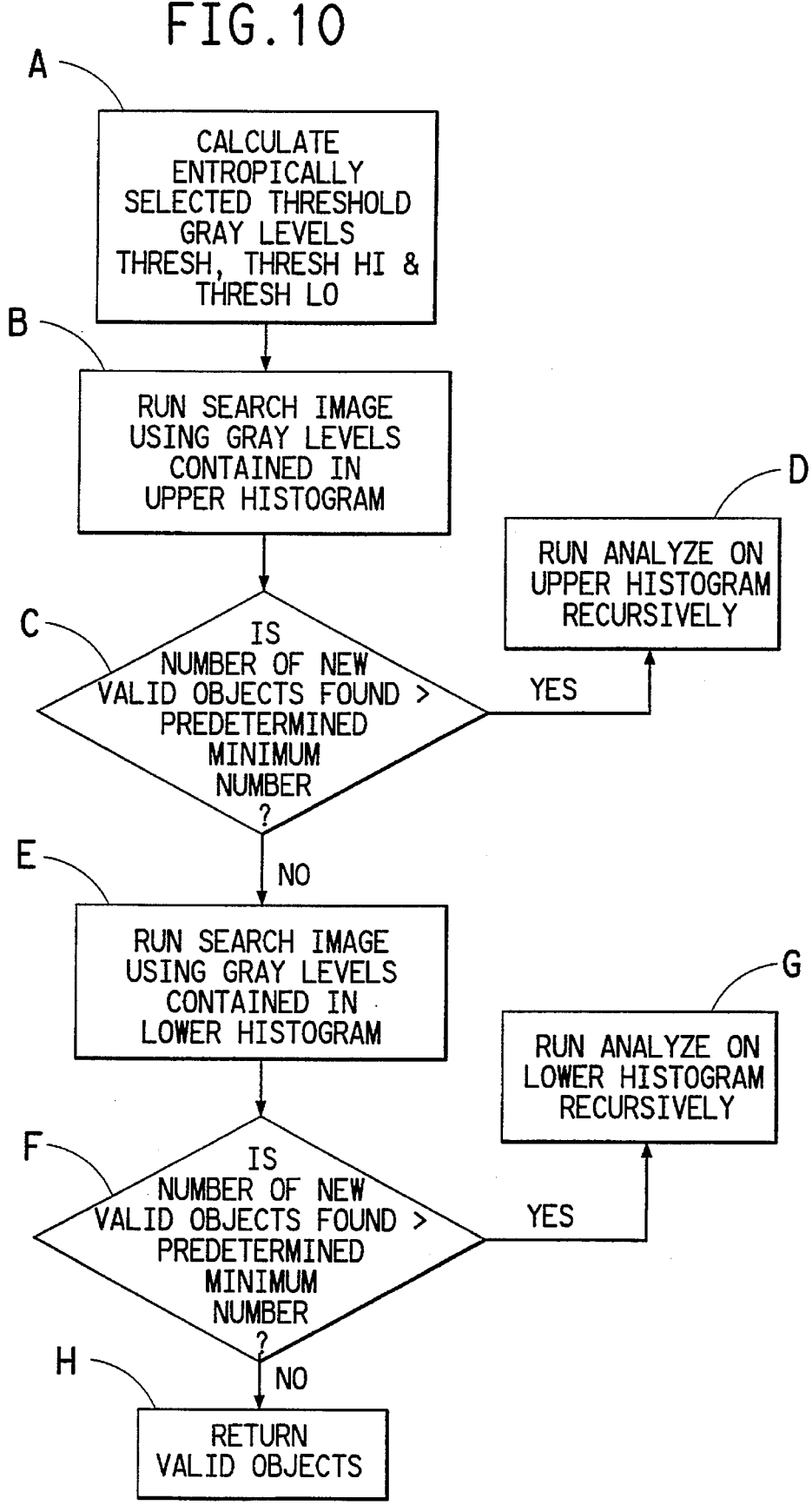
FIG. 10 is a flow chart illustrating the steps of a module ANALYZE which is used to recursively search the image for candidate objects.

The ANALYZE module as shown in FIG. 10 constitutes the core recurslye kernel of the present invention and recursively partitions the histogram. The ANALYZE module effectively zooms in on a specific region in gray level space to search for instances of the candidate object. The first step in the ANALYZE module as shown in FIG. 10 is to calculate the entropically selected threshold gray levels THRESH, THRESH HI AND THRESH LO as described above and as shown in block A of FIG. 10. As shown in block B, the module SEARCH IMAGE is run using the gray levels contained in the upper histogram. Decision diamond C then asks whether the number of new valid objects found is greater than the predetermined minimum number. If it is, then the module ANALYZE is run on the upper histogram recursively. If the number of valid objects found is not greater than the predetermined minimum number, then the module SEARCH IMAGE is run again using the gray levels contained in the lower histogram as shown in block E. Decision diamond F then asks whether the number of new valid objects found is greater than the predetermined minimum number. If it is, then ANALYZE is run on the lower histogram recursively as shown in block G. If it is not, then ANALYZE stops running, and the valid objects are returned as shown in block H of FIG. 10. With the method of the present invention, there is some latitude in selecting the range of values of the number of attributes to be checked for in the validation step during the recursive process.

In the preferred embodiment of the present invention, the searching step includes the sub-step of scanning a portion of the image for at least one candidate object using the entropically selected threshold gray level and tracing the candidate object having boundary gray levels determined by the entropically selected threshold gray level. The portion of the image scanned comprises a plurality of pixels, and each pixel has a gray level value less than the upper delimiter plus an increment. The upper delimiter also has the notation MAX. The increment is equal to the difference between MAX, the maximum gray level of the region being searched, and MIN, the minimum gray level of the region being searched, resulting in a new maximum gray level, Gray level$_{max}$:

$$Gray\ level_{max} = 2 \times MAX - MIN \tag{10}$$

Regions in the image where the gray level exceeds gray level$_{max}$ are ignored in the search.

According to the method of the present invention, the validating step further includes the sub-step of checking for redundancies to prevent multiple identification of the valid object. Such redundancy checking is necessary since an object which has been recognized as valid after the current search may have been recognized as a valid object in an earlier search. In order to perform the redundancy checking sub-step, valid objects are classified as either homogeneous or inhomogeneous. Valid objects are also further classified as either a relatively large valid object or a small valid object. In addition, valid objects are classified as either contained in another valid object (interior valid objects), or never contained in another valid object (exterior valid objects).

According to the method of the present invention, the redundancy checking sub-step may be performed to delete inhomogeneous valid objects. When it is, the method of the present invention further includes the sub-step of deleting the large object when the large object contains more than one small object. Also, when the redundancy checking sub-step is performed to delete inhomogeneous valid objects, the method of the present invention also includes the sub-steps of calculating the average edge contrast of the large and the small valid objects and deleting the object having the smaller edge contrast when the large object contains only one small object. These sub-steps are performed by a module, CHK LIST, as shown in FIGS. 11A–D for inhomogeneous valid objects.

Figure 11A:
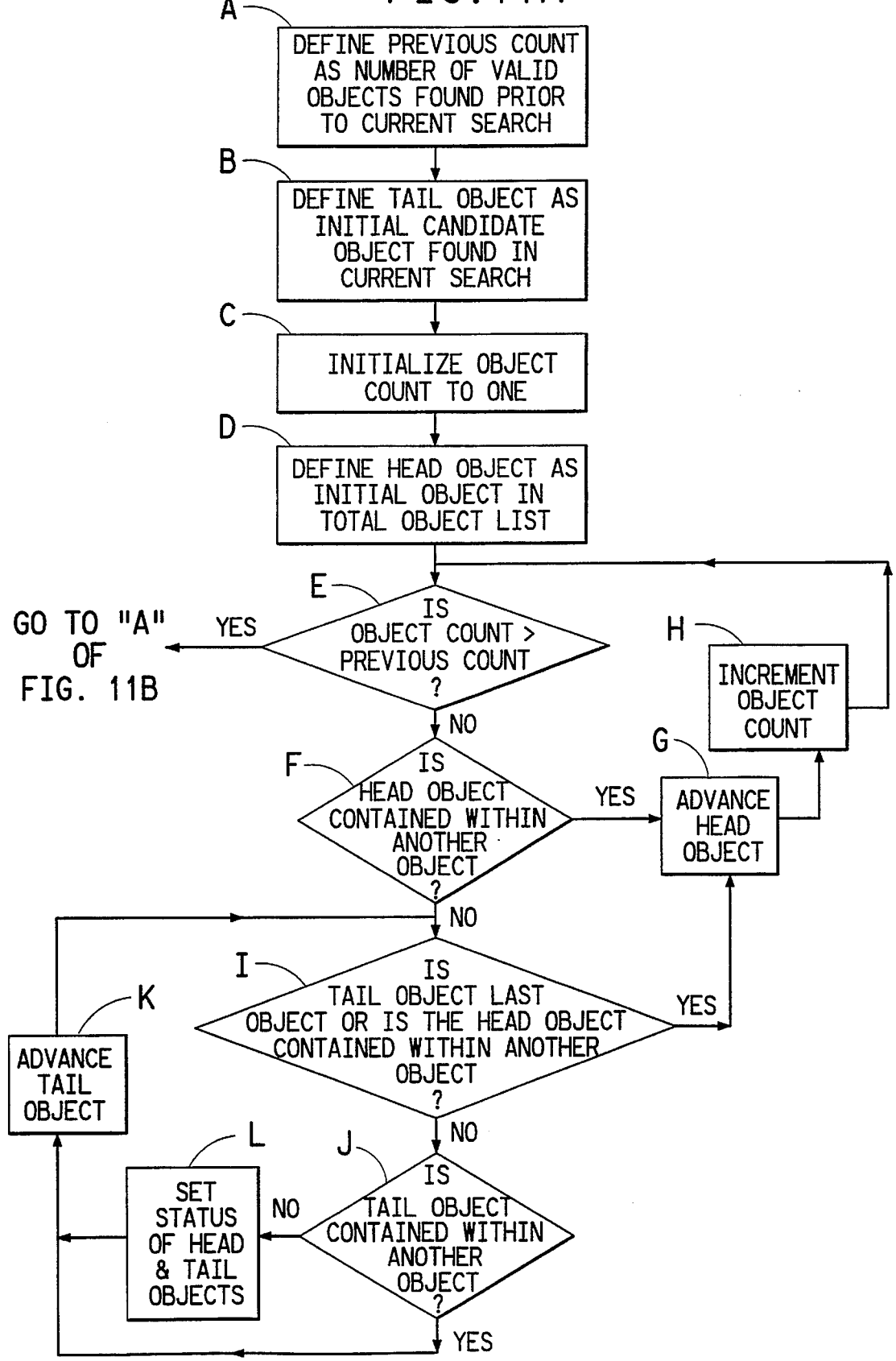
FIGS. 11A–11D comprise a flow chart illustrating the steps of a module CHK LIST which is used to resolve redundancies in inhomogeneous objects.

As shown in block A of FIG. 11A, the first step of the CHK LIST module for deleting inhomogeneous objects is to define the previous count as the number of valid objects found prior to the current search. Then the tail object is defined as the initial candidate object found in the current search as shown in block B. The object count is initialized to one as shown in block C, and the head object is defined as the initial object in the total object list (i.e., the list of all objects found to date) as shown in block D. Decision diamond E asks whether the object count is greater than the previous count.

Figure 11B:
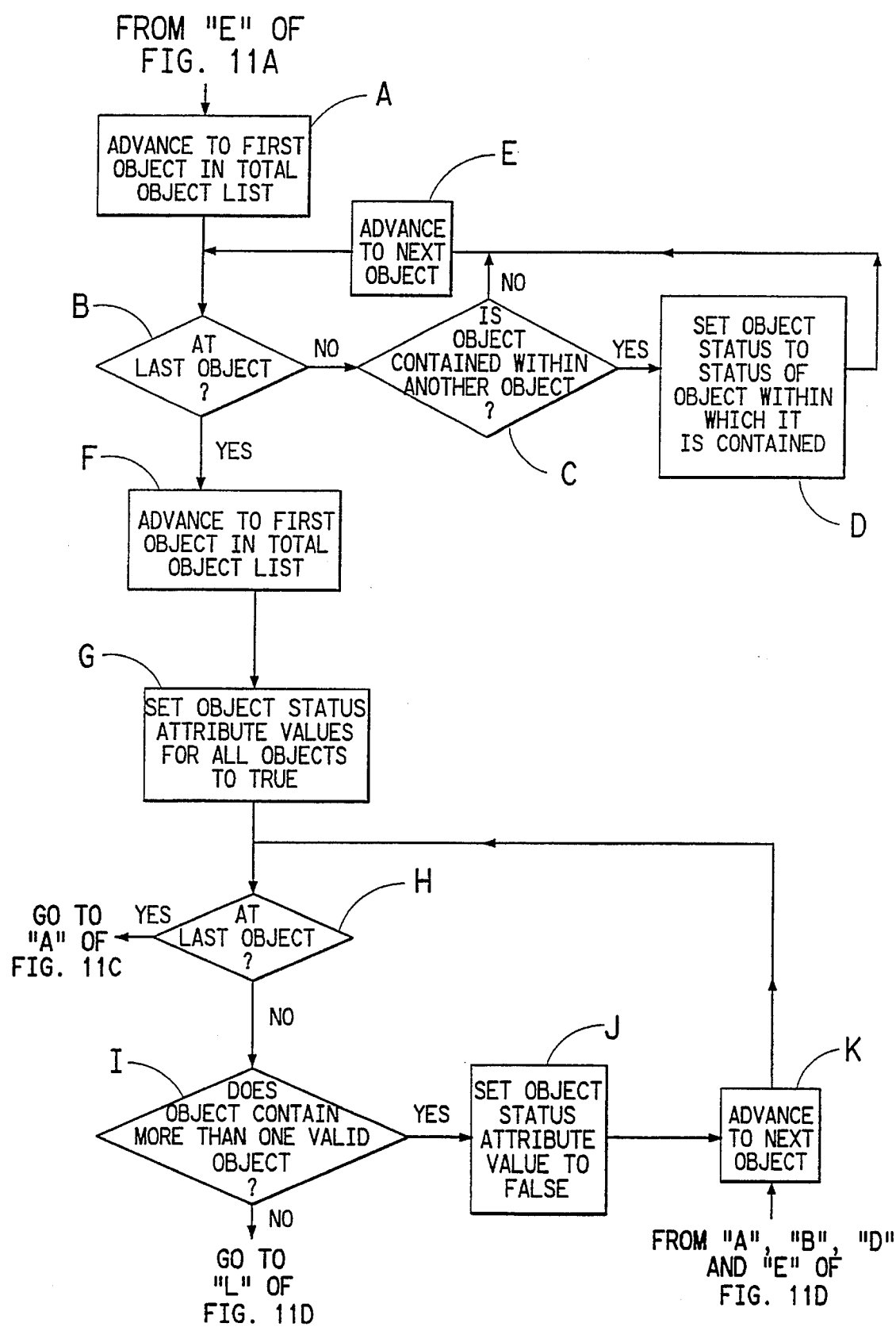

If the object count is greater than the previous count, CHK LIST advances to the first object in the total object list as shown in block A of FIG. 11B. Decision diamond B of FIG. 11b asks if CHK LIST is at the last object. If not, then decision diamond C asks whether the valid object is contained within another valid object. If so, the object status is set to the status of the object within which it is contained as shown in block D, and CHK LIST advances to the next object as shown in block E. Also, if the object is not contained within another object, then CHK LIST advances to the next object as shown in block E. The loop through B–E continues until the next object of block E is the last object, at which point CHK LIST advances to the first object in the total object list as shown in block F. The object status attribute values for all the objects is set to "true" as shown in block G. "True" in this context means valid, and "false" means invalid. Decision diamond H then asks if CHK LIST is at the last object.

Figure 11C:
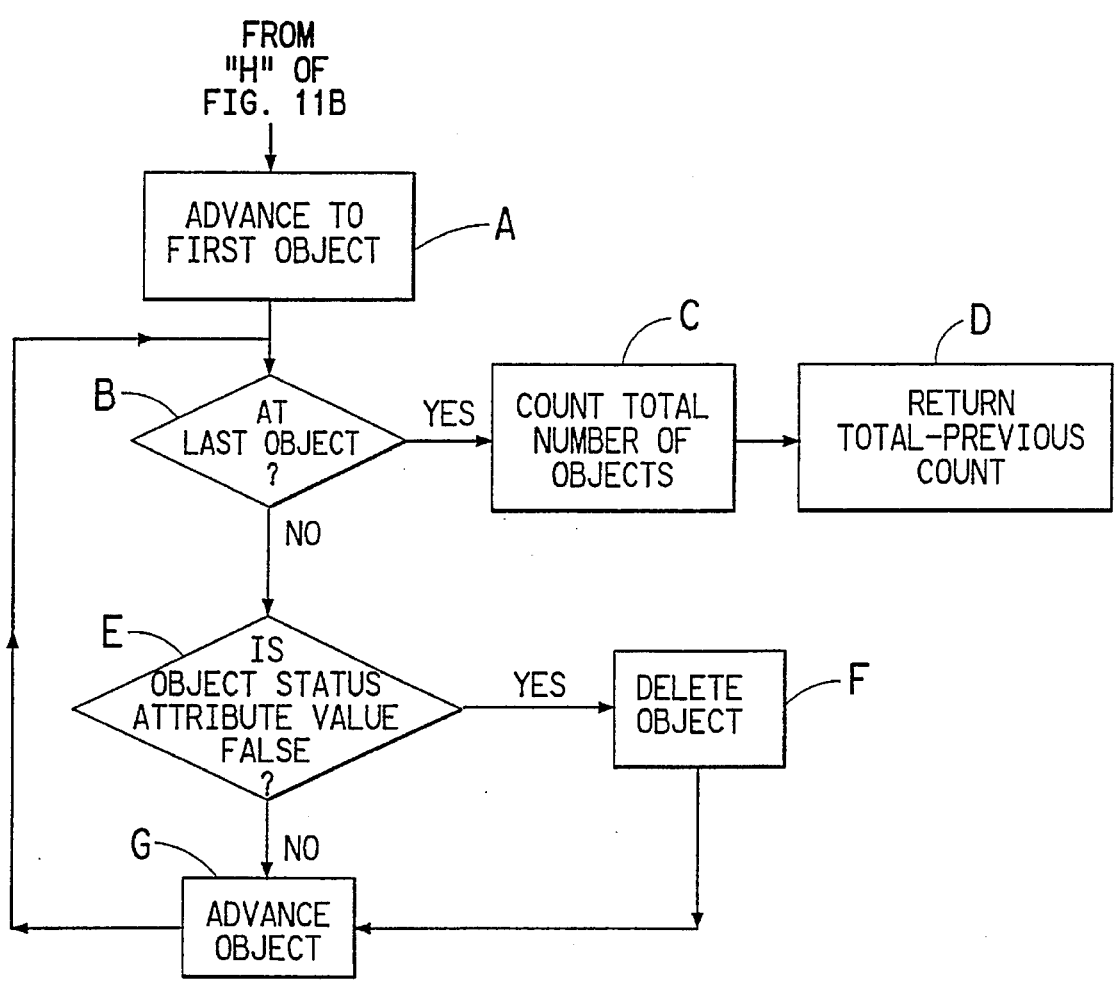

If it is, CHK LIST advances to the first object as shown in block A of FIG. 11C. Decision diamond B then asks again whether CHK LIST is at the last object. If it is, then the total number of objects is counted as shown in block C, and the difference between the total number of objects and the previous count is returned as shown in block D. If CHK LIST is not at the last object, decision diamond E asks whether the object status attribute value is false. If so, the object is deleted as shown in block F. If not, then CHK LIST advances the object as shown in block G, and CHK LIST asks again whether it is at the last object as shown in decision diamond B. The loop through B, E, F, and G continues until the advanced object of block G is the last object. At this point, the total number of objects is counted as shown in block C, and the difference between the total number of objects and the previous count is returned as shown in block D.

Figure 11D:
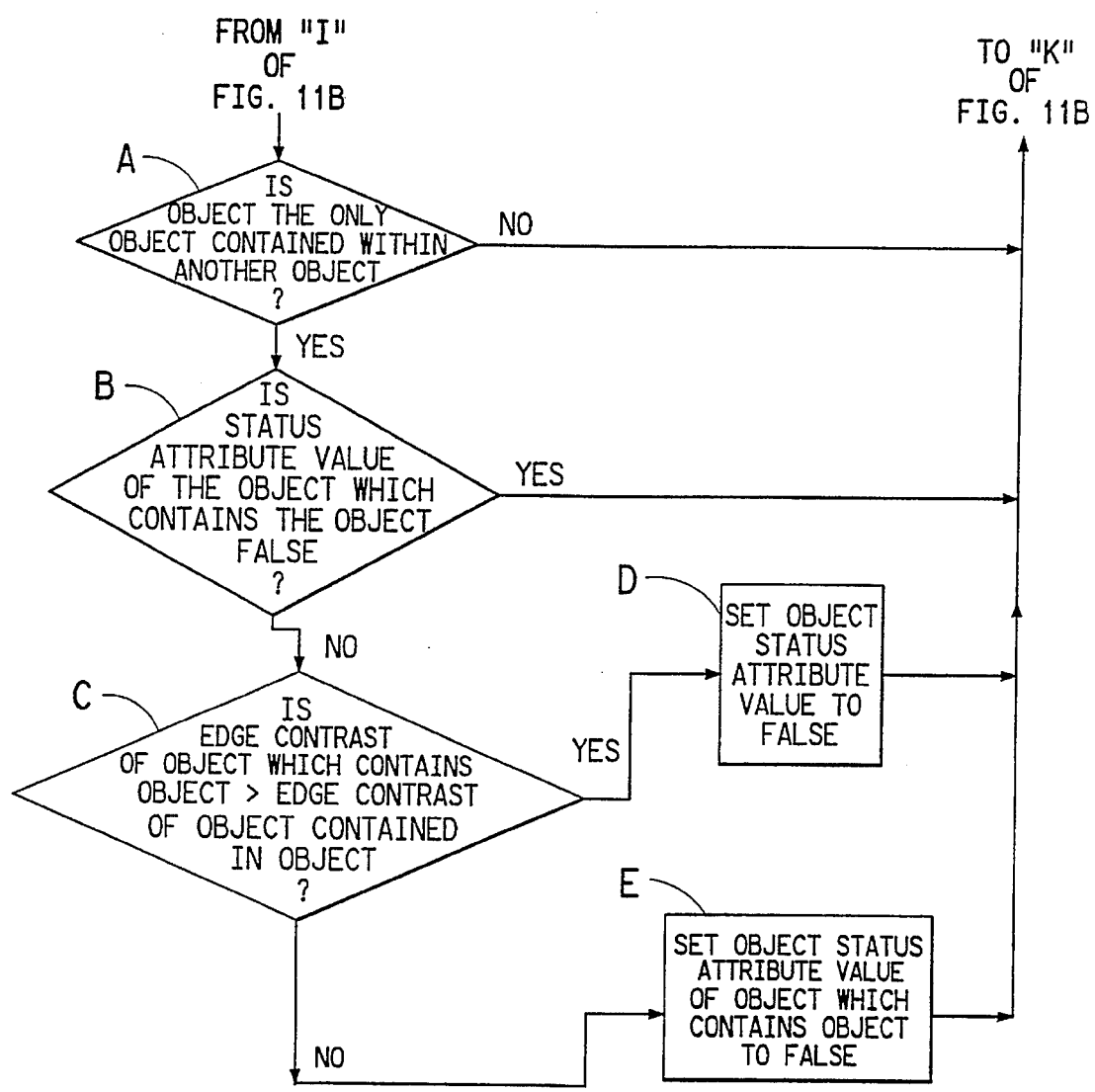

Returning to decision diamond H in FIG. 11B, if CHK LIST is not at the last object at this point, then it goes to decision diamond I, which asks whether the object contains more than one valid object. If so, then the object status attribute value is set to false as shown in block J, and CHK LIST advances to the next object as shown in block K. CHK LIST then returns to decision diamond H, asks whether it is at the last object and continues this process until the object does not contain more than one valid object. Then decision diamond A of FIG. 11D asks if the object is the only object contained within another object. If not, then CHK LIST advances to the next object as shown in block K of FIG. 11B, and the loop through H–K of FIG. 11B and A of FIG. 11D is repeated until the object is the only object contained within another object. If the object is the only object contained within another object, then decision diamond B asks whether the status attribute value of the object which contains the object is false. If so, then CHK LIST advances to the next object as shown in block K of FIG. 11B, and the loop through H–K of FIG. 11b and A–B of FIG. 11D is repeated until the status attribute value of the object which contains the object is not false. At this point, decision diamond N asks whether the edge contrast of the object which contains another object is greater than the edge contrast of the object. If so, then CHK LIST sets the object status attribute value to false as shown in block D, it advances to the next object as shown in block K in FIG. 11B, and the loop through H–K of FIG. 11B and A–C of FIG. 11D is repeated until the edge contrast of the object which contains another object is not greater than the edge contrast of the object contained in another object. Then CHK LIST sets the status of the object which contains the object to false as shown in block E of FIG. 11D and it advances to the next object as shown in block K of FIG. 11D until it is at the last object.

Figure 12:
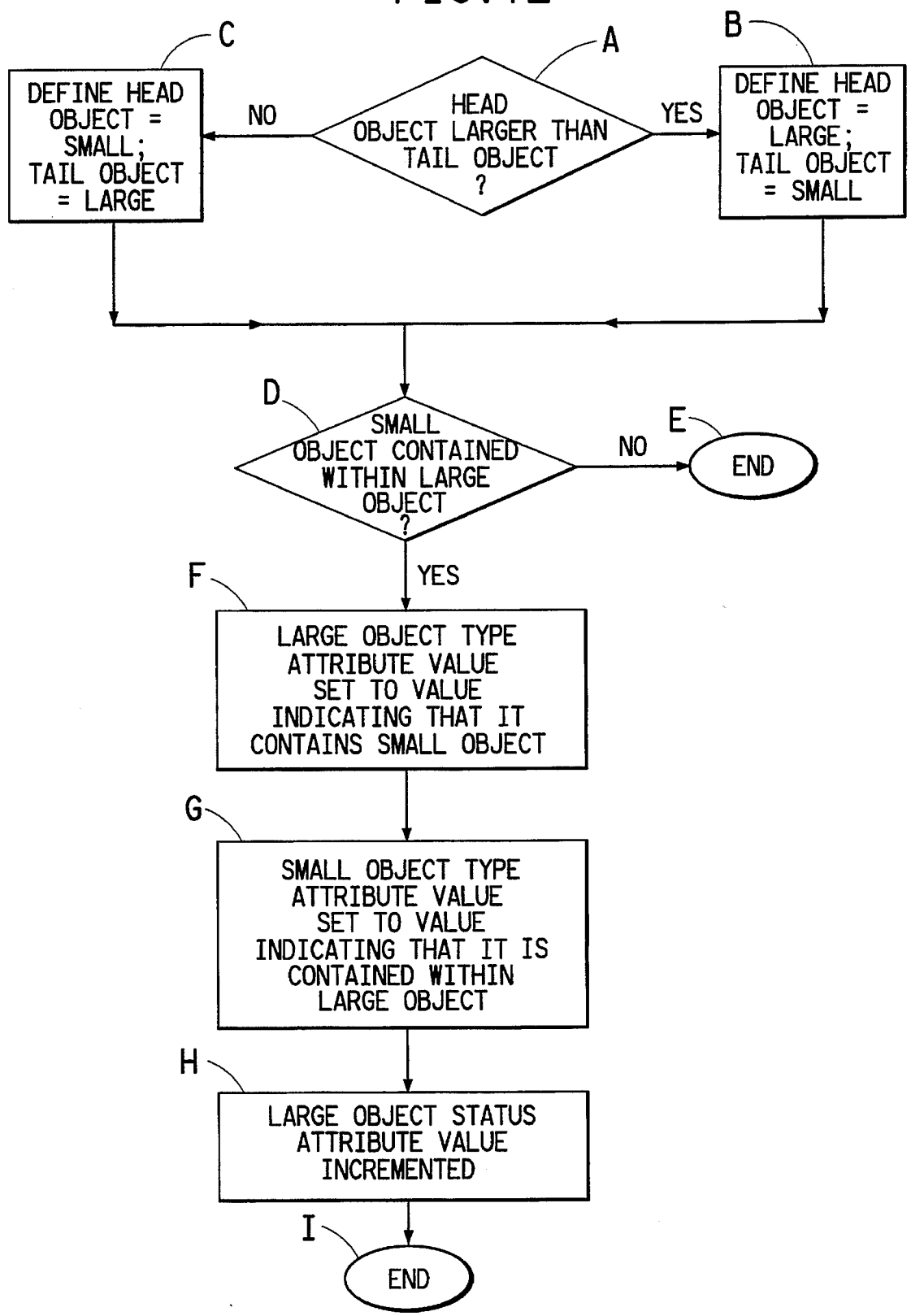
FIG. 12 is a flow chart illustrating the steps of a module SET STAT which is used with the module CHK LIST as shown in FIGS. 11A–11D.

Returning to decision diamond E in FIG. 11A, if the object count is not greater than the previous count, then decision diamond F asks if the head object is contained within another object. If so, then the head object is advanced as shown in block G, and the object count is incremented as shown in block H. Decision diamond E again asks if the incremented object count is greater than the previous count. If so, CHK LIST advances to block A of FIG. 11b as explained above. If the incremented count is not greater than the previous count, the loop through F, G, H and E in FIG. 11A is repeated until the head object is not contained within another object. Then CHK LIST advances to decision diamond I of FIG. 11A, which asks if the tail object is the last object, or if the head object is contained within another object. If the tail object is the last object, or if the head object is contained within another object, then CHK LIST advances the head object as shown in block G, and the count is incremented as shown in block H. The loop through E, F, I, G and H is repeated until the tail object is not the last object or the head object is not contained within another object. Decision diamond J then asks whether the tail object is contained within another object. If it is, then the tail object is advanced as shown in block K of FIG. 11A, and the loop through I, J and K is repeated until the tail object is not contained within another object. Then CHK LIST goes to the module SET STAT as shown in FIG. 12 to set the status of the head and tail objects as shown in block L of FIG. 11A.

The redundancy checking sub-step further includes the sub-steps of comparing the areas of a plurality of valid objects and designating one of the valid objects as a large valid object and the other of the first and second valid objects as a small valid object and determining whether the small valid object is contained in the large valid object as defined by the four extremum points of the larger object for inhomogeneous objects. The module SET STAT as shown in FIG. 12 performs these sub-steps for inhomogeneous objects. The first step of SET STAT as shown in decision diamond A of FIG. 12 is to ask whether the head object is larger than the tail object. If so, then the head object is defined as the large valid object, and the tail object is defined as the small valid object as shown in block B. If the head object is not larger than the tail object, then the head object is defined as the small valid object, and the tail object is defined as the large valid object as shown in block C. Then decision diamond D asks whether the small object is contained within the large object. If not, then SET STAT is finished, as indicated by END oval E. If the small object is contained within the large object, then the large object type attribute value is set to a value indicating that it contains a small object as shown in block F. The type of attribute value tells SET STAT whether an object is contained within another object or whether the object contains another object. Also, the small object type attribute value is set to a value indicating that it is contained within a large object as shown in block G. Finally, the large object status attribute value is incremented as shown in block H. SET STAT is then finished, as indicated by the END oval I and returns to block L of FIG. 11A.

According to the method of the present invention, the redundancy checking sub-step may be performed to resolve redundancies in the homogeneous objects. When it is, the method of the present invention further includes the sub-steps of calculating the edge contrast of the large and small valid objects and deleting the large object where the average edge contrast of the large object is less than the average edge contrast of the small object and is less than a predetermined minimum edge contrast. The redundancy checking sub-step for resolving redundancies also includes the sub-steps of calculating the edge contrast of the large and small valid objects and deleting the small object where the average edge contrast of the large object is greater than the average edge contrast of the small object and is greater than the predetermined minimum contrast. These sub-steps are performed using the module CHK LIST for homogeneous objects as illustrated by the flow charts of FIGS. 13A and 13B.

Figure 13A:
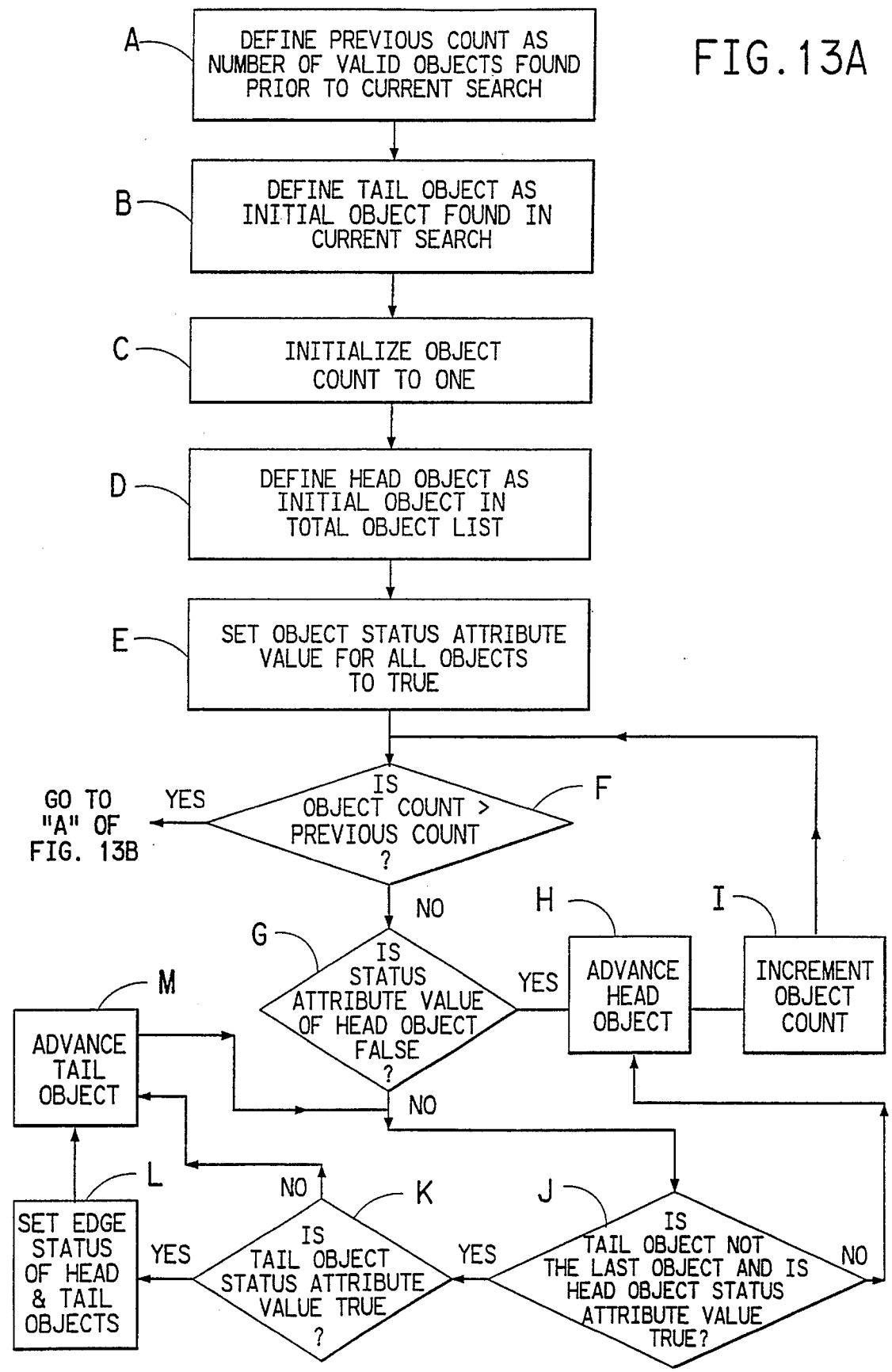
FIGS. 13A–13B comprise a flow chart illustrating the steps of a module CHK LIST which is used to resolve redundancies in homogeneous objects.
Figure 13B:
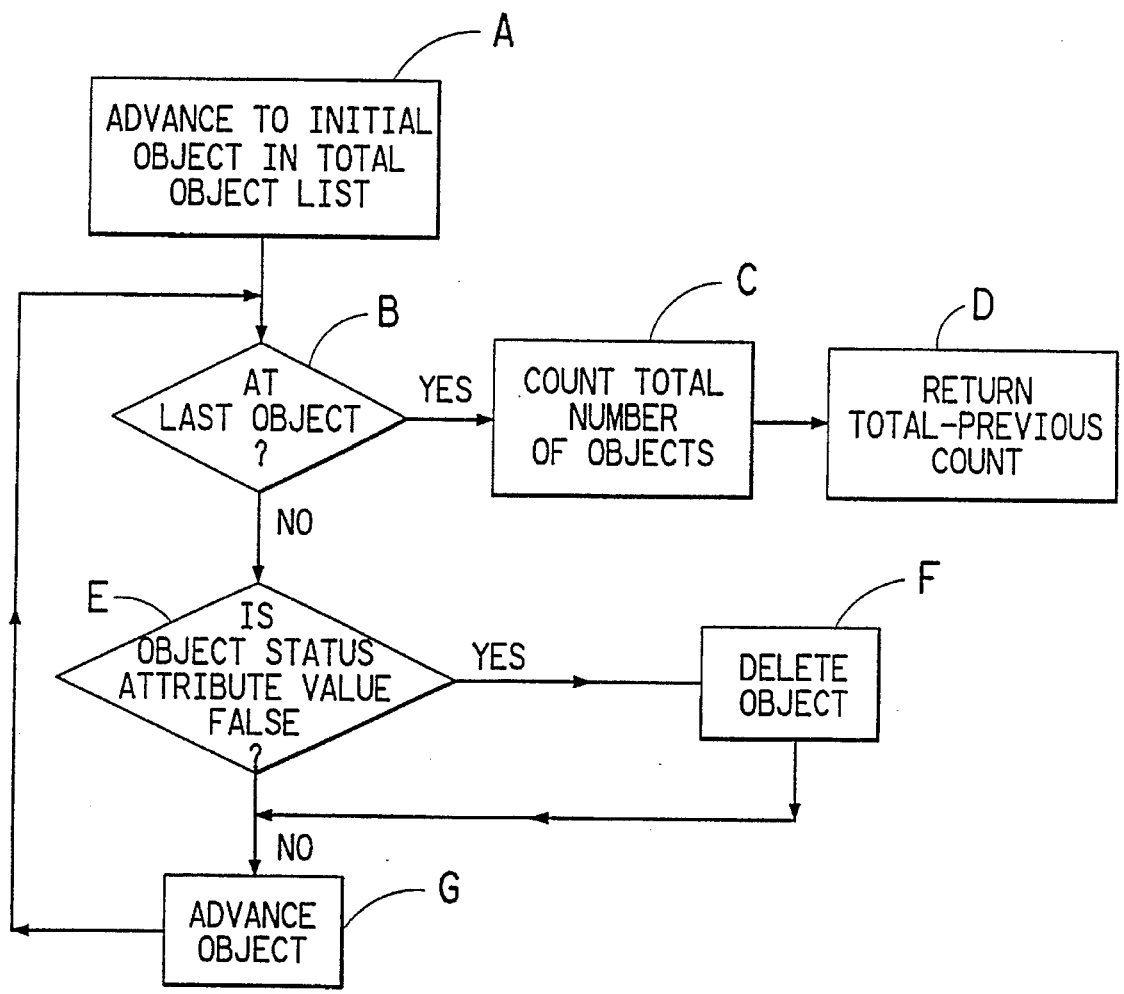

As shown in block A of FIG. 13A, the first step of the CHK LIST module, when run to delete homogenous objects, is to define the previous count as the number of valid objects found prior to the current search. Then the tail object is defined as the initial candidate object found in the current search as shown in block B. The object count is initialized to one as shown in block C, and the head object is defined as the initial object in the total object list as shown in block D. The object status attribute value is then set to true for all objects as shown in block E. Decision diamond F asks whether the object count is greater than the previous count. If the object count is greater than the previous count, CHK LIST advances to the initial object in the total object list as shown in block A of FIG. 13B. Decision diamond B of FIG. 13B asks if CHK LIST is at the last object. If so, the total number of objects is counted as shown in block C, and the difference between the total number of objects and the previous count is returned as shown in block D. If CHK LIST is not at the last object, then decision diamond E asks whether the object status attribute value is false. If so, the object is deleted as shown in block F. If the object status is not false, then object is advanced as shown in block G, and the CHK LIST module asks again whether it is at the last object as shown in decision diamond B. This process continues until CHK LIST reaches the last object, at which point the total number of objects is counted as shown in block C, and the difference between the total number of objects and the previous count is returned as shown in block D.

Returning to decision diamond F in FIG. 13A, if the object count is not greater than the previous count, then decision diamond G of FIG. 13A asks if the status attribute value of the head object is false. If it is, then the head object is advanced as shown in block H, and the count is incremented as shown in block I. Decision diamond F then asks if the incremented object count is greater than the previous count. If so, CHK LIST advances to block A of FIG. 11B as explained above. The loop through G, H and I in FIG. 13A is repeated until the status of the object is not false. Then CHK LIST advances to decision diamond J of FIG. 13A, which asks if the tail object is not the last object and if the head object status attribute value is true. The answer to both these questions must be yes. If not, then CHK LIST advances the head object as shown in block H, and the count is incremented as shown in block I. The loop through F, G, H, I and J is repeated until the tail object is the last object and the head object status attribute value is true. Decision diamond K then asks whether the tail object status attribute value is true. If it is, then the edge status of the head and tail object is set as shown in block L of FIG. 13A and as shown in detail in FIG. 14 by a module SET STAT. CHK LIST then advances the tail object as shown in block M, and the loop through J, K, L and M is repeated. If the tail object status is not true, then CHK LIST advances the tail object as shown in block M, and the loop through J, K and M is repeated.

Figure 14:
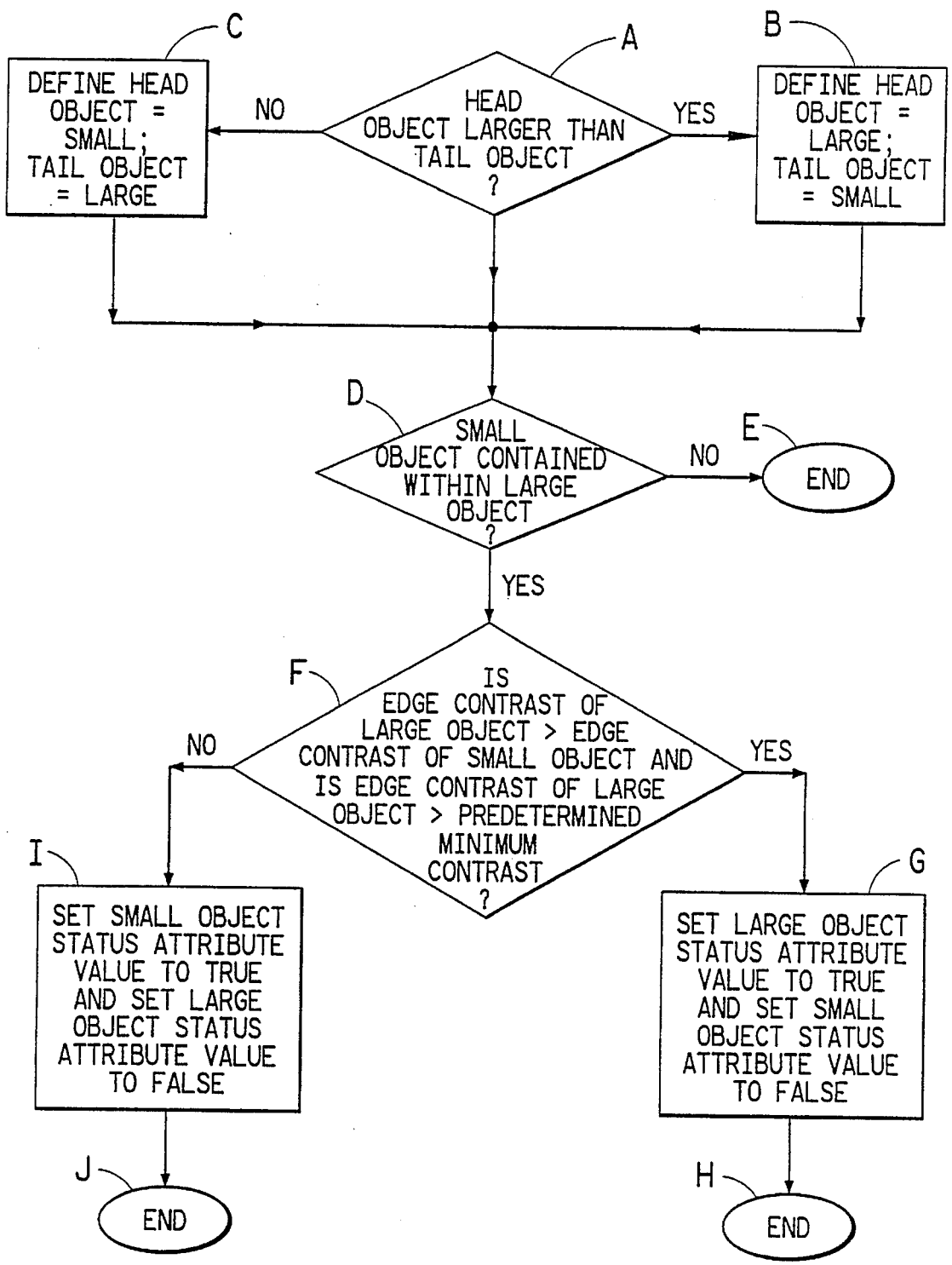
FIG. 14 is a flow chart illustrating the steps of a module SET STAT which is used with the module CHK LIST as shown in FIGS. 13A–13B.

The module SET STAT as shown in FIG. 14 performs the sub-steps of comparing the areas of a plurality of valid objects and designating one of the valid objects as a large valid object and the other of the first and second valid objects as a small valid object and determining whether the small valid object is contained in the large valid object as defined by the four extremum points of the large object for homogeneous objects. As shown in decision diamond A of FIG. 14, the first step of SET STAT is to ask whether the head object is larger than the tail object. If so, the head object is defined as a large valid object, and the tail object is defined as the small valid object as shown in block B. If the head object is not larger than the tail object, then the head object is defined as the small valid object, and the tail object is defined as the large valid object. Decision diamond D of SET STAT then asks whether the small object is contained within the large object. If not, SET STAT stops running as shown by oval E. If the small object is contained within the large object, then decision diamond F asks whether the edge contrast of the large object is greater than the edge contrast of the small object, and whether the edge contrast of the large object is greater than the predetermined minimum edge contrast. If the answer to both of these questions is yes, then the large object status attribute value is set to true, and the small object status attribute value is set to false as indicated by block G, and the module stops running as indicated by oval H. If the answer to at least one of the questions in decision diamond F is no, then the small object status attribute value is set to true, the large object status attribute value is set to false as indicated by block I, and the module stops running as indicated by oval J.

The method of the present invention further includes the step of performing a final check for redundancies of the valid object and resolving the redundancies to prevent multiple identification of the valid object. The final redundancy checking step further includes the sub-steps of comparing the areas of a plurality of valid objects and designating one of the valid objects as a large valid object and the other of the first and second valid objects as a small valid object and removing the large valid object when the small valid object and the large valid object overlap. The final redundancy checking step is performed by a module, FINAL CHK, as illustrated by the flow chart of FIGS. 15A and 15B and a module INT STAT, as illustrated by the flow chart of FIG. 16. The modules FINAL CHK and INT STAT are the same for both homogeneous and inhomogeneous objects, and are thus only illustrated once.

The first step of FINAL CHK is to initialize the object attribute value to true for all objects as shown in block A of FIG. 15A. The counting index for counting valid objects is the initialized to one as shown in block B. The head object is defined as the initial object in a list of status attribute values as illustrated in block C. Decision diamond D then asks whether the counting index is less than the total number of objects.

Figure 15B:
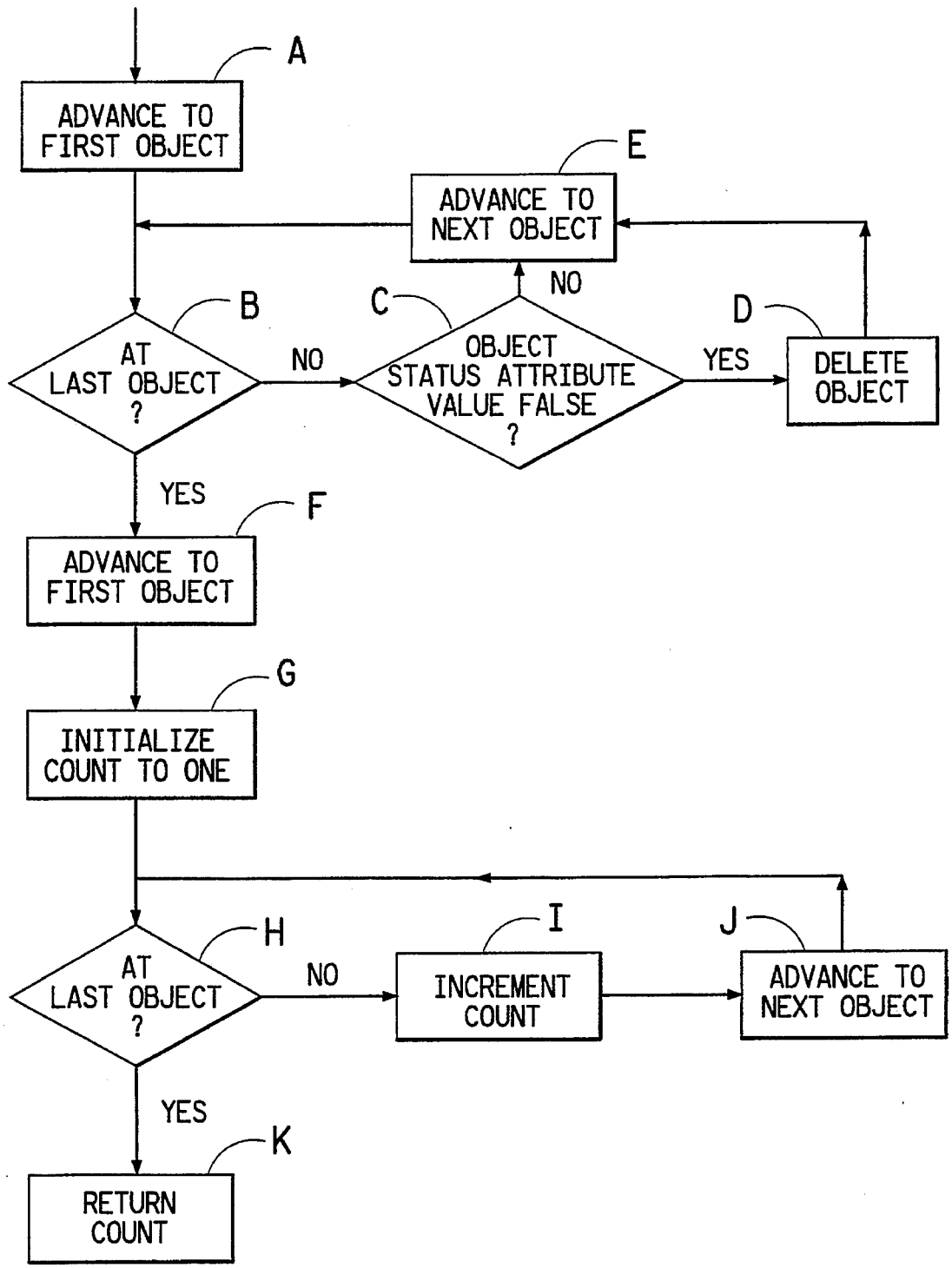

If not, the module FINAL CHK goes to block A of FIG. 15B.

As shown in block A of FIG. 15B, FINAL CHK advances to the first object. Decision diamond B asks whether FINAL CHK is at the last object. If it is not, then decision diamond C asks whether the object status attribute value is false. If not, then FINAL CHK advances to the next object as shown in block E, and decision diamond B again asks whether FINAL CHK is at the last object. The loop through B, C and E continues until FINAL CHK is at the next object. If the object status attribute value is false, then the object is deleted as shown in block D. FINAL CHK then advances to the next object as shown in block E, and decision diamond B asks whether the FINAL CHK at the last object. The loop through B–E continues until the next object is the last object, at which point FINAL CHK advances to the first object as shown in block F. The count is then initialized to one as shown in block G. Decision diamond H then asks whether FINAL CHK is at the last object. If it is not, then the count is incremented as shown in block I, and FINAL CHK advances to the next object is shown in block J. Decision diamond H again asks whether FINAL CHK is the last object, and the loop through H, I and J continues until FINAL CHK is at the last object. Then the total number of valid objects as contained in count is returned as shown by block K of FIG. 15B.

Returning to decision diamond D of FIG. 15A, if the counting index is less than the total number of objects, then the tail object is defined as the next object beyond the head object as shown in block E. Decision diamond F then asks if the status attribute value of the head object is true. If not, the FINAL CHK advances the head object as shown in block G and increments the counting index as shown in block H. FINAL CHK then returns to decision diamond D, and the loop through D–I continues until the status attribute value of the head object is true. Then decision diamond I asks whether the tail object is not the last object and whether the head object status attribute value is true. If at least one of these conditions is not met, then FINAL CHK advances the head object as shown in block G and increments the index as shown in block H. FINAL CHK then returns to decision diamond D, and the loop through D–I continues until the answer to both questions in decision diamond I is yes. Then decision diamond J asks whether the tail object status attribute value is true. If not, FINAL CHK advances the tail object as shown in block L of FIG. 15A, and the loop through I, J and L is repeated until the tail object status attribute value is true. Then FINAL CHK runs a module INT STAT, as shown in block K of FIG. 15A and advances the tail object as shown in block L.

Figure 16:
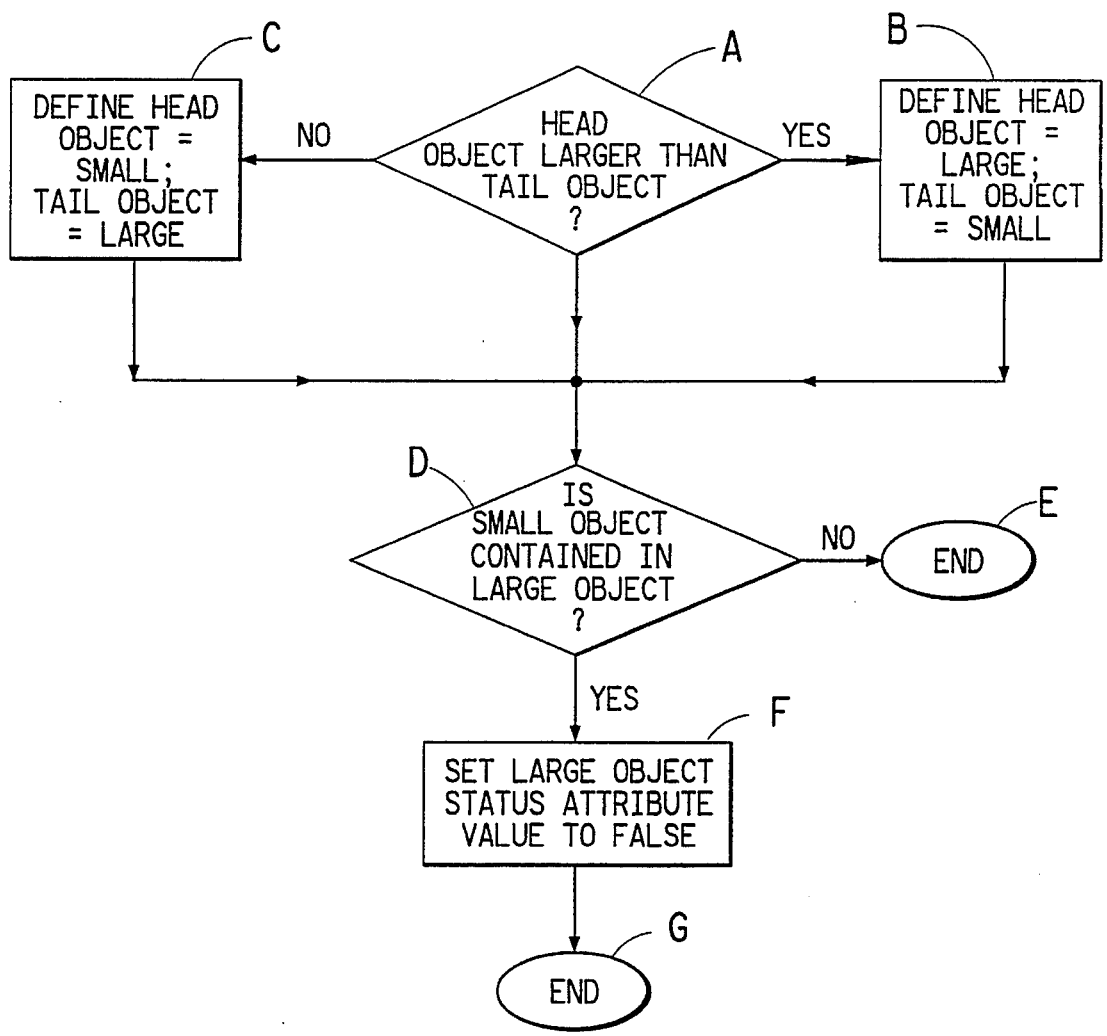
FIG. 16 is a flow chart illustrating the steps of a module INT STAT which is used with the module FINAL CHK as shown in FIGS. 15A–15B.

The steps of the module INT STAT as illustrated in block K of FIG. 15A are shown in detail in FIG. 16. Decision diamond A of FIG. 16 asks whether the head object is larger than the tail object. If so, the head object is defined as the large valid object, and the tail object is defined as the small valid object as shown in block B. If the head object is not larger than the tail object, then the head object is defined as the small valid object, and the tail object is defined as the large valid object as shown in block C. Decision diamond D then asks whether the small valid object is contained in the large valid object. If not, then INT STAT is at its end, as shown by oval E. If the small valid object is contained in the large valid object, then the large object status attribute value is set to false as shown in block F, and INT STAT is at its end as shown by oval G.

The method of the present invention further includes the step of filtering the image. The filtering step is performed either after the method of the present invention is used as a screening process or as a recursive process. The filtering step is performed by a module, CALCON, as shown in general in FIGS. 17A and in detail in FIGS. 17B–D for inhomogeneous valid objects and in FIGS. 18A and 18B for homogeneous valid objects.

The filtering step for filtering inhomogeneous objects comprises three prongs defining certain conditions under which inhomogeneous objects should be deleted. The first prong in the filtering step deletes inhomogeneous objects using a heavy filter when the number of inhomogeneous valid objects retained after the final redundancy check as performed by FINAL CHK as described above is less than or equal to a predetermined minimum number. The second prong deletes inhomogeneous valid objects using a medium filter when the number of retained inhomogeneous valid objects is greater than the predetermined minimum number and less than a predetermined maximum number. The third prong deletes inhomogeneous valid objects using a light filter when the number of retained inhomogeneous valid objects is greater than or equal to the predetermined maximum number. Preferably, the filtering step for deleting inhomogeneous valid objects repeated twice. It is also preferable that the prongs are repeated after the recursive partitioning of the histogram when the method of the present invention is used as a recursive process. However, the prongs may also be repeated after the validation step when the method of the present invention is used as a screening process.

Figure 17A:
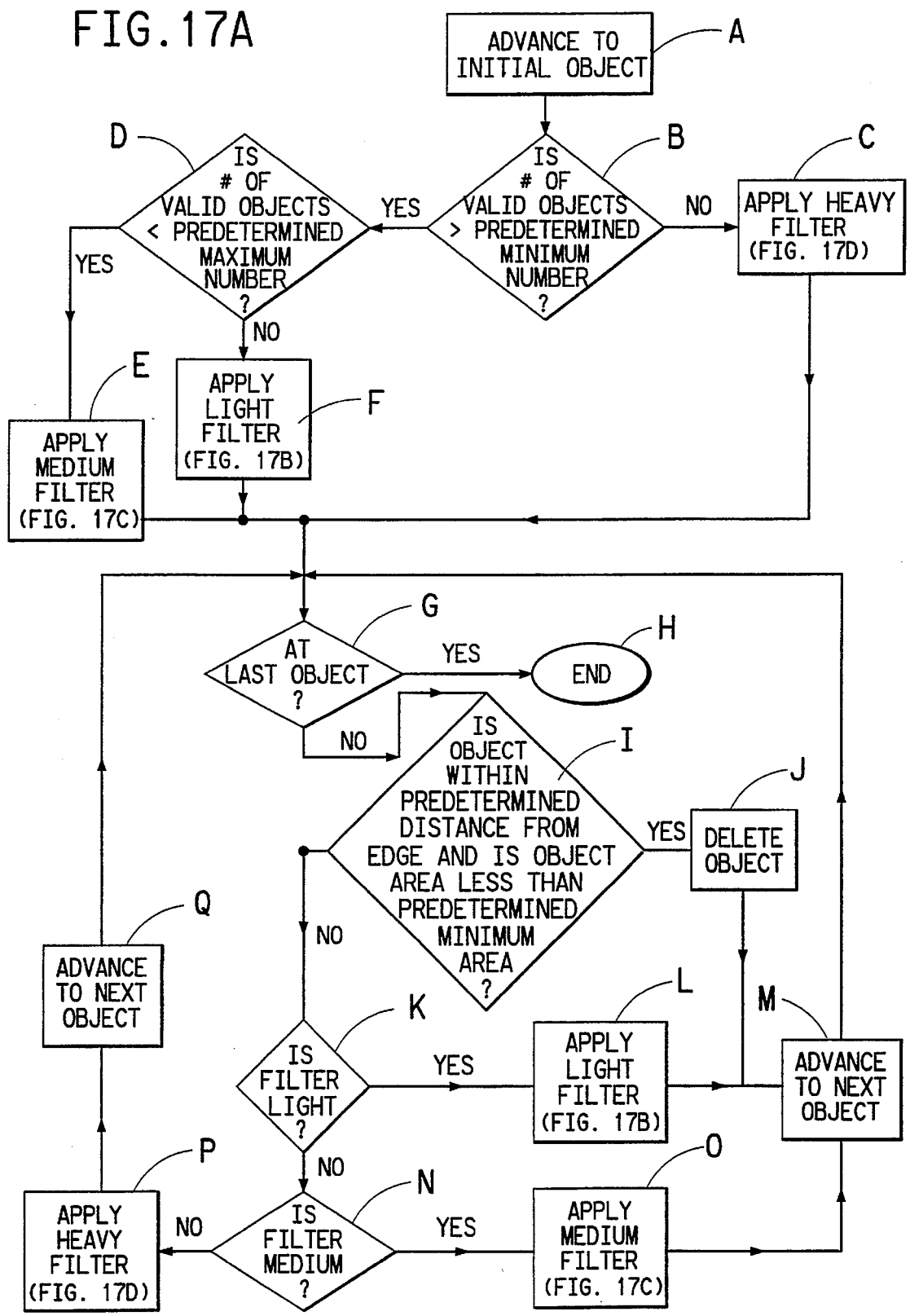
FIG. 17A is a flow chart illustrating the overall steps of a module which is CAl,CON used to filter inhomogeneous objects.

As shown in block A of FIG. 17A, the first step of CALCON for deleting inhomogeneous objects is to advance to the initial object. Decision diamond B then asks whether the number of valid objects is greater than the predetermined minimum number. If not, then a heavy filter is applied as shown in block C. If the number of valid objects is greater than the predetermined minimum number, then decision diamond D asks whether the number of valid objects is less than a predetermined maximum number. If it is, then a medium filter is applied as shown in block E. If it is not, then a light filter is applied as shown in block F. Decision diamond G then asks whether CALCON is at the last object. If it is, then the module stops running as shown at oval H. If it is not, then decision diamond I asks whether the object is within a predetermined minimum pixel distance from the edge of the image boundary and whether the area is less than a predetermined minimum area. If the answer to both these questions is yes, the object is deleted as shown in block J of FIG. 17A, and the object is advanced to the next object as shown in block M. Decision diamond G then asks whether CALCON is at the last object. The loop through G–M continues until the answer to at least one of the questions in I is no. If the answer to at least one of these questions is no, then decision diamond K asks whether the filter is light. If so, then a light filter is applied as shown in block L and in detail in FIG. 17B. CALCON then advances to the next object as shown in block M, and the loop through G, I, J, K, L and M continues until the filter is not light. Then decision diamond N asks whether the filter is medium. If so, then a medium filter is applied as shown in block O of FIG. 17A and in detail in FIG. 17C. CALCON then advances to the next object as shown in block M, and the loop through G, I, J, K, N, O and M continues until the filter is not medium. A heavy filter is then applied as shown in block P, and in detail in FIG. 17D. CALCON then advances to the next object as shown in block Q. The loop through G, I, J, K, N, P and Q continues until CALCON is at the last object as asked in decision diamond G. At this point, the module stops running as shown by oval H.

Figure 17B:
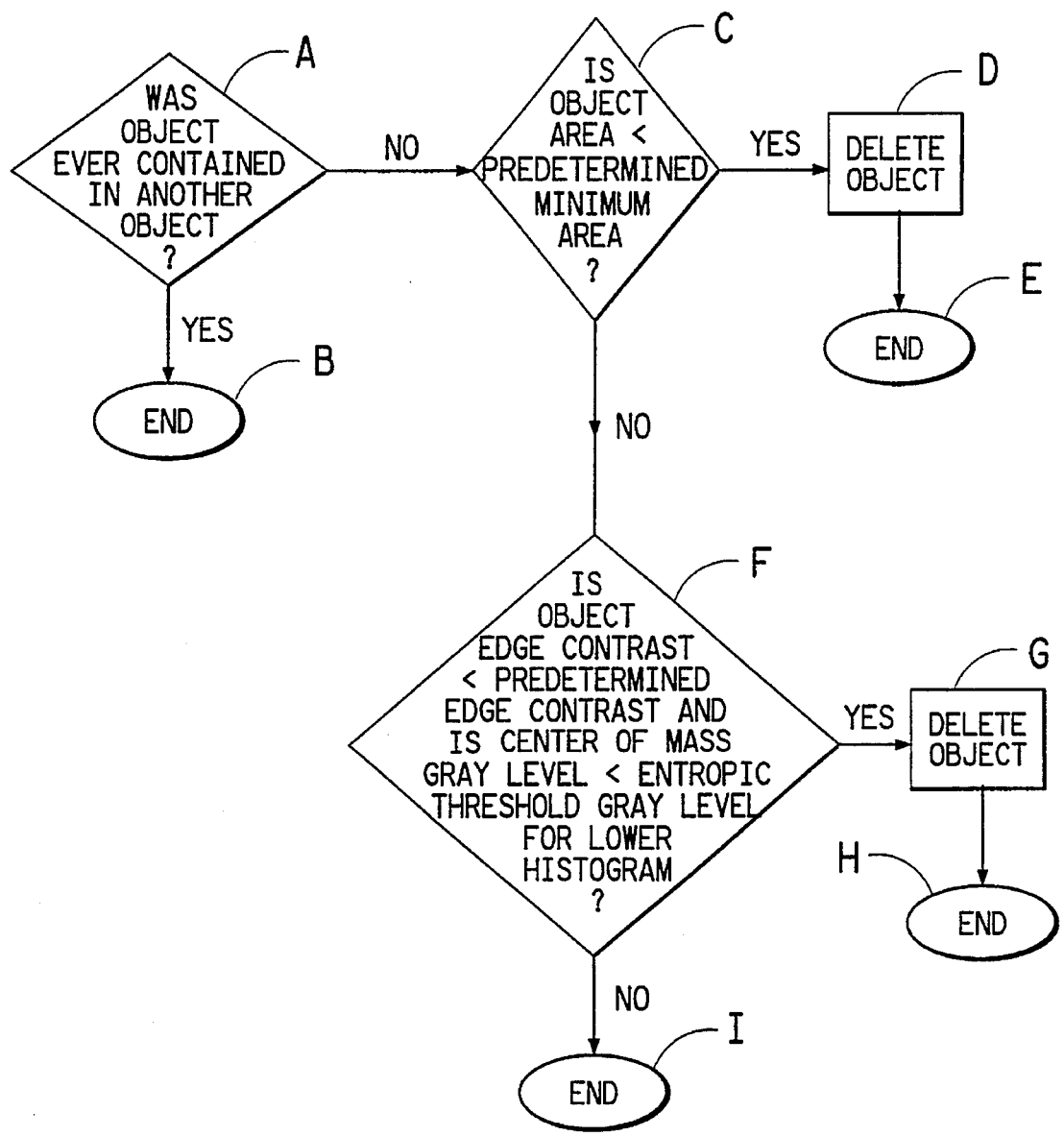
FIG. 17B is a flow chart illustrating the steps of the part of CALCON as shown in FIG. 17A which applies a heavy filter.

An inhomogeneous object is deleted using a light filter when the inhomogeneous object meets certain criteria as illustrated in FIG. 17B. Decision diamond A asks whether the object was ever contained in another object. If so, the module stops running as shown at END oval B. If the object was never contained in another object, then decision diamond C asks whether the inhomogeneous object area is less than the predetermined minimum area. If so, the object is deleted as shown by block D, and the module stops running as indicated by END oval E. If the inhomogeneous object area is not less than the predetermined minimum area, then decision diamond F asks whether the object edge contrast is less than the predetermined minimum edge contrast and whether the center of mass gray level is less than the entropic gray level for the lower histogram as defined by the recursive process. If the answer to both these question is yes, the object is deleted as shown by block G. If the answer to at least one of the questions in diamond G is no, then the module stops running as shown by END oval I.

An inhomogeneous object is deleted using a medium filter when the inhomogeneous object meets certain criteria as illustrated in FIG. 17C. Decision diamond A of FIG. 17C asks whether the object was ever contained within another object. If not, then decision diamond B asks whether the inhomogeneous valid object area is less than the predetermined minimum area. If so, the object is deleted as shown in block C, and the module stops running as indicated by END oval D. If the object area is not less than the inhomogeneous object minimum area, then decision diamond E asks whether the object edge contrast is less than the predetermined minimum edge contrast and whether the center of mass gray level is less than the original entropic threshold gray level. If the answer to both these questions is yes, then the object is deleted as shown in block F, and the module stops running as indicated by the END oval G. If the answer to at least one of these questions is no, the module stops running as indicated by the END oval H. Returning to decision diamond A, if the object was previously contained in another object, then decision diamond I asks whether the inhomogeneous object edge contrast is less than the predetermined minimum edge contrast, whether the inhomogeneous object center of mass gray level is less than the original entropic threshold gray level and whether the inhomogeneous object area is less than the predetermined minimum area. If the answer to all these questions is yes, the object is deleted as shown in block J and the module stops running as shown by END oval K. If the answer to at least one of these questions is no, the module stops running as shown by END oval K.

Figure 17D:
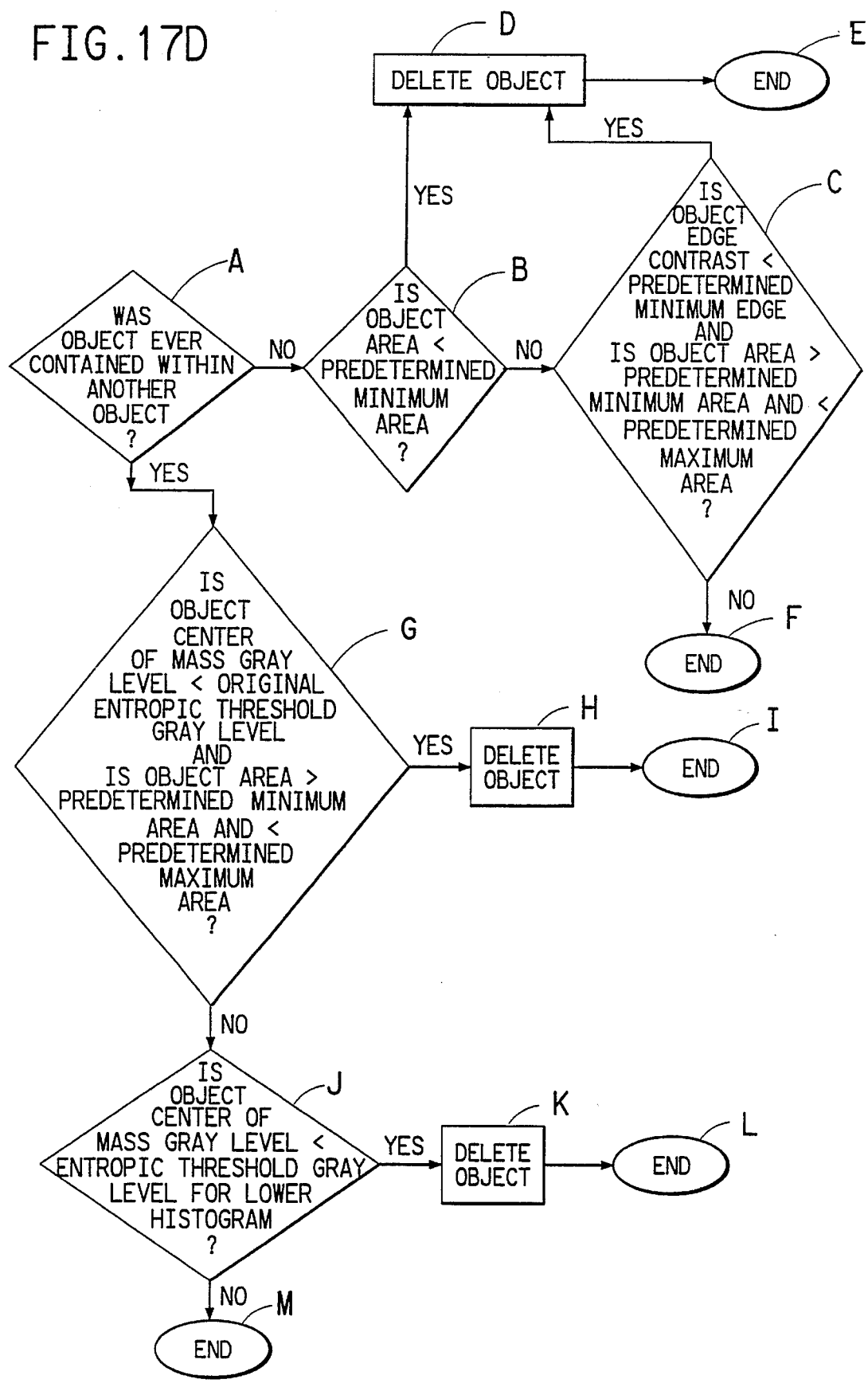
FIG. 17D is a flow chart illustrating the steps of the part of CALCON as shown in FIG. 17A which applies a light filter.

An inhomogeneous object is deleted using a heavy filter when the inhomogeneous object meets certain criteria as illustrated in FIG. 17D. Decision diamond A of FIG. 17D asks whether the object was ever contained within another object. If it was not, then decision diamond B asks whether the inhomogeneous valid object has an area less than a predetermined minimum area. If the answer to this question is yes, the object is deleted as shown in block D. If not, then decision diamond C asks whether the inhomogeneous valid object has an edge contrast greater than a predetermined minimum edge contrast and an area greater than a predetermined minimum area and less than a predetermined maximum area. If so, the object is deleted as shown in block D, and the module stops running. If not, then the module stops running, as indicated by the END oval F. If the inhomogeneous valid object was previously contained within another object, then decision diamond G asks whether the inhomogeneous object center of mass gray level is less than the original entropic threshold gray level and whether the area of the object is greater than the predetermined minimum area and less than the predetermined maximum area. If the answer to both these questions is yes, the object is deleted as shown in block H, and the module stops running as indicated by END oval I. If the answer to at least one of these questions is no, then decision diamond J asks whether the inhomogeneous object center of mass gray level is less than the entropic threshold gray level for the lower histogram as defined by the recursive process. If so, the object is deleted as shown in block K, and the module stops running as indicated by the END oval L. If not, then the module stops running as indicated by END oval M.

Figure 18A:
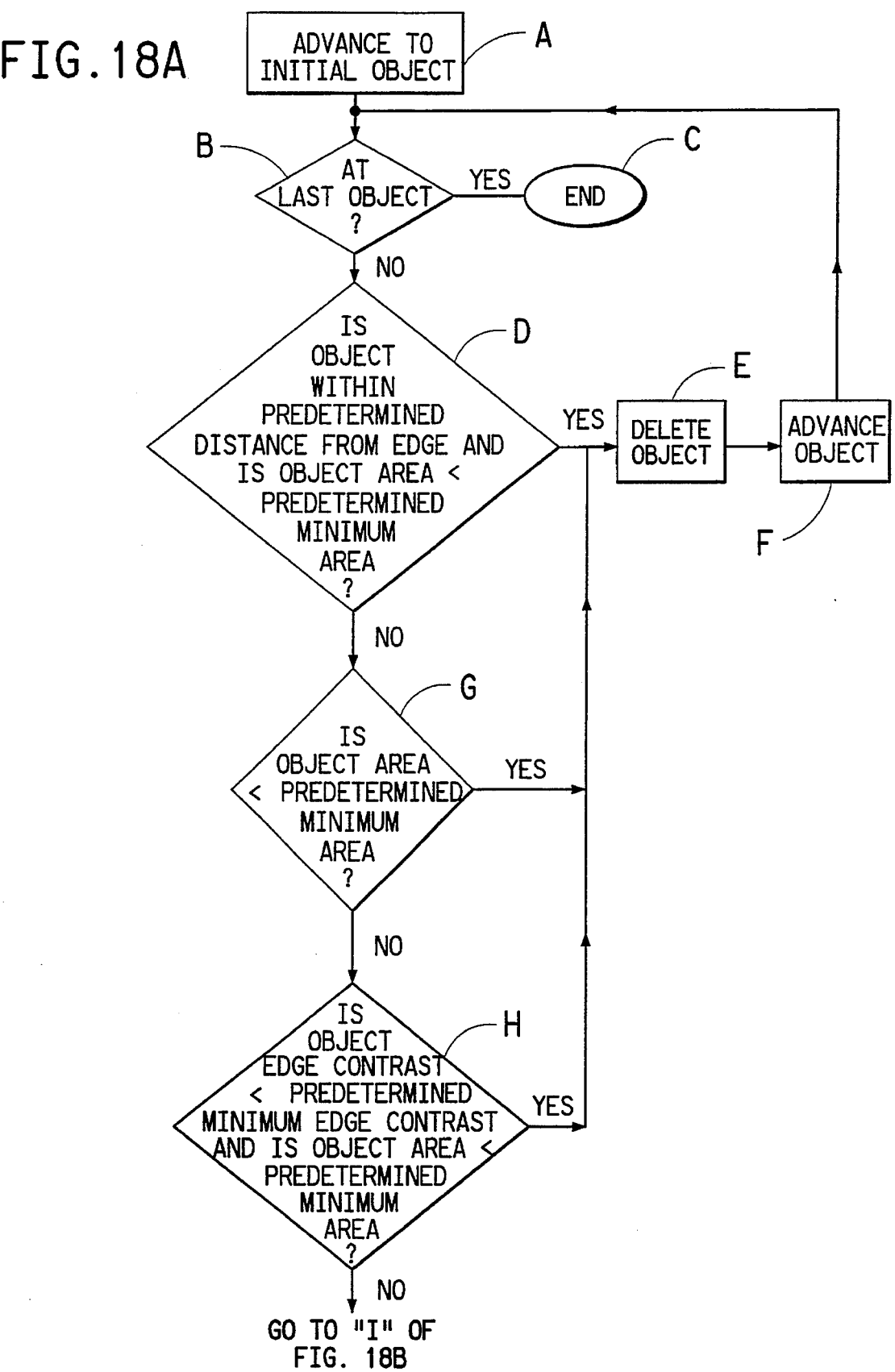
FIGS. 18A–18B comprise a flow chart illustrating the steps of a module CALCON used to filter homogeneous objects.
Figure 18B:
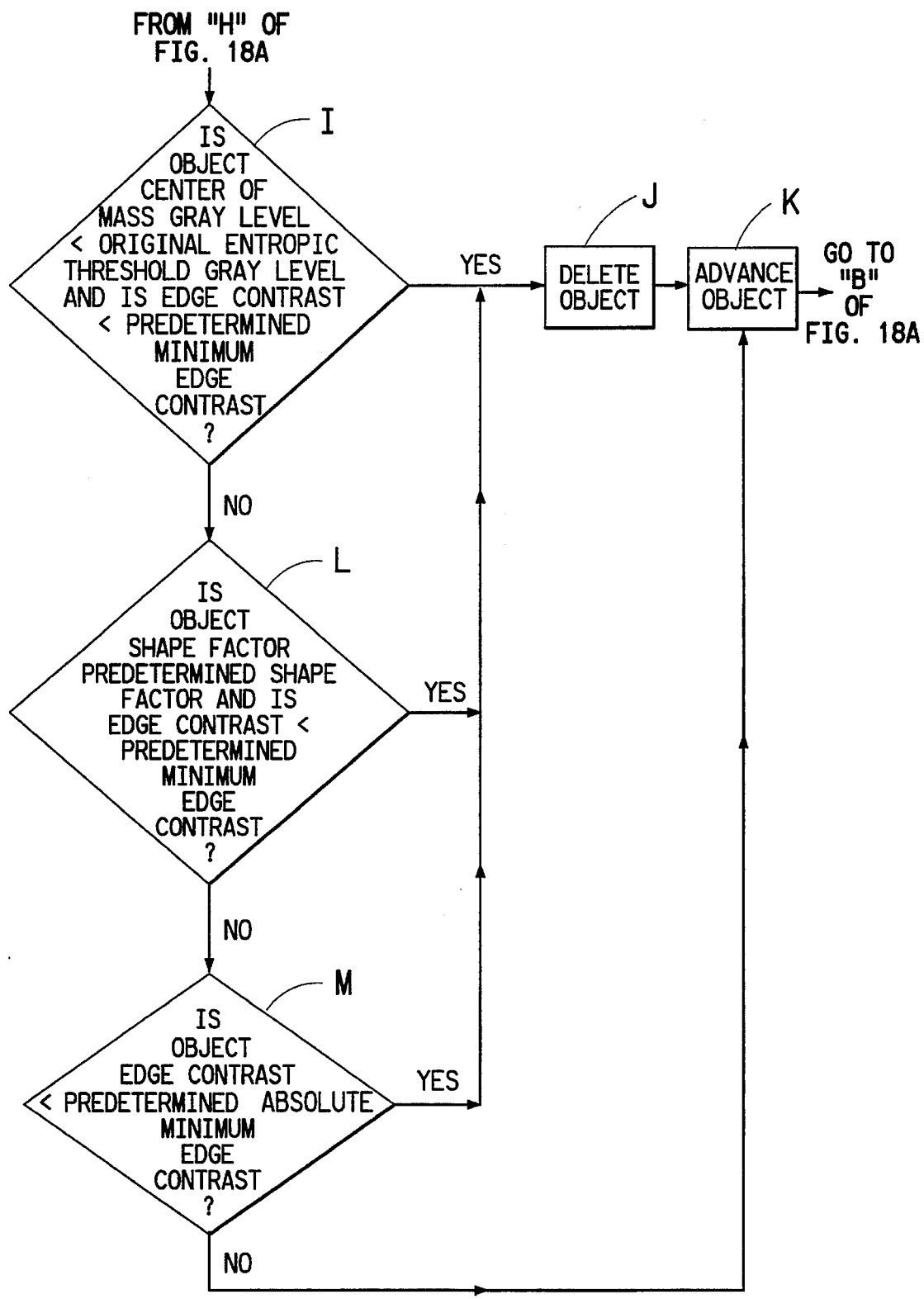

The steps for running CALCON to filter homogeneous objects are shown in the flow charts of FIGS. 18A and 18B. As shown in block A of FIG. 18A, the first step of CALCON for filtering homogeneous objects is to advance to the first object. Decision diamond B then asks whether CALCON is at the last object. If so, CALCON is finished as indicated by END oval C. If not, decision diamond D asks whether the homogenous valid object is within a predetermined minimum pixel distance from the edge of the image boundary and whether the homogeneous valid object has an area less than the predetermined minimum area. If the answer to both these questions is yes, then the homogeneous object is deleted as shown in block E, and CALCON advances the object as shown in block F. Decision diamond B asks whether the advanced object is the next object, and the loop through B–F continues until at least one of the conditions in decision diamond D is not met. Then decision diamond G asks whether the homogeneous object area is less than the predetermined minimum area. If it is, then the object is deleted as shown in block E, and the loop through B–G continues until the homogenous object area is not less the predetermined minimum area. Then, decision diamond H asks whether the homogenous object has an edge contrast less than the predetermined minimum edge contrast and whether the homogeneous object area is less than the predetermined minimum area. If the answer to both these questions is yes, the object is deleted as shown in block E, and CALCON advances the object as shown in block F. The loop through B–H continues until the answer to one of the questions in decision diamond H is no.

Then decision diamond I of FIG. 18B asks whether the homogeneous object center of mass gray level is less than the original entropic threshold gray level and whether the edge contrast of the homogeneous object is less than the predetermined minimum edge contrast. If the answer to both these questions is yes, then the object is deleted as shown in block J. CALCON then advances the object as shown in block K, and the loop through B–I continues until the answer to at least one of the questions in decision diamond I is no. Then decision diamond L asks whether the shape factor of the homogenous object is less than a predetermined shape factor and whether the edge contrast of the homogeneous object is less than the predetermined minimum edge contrast. If the answer to both these questions is yes, then the object is deleted as shown in block J. The loop through B–L continues until the answer to at least one of the questions in decision diamond L is no. Then decision diamond M asks whether the edge contrast of the homogeneous object is less than an absolute predetermined minimum edge contrast. If it is, then the object is deleted as shown in block J, and CALCON advances the object. The loop through B–M continues until the object edge contrast is not less than the absolute predetermined minimum edge contrast. At this point, CALCON advances the object until it is at the last object, and the module stops running as shown by END oval C.

The image examined by the method of the present invention may comprise at least one isolated valid object and at least one candidate clump of valid objects. An isolated valid object is identified by its degree of circularity. The candidate clump of valid objects has an area greater than the mean area of the isolated valid objects and a shape factor less than a predetermined clump shape factor. The method of the present invention further includes the steps of identifying the candidate clump of inhomogeneous valid objects and determining the number of inhomogeneous valid objects in the candidate clump. Unclumping of homogeneous valid objects is inherent in the recursive process of the first embodiment of the present invention.

A module, UNCLUMP, is used to identify the candidate clump and determine the number of valid objects in the candidate clump. The steps of UNCLUMP are shown in the flow charts of FIGS. 19A and 19B and FIGS. 20A and 20B. As shown in block A of FIG. 19A, the first step of UNCLUMP is to advance to the initial object. Decision diamond B then asks whether UNCLUMP is at the last object. If not, then decision diamond C asks whether the object shape factor is greater than the predetermined clump shape factor. If it is, then the object is added to the list of isolated objects as shown in block D, and the count is incremented as shown in block E. UNCLUMP advances to the next object as shown in block F. UNCLUMP then returns to decision diamond B, and the loop through B–F continues until the object shape factor is not greater than the predetermined clump shape factor. UNCLUMP then advances to the next object as shown in block F. UNCLUMP then returns to decision diamond B, and the loop through B, C and F continues until UNCLUMP is at the last object.

Figure 19A:
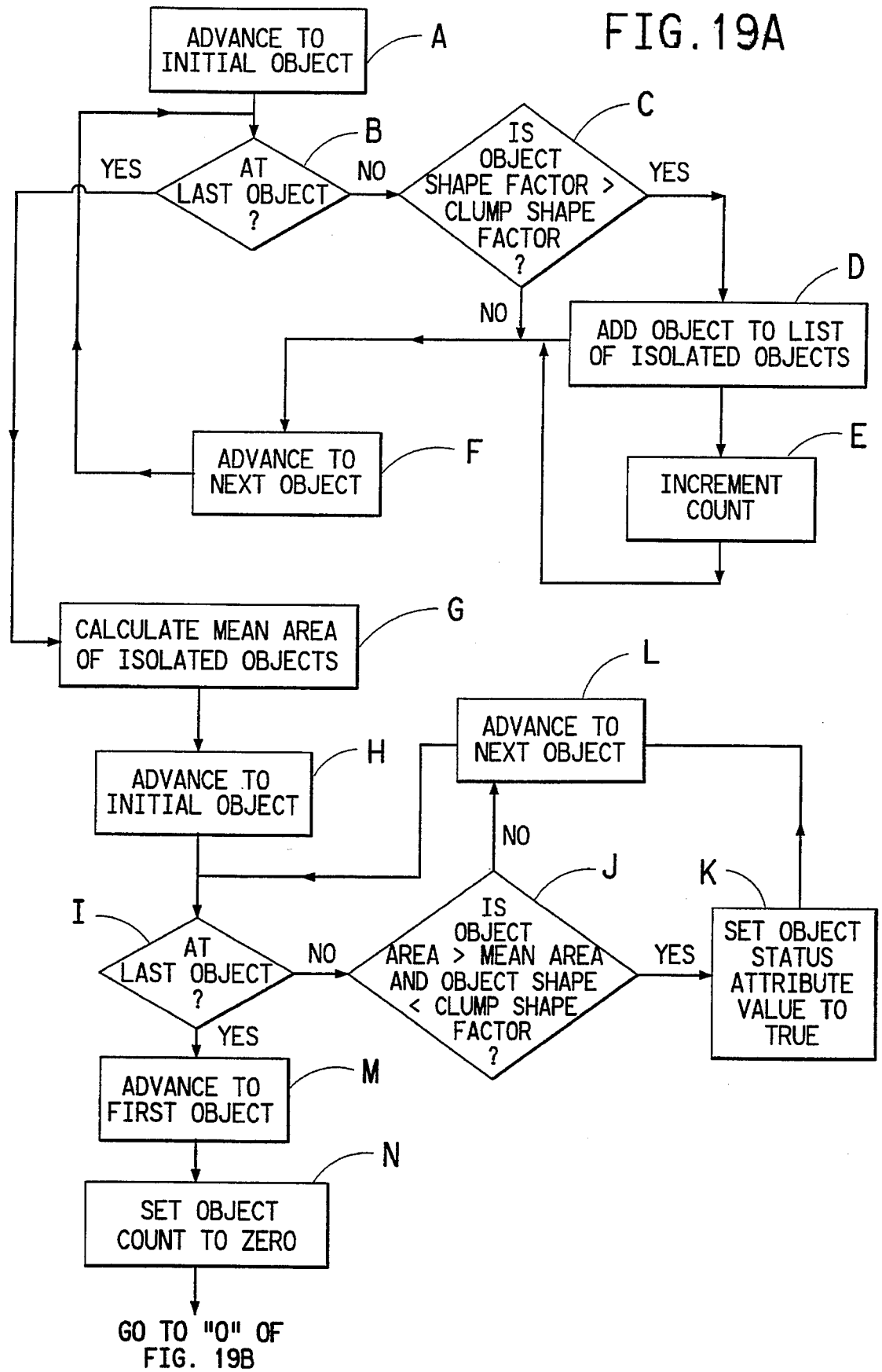
FIGS. 19A–19B comprise a flow chart illustrating the steps of a module UNCLUMP which is used to unclump inhomogeneous objects.

When UNCLUMP reaches the last object, the mean object area of the isolated objects is calculated as shown in block G of FIG. 19A. UNCLUMP then advances to the first object as shown in block H, and decision diamond I asks whether UNCLUMP is at the last object. If it is not, then decision diamond J asks whether the object area is greater than the mean object area and whether the object shape factor is less than the predetermined clump shape factor. If the answer to both these questions is yes, then the object status attribute value is set to true as shown in block K, and UNCLUMP advances to the next object as shown in block L. The loop through I–L continues until UNCLUMP is at the last object. UNCLUMP then advances the first object as shown in block M, and the object counter is set to zero as shown in block N of FIG. 19A.

Figure 19B:
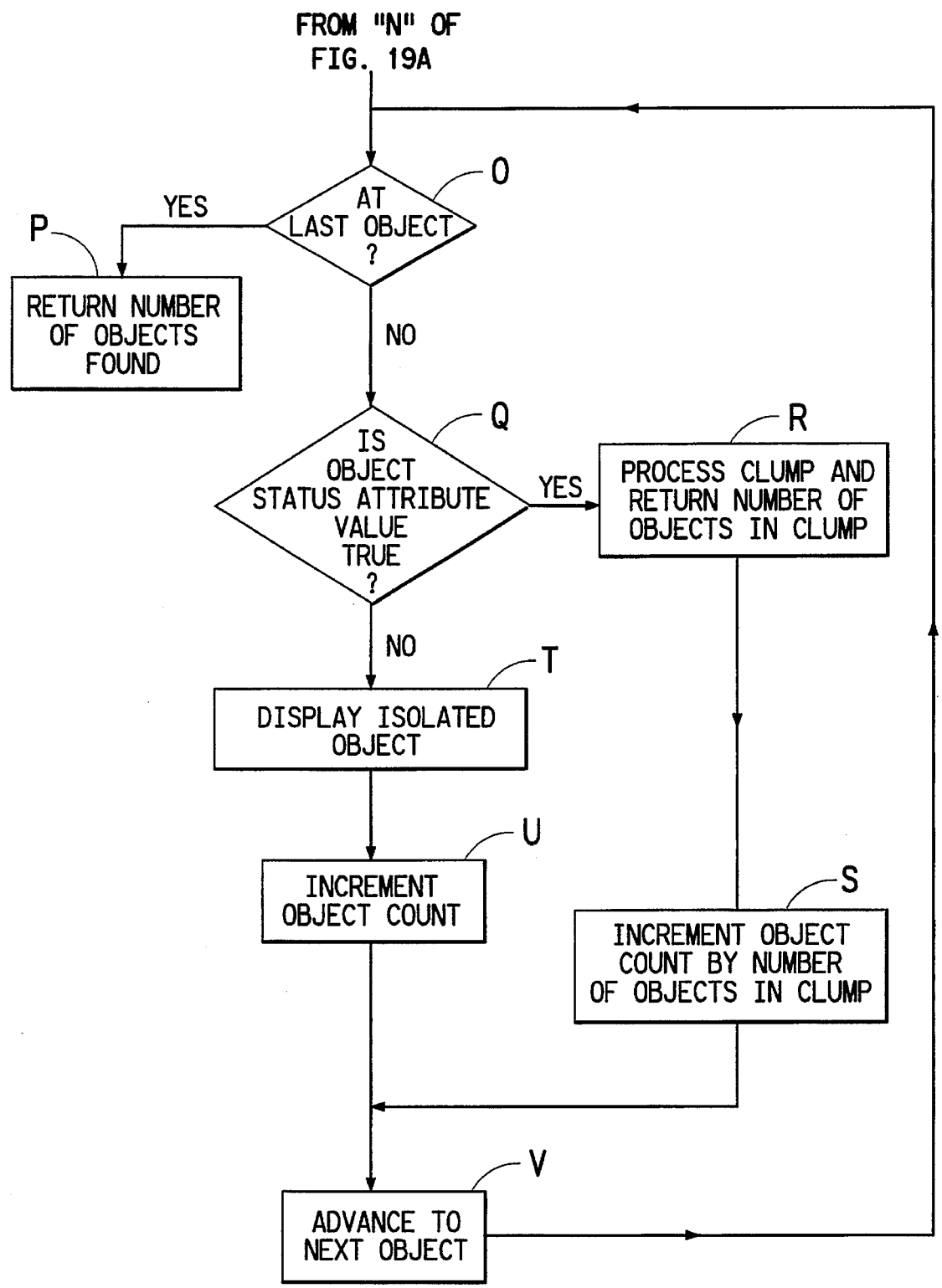

UNCLUMP then goes to decision diamond O as shown in FIG. 19B, which asks whether it is at the last object. If it is, then the number of objects found is returned as shown in block P. If UNCLUMP is not at the last object, then decision diamond Q asks whether the object status attribute value is true. If the value is true, then UNCLUMP processes the clump by incorporating a module, PROCESS CLUMP, and returns the number of objects in the clump as shown in block R. The steps of PROCESS CLUMP are illustrated in the flow chart of FIGS. 20A and 20B. The count is incremented by the number of objects in the clump as shown in block S. If the object status attribute value is not true, then the isolated object is displayed as shown by block T. The count is incremented as shown by block U, and UNCLUMP advances to the next object as shown by block V. UNCLUMP then returns to decision diamond 0. The loop through O–V continues until UNCLUMP is at the last object, at which point the number of objects found is returned as shown in block P.

Figure 20A:
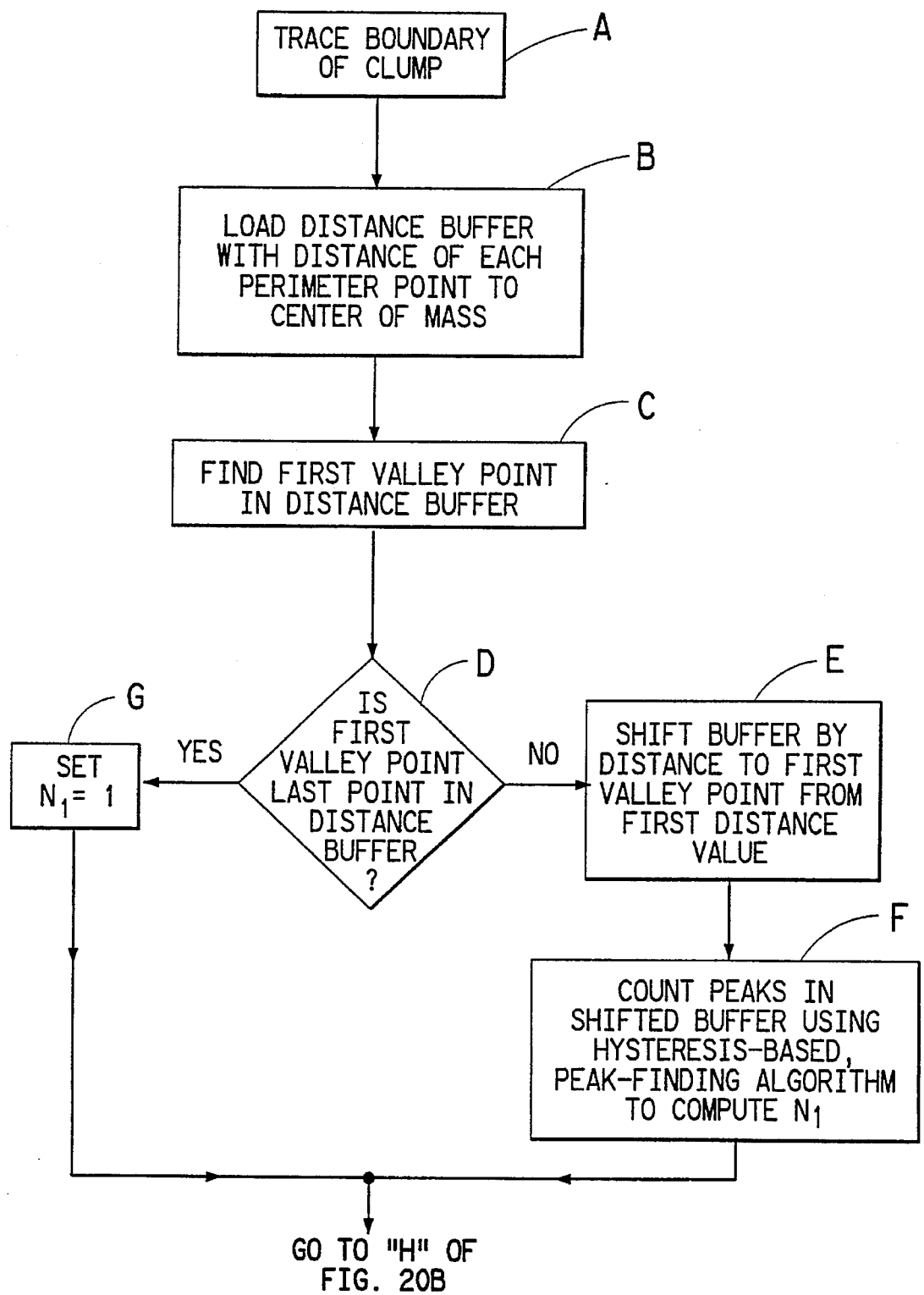
FIGS. 20A–20B comprise a flow chart illustrating the steps of a module PROCESS CLUMP which is used to process a clump of inhomogeneous objects.
Figure 21A:
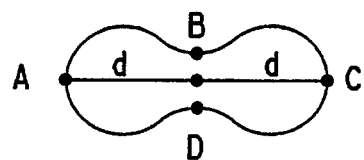
FIG. 21A is an outline of a candidate clump.

The first step in PROCESS CLUMP is to trace the boundary of the clump as shown in block A of FIG. 20A. An outline of a candidate clump is illustrated in FIG. 21A.

Figure 21B:
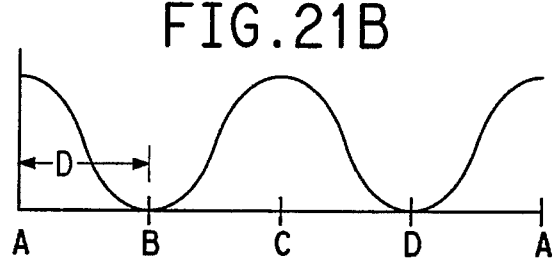
FIG. 21B is a distance buffer comprising a plurality of distance values representing the distance of each perimeter point of the candidate clump to the center of mass of the candidate clump shown in FIG. 21A.

Perimeter points are shown at A, B, C and D, where A and C are spaced a maximum distance, d, from the center of mass of the clump. A distance buffer as shown in FIG. 21B is then created. The distance buffer comprises a plurality of distance values representing the distance of each perimeter point of the candidate clump to the center of mass of the candidate clump. The distance buffer includes a plurality of valleys and peaks as shown in FIG. 21B. The distance buffer is searched for a first valley, $V_1$, as shown in block C of FIG. 20A using a hysteresis-based, valley-finding algorithm.

A hysteresis-based, peak-finding algorithm is an algorithm known to one skilled in the art to identify the peak values in a set of data where there may be fluctuations in the values of the data points. To ensure that spurious peaks are not found in the data set, a hysteresis "window" is defined with a certain width of values. For a peak to be counted as a true peak, two conditions must be satisfied: (a) the value of the peak data point must be at least one window width above values of points prior to the peak; and (b) the value of data points subsequent to the peak must fall at least one window width below the peak value before they start to rise. This ensures that small ripples in the data with amplitudes less than the window width are not included as peaks. A hysteresis-based, valley-finding algorithm is the same as the hysteresis-based, peak-finding algorithm, with the only difference being that the data set is initially inverted prior to analysis. Inverting the data set converts the original valleys into peaks, and the original peaks into valleys. This allows one to use the hysteresis-based, peak-finding algorithm described above to find the original valleys. In the present invention, the window width was scaled to 10% of the difference in values between the maximum data point and the minimum data point. For data where this difference was very small, the window width was scaled to 75% of the difference.

Decision diamond D as shown in FIG. 20A asks whether the first valley point is the last point in the distance buffer. If not, the distance buffer is shifted by a distance, D, as shown by block E of FIG. 20A. Distance D is shown in FIGS. 21B and 21C and is equal to the distance to the first valley from a first distance value as defined by a first predetermined point on the perimeter of the candidate clump. The values at the start of the distance buffer are wrapped around to the end of the buffer. The number of peaks in the shifted buffer is then counted as using the hysteresis-based, peak-finding algorithm as shown in block F to calculate a first value, $N_1$, for the number of valid objects in the clump, and PROCESS CLUMP advances to block H of FIG. 20B. First value, $N_1$, is calculated according to the following formula:

$$N_1 = (\#\text{of peaks}/2) + 1 \quad (11)$$

The number of peaks in the distance buffer is divided by two to obtain a result which comprises an integer and a fractional value. The result is rounded up to the next higher integer and one is added to the next higher integer. If the first valley point is the last point in the distance buffer, then first value $N_1$ is set to one as shown in block G of FIG. 20A, and PROCESS CLUMP advances to block H of FIG. 20B.

The number of valid objects in a candidate clump is also calculated by a second method which uses the mean area of the isolated valid objects. This step is shown in block H of FIG. 20B. According to the second method, the area of the candidate clump is calculated. The area of the candidate clump is then divided by the mean area of the isolated valid object to calculate a second value, $N_2$, for the number of valid objects in the clump. The ratio $N_2$ determines the number of isolated colonies which can "fit in" the clump.

$$N_2 = \frac{\text{Area of clump}}{\text{Mean area of isolated valid object}} \quad (12)$$

To account for backgrounds where the valid object distribution for isolated valid objects can vary greatly, the number of valid objects in a clump is calculated according to a third method. This step is shown in block I of the flow chart of FIG. 20B. According to the third method, the area of a candidate clump is calculated. The area is then divided by the mean area of the isolated valid objects minus one-half the standard deviation of the mean area of the isolated valid object to give a third value, $N_3$, for the number of valid objects in the clump.

$$N_3 = \frac{\text{Area of clump}}{\text{Mean area isolated object} - 0.5 \,(\text{std. dev. of area of isolated object})} \quad (13)$$

The average value of second and third values, $N_2$ and $N_3$ is then computed. The average value is compared to first value $N_1$ as shown in decision diamond J. If first value $N_1$ is greater than three, or if the average of $N_2$ and $N_3$ is greater than $N_1$, the average value is selected as the number of valid objects in the candidate clump as shown by block K. Otherwise, the first value is selected as the number of valid objects in the candidate clump as shown by block L.

Figure 20B:
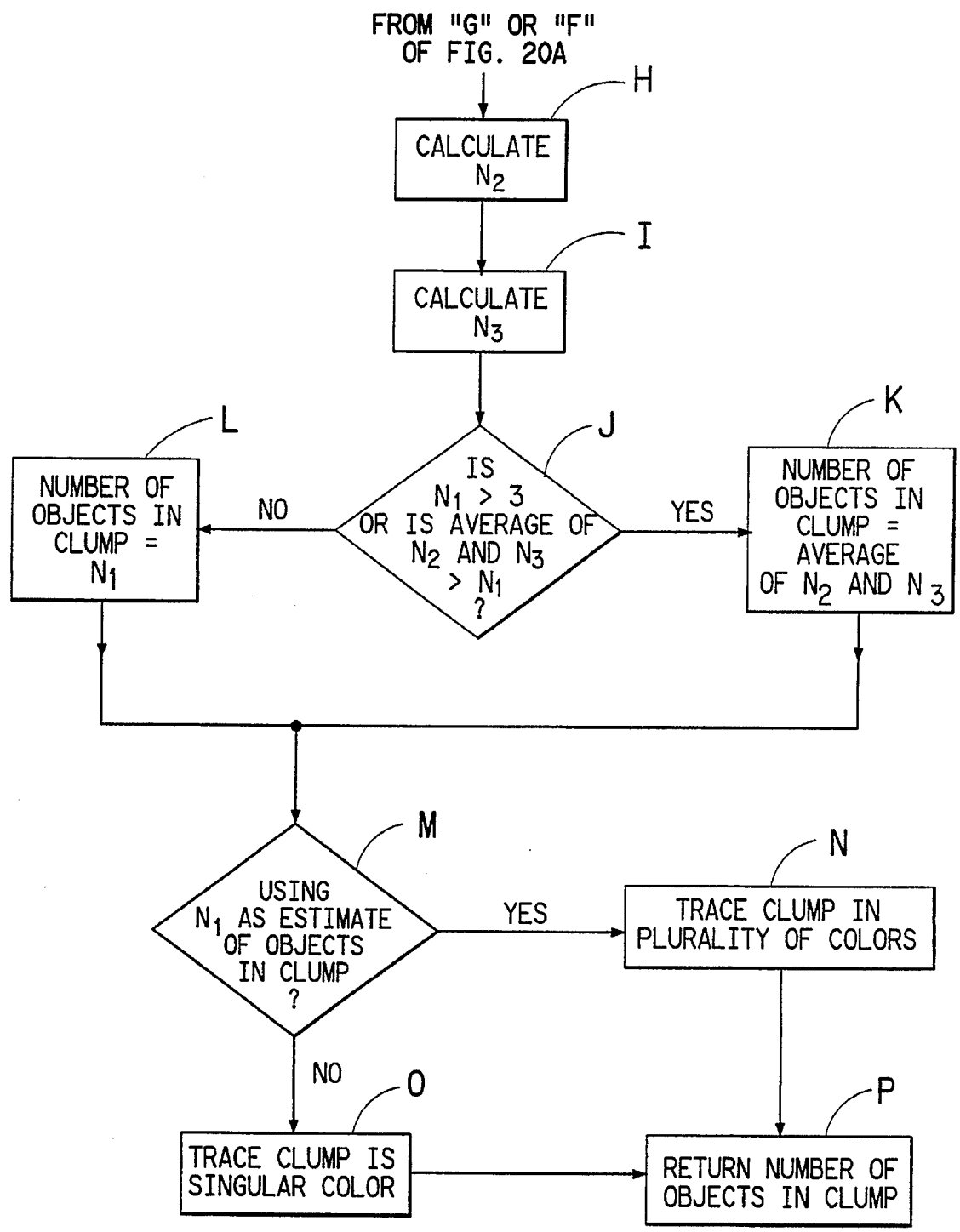
Figure 21C:
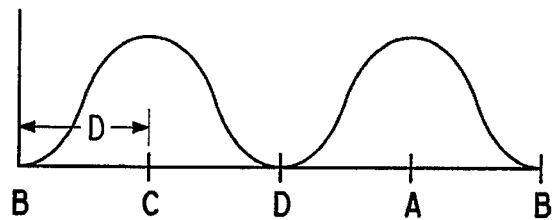
FIG. 21C is the distance buffer shown in FIG. 21B which has been shifted by a distance.

Decision diamond M of FIG. 20B asks whether PROCESS CLUMP is using first value $N_1$ as an estimate of the number of valid objects in the clump. If it is not, then the clump is traced in a singular color indicative of the number of valid objects in the candidate clump as shown in block O. PROCESS CLUMP then returns the number of valid objects in the clump as shown in block P. If PROCESS CLUMP uses first value $N_1$ as an estimate of the number of valid objects in the candidate clump, then the clump is traced in a plurality of colors as shown in block N of FIG. 20B. The colors used for tracing are indicative of the number of valid objects in the clump, where all the points of the perimeter of the clump between the adjacent valleys on the distance buffer are traced in the same color. UNCLUMP then returns the number of valid objects in the clump as shown in block P.

As an alternative to the method described above, any one of the three methods may be used individually to determine the number of valid objects in a clump.

The present invention further includes a first, second and third method of determining the number of clumped homogeneous valid objects in a background comprising at least one clump of homogeneous valid objects and at least one isolated homogeneous valid object, where the isolated valid object is identified by its degree of circularity. According to the three methods, at least one candidate clump is identified, where the candidate clump has an area greater than the mean area of the isolated valid objects and a shape factor less than a predetermined clump shape factor. The steps for determining the number of clumped homogeneous valid objects in a background are the same as those shown in FIGS. 19A and 19B and 20A and 20B.

Further in accordance with the first method of determining the number of clumped homogeneous valid objects of the present invention, a distance buffer is created as discussed above. The distance buffer comprises a plurality of distance values representing the distance of each perimeter point of the candidate clump to the center of mass of the candidate clump. The distance buffer includes a plurality of valleys and peaks as shown in FIG. 21B and 21C. The distance buffer is searched for a first valley, V1, using a hysteresis-based, valley-finding algorithm as described above. The distance buffer is then shifted by a distance, D, equal to the distance to the first valley from a first distance value as defined by a first predetermined point on the perimeter of the candidate clump. The distance values at the start of the buffer are wrapped around to the end of the buffer. As in the above-described method, the number of peaks is then counted in the shifted buffer using a hysteresis-based, peak-finding algorithm to calculate a value, $N_1$, for the number of valid objects in the clump. The first value, $N_1$, is calculated according to equation (11) as set forth above.

In accordance with the second method of determining the number of clumped valid objects in a background, the number of valid objects is also calculated using the mean area of the isolated valid objects. In accordance with the second method, the area of the candidate clump is calculated. The area of the candidate clump is divided by the mean area of the isolated valid object to calculate a value, $N_2$, for the number of valid objects in the clump, where $N_2$ is given by equation (12) as set forth above.

In accordance with the third method of determining the number of clumped valid objects in a background, the number of valid objects is also calculated using the mean area of the isolated valid objects. With this method, the area of the candidate clump is calculated. The area is then divided by the mean area of the isolated valid objects minus one-half the standard deviation of the mean area of the isolated valid object to calculate a value, $N_3$, for the number of valid objects in the clump as set forth in equation (13) above.

Figure 22:
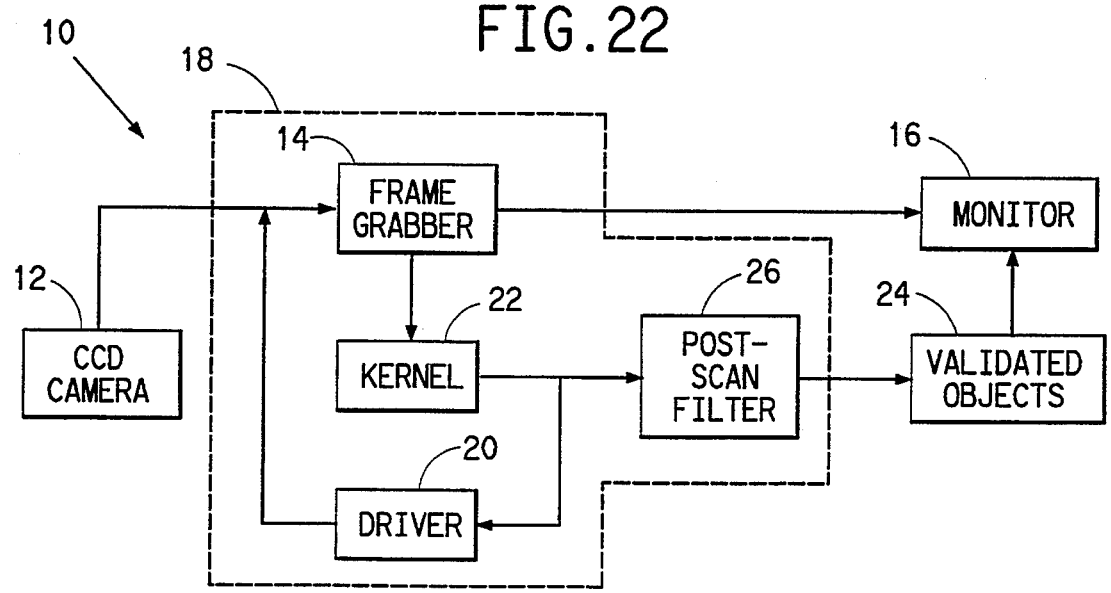
FIG. 22 is a block diagram showing the components of the system of the first embodiment of the present invention.

In accordance with the first embodiment of the present invention, there is provided an image analysis system for identifying at least one valid object in a background. The valid object has at least one predetermined attribute value which represents the definition of a valid object of an object to be identified. A block diagram of the system of the present invention is shown in FIG. 22. A system for identifying at least one valid object in a background is shown generally at 10 in FIG. 22.

The system of the present invention comprises means for generating an image of the object and the background. As shown in FIG. 22, the means for generating an image of the object and the background comprises a camera 12. Although a CCD camera is generally used with the present invention, any type of camera may be used without departing from the general principles of the present invention.

The system of the present invention also comprises means for digitizing and storing the image. The means for digitizing and storing the image comprises a frame grabber 14 as shown in FIG. 22. The frame grabber digitizes and stores the video image in one frame, as known to one skilled in the image processing art. Alternatively, the means for digitizing and storing the image comprises a video digitizer, which also digitizes and stores the image, although not necessarily in one frame. The system of the present invention further comprises means for displaying the image. The means for displaying the image comprises a monitor 16 as shown in FIG. 22.

The system of the present invention also comprises computer means. The computer means comprises a computer system 18 as shown in FIG. 22. The computer system comprises a central processing unit (CPU) and a memory. The computer means also includes an entropic driver 20, a kernel 22 and a post-scan filter 26 as shown in FIG. 22. Driver 20 stores the definition of the valid object. Entropic kernel 22 generates a gray level histogram of the image and entropically selects a threshold gray level such that the entropy function of the histogram is maximized. Entropic kernel 22 also searches the image using the entropically selected threshold gray level for at least one candidate object and validates the candidate object having the valid object predetermined attribute value to identify the valid object. The validated objects are represented by box 24 in FIG. 22. The driver and the kernel may comprise software incorporated in the memory. Alternatively, the driver and the kernel may be programmed into a programmable, read-only memory (PROM) from which the software may be retrieved. The post-scan filter is shown at 26 in FIG. 22 and provides a final check to remove redundancies in overlapping objects as described above.

Figure 23:
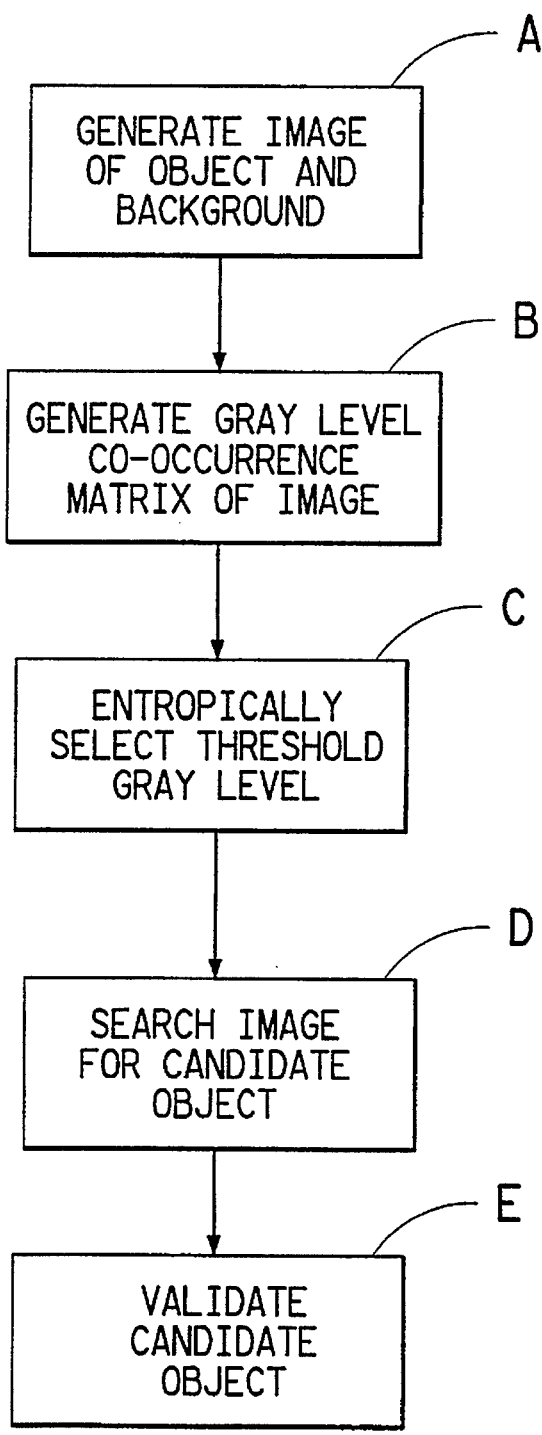
FIG. 23 is a block diagram showing the steps of the overall method of a second embodiment of the present invention.

According to a second embodiment of the present invention, there is provided another method of identifying at least one valid object having at least one predetermined attribute in a background. FIG. 23 is a block diagram showing the overall method of the second embodiment of the present invention.

The method comprises the steps of generating an image of the object and the background. An image is generated as shown in block A of FIG. 23. As in the first embodiment, the image of the object and the background may be generated by a camera. The image is then digitized and stored by a frame grabber or a video digitizer.

Figure 26:
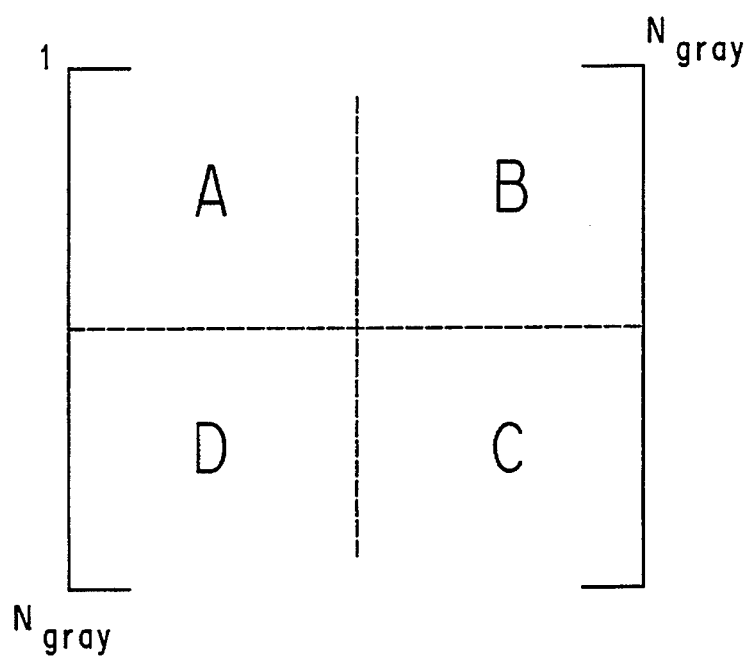
FIG. 26 is a co-occurrence matrix which is partitioned into four quadrants.

The method also comprises the step of generating a gray level co-occurrence matrix of the image. This step is shown in block B of FIG. 23. A co-occurrence matrix is shown in FIG. 26. The co-occurrence matrix is generated in accordance with known principles as set forth in the Pal and Pal article entitled "Entropic Thresholding" cited above. The two-dimensional co-occurrence matrix suggested by Pal and Pal includes, in principle, both the first order and second order gray level statistics which are important to the visual process. The matrix elements $p_{ij}$ of the co-occurrence matrix as described by Pal and Pal represent the probability of co-occurrence of gray levels i and j spaced apart by a given distance parameter d. The distance parameter is assumed to be equal to one in considering the "nearest neighbor" texture. The probability of co-occurrence of two gray levels is the result of averaging the probability over four directions (horizontal, vertical, right diagonal and left diagonal). The co-occurrence matrix is made asymmetrical by searching the image only one way in each of the four directions. For example, in the case of horizontal searching, each row might be searched from left to-right.

Figure 24:
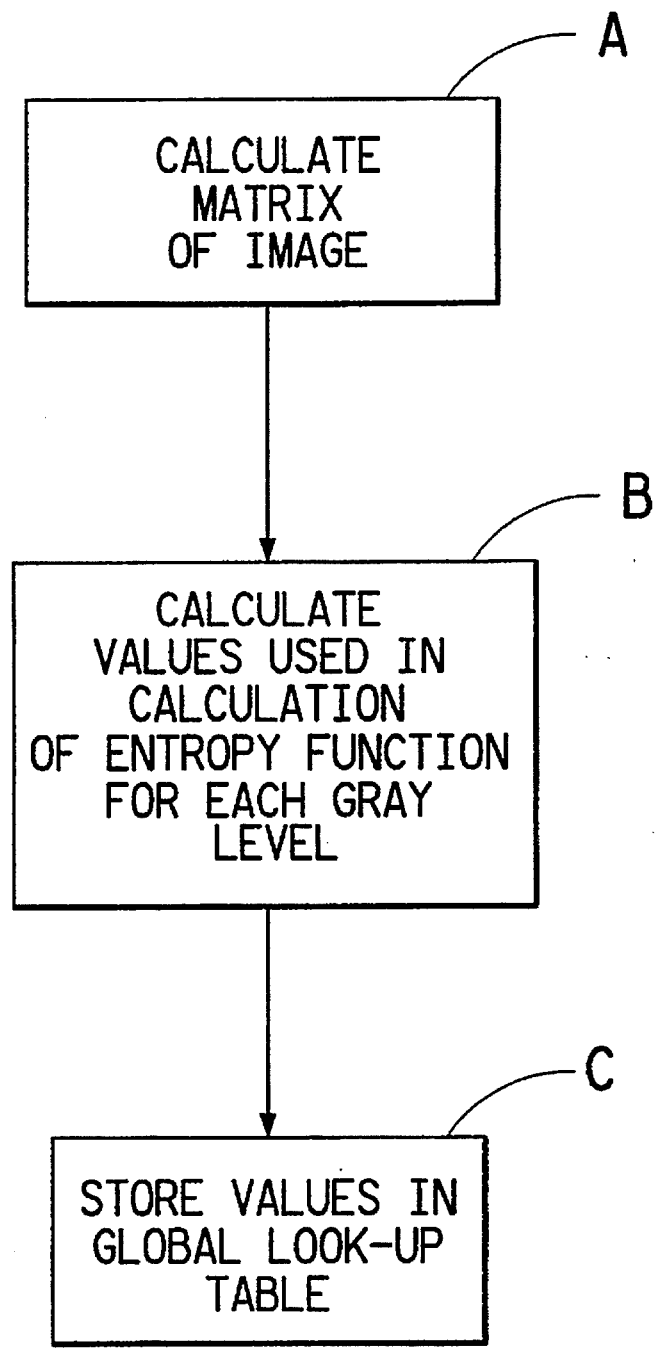
FIG. 24 is a flow chart illustrating the steps of modules VERT, HORIZ, LFT DIAG and RT DIAG which are used to generate a co-occurrence matrix of an image according to the second embodiment.

The present invention uses four modules, HORIZ, VERT, LFT DIAG and RT DIAG, to generate the gray level co-occurrence matrix of the region of interest of the image. The steps for generating the gray level matrix are shown in the flow chart of FIG. 24. As shown in block A of FIG. 24, HORIZ, VERT, LFT DIAG and RT DIAG first calculate a matrix of the region of interest of the image. They then calculate the values to be used subsequently in the calculation of the entropy function, Hi, for each gray level, i, as shown in block B of FIG. 24 for each gray level of the matrix. The results of this calculation are stored in a global look-up table as shown in block C.

Figure 25:
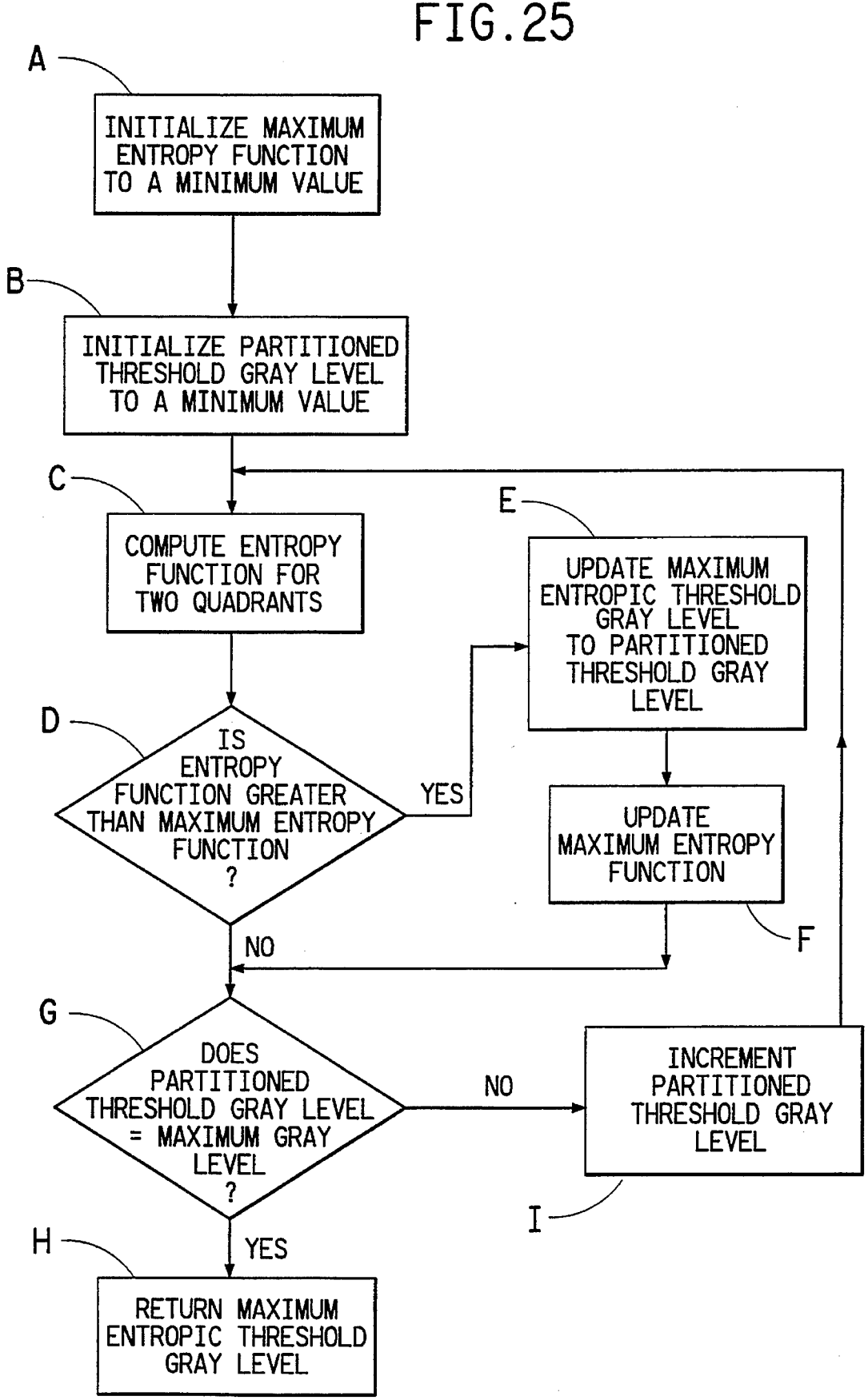
FIG. 25 is a flow chart illustrating the steps of the module ENTROPY used with the second embodiment of the present invention.

The method of the present invention also includes the step of entropically selecting a threshold gray level such that the entropy function of the matrix is maximized. This step is shown generally in block C of FIG. 23 and is performed by the ENTROPY module as shown in FIG. 25. As shown in block A of FIG. 25, the first step in maximizing the entropy function of the matrix is to initialize the maximum entropy function to a minimum value. The partitioned threshold gray level is then initialized to a minimum value as shown in block B of FIG. 25.

The step of entropically selecting a threshold gray level also includes the sub-step of sequentially partitioning the matrix at each gray level into a first, second, third and fourth quadrant. This sub-step partitions the matrix as shown in FIG. 26 into a first quadrant, A, a second quadrant, B, a third quadrant, C, and a fourth quadrant, D. In this partition, the "diagonal" quadrants A and C describe the internal texture of the background and the object, respectively. The "off-diagonal" quadrants B and D describe the edge texture between the object and the background.

Partitioning a co-occurrence matrix to entropically select a maximum threshold gray level was developed by Pal and Pal as described in "Entropic Thresholding" cited above Pal and Pal suggest two entropy maximization schemes in their article. In the first scheme, the diagonal entropy function is maximized, and in the second case, the off-diagonal entropy function is maximized. Maximizing the diagonal entropy is analogous to maximizing the entropy of the gray level histogram, since it really involves utilizing gray level information from the interiors of the object and the background. The off-diagonal terms relate to edge information, which is not present in the gray level histogram. The description given below relates to off-diagonal entropy, but may be extended to diagonal entropy without any loss of generality. The off-diagonal entropy can be defined as:

$$H_t^{off} = (H(O/B) + H(B/O))/2 \tag{14}$$

where $$H(O/B) = - \sum_{i=1}^{s} \sum_{j=s+1}^{N_{gray}} p_{ij}^B \ln p_{ij}^B \tag{15}$$

$$H(B/O) = - \sum_{i=s+1}^{N_{gray}} \sum_{j=1}^{s} p_{ij}^D \ln p_{ij}^D \tag{16}$$

$$p_{ij}^B = \frac{p_{ij}}{p_B}, \, p_{ij}^D = \frac{p_{ij}}{p_D} \tag{17}$$

and $$P_B = \sum_{i=1}^{s} \sum_{j=s+1}^{N_{gray}} p_{ij}, P_D = \sum_{i=s+1}^{N_{gray}} \sum_{j=1}^{s} p_{ij} \tag{18}$$

The basic parameter $P_{ij}$ is defined by:

$$p_{ij} = \frac{t_{ij}}{\sum_i \sum_j t_{ij}} \text{ (summed from } i, j = 1, \ldots, N_{gray}) \tag{19}$$

where $t_{ij}$ is the frequency of co-occurrence of the grey level pair (i,j). After substituting in for $p_{ij}$, and performing the requisite algebra, one obtains:

$$H_l^{off} = \ln \left( \sum_{i=1}^{s} \sum_{j=s+1}^{N_{gray}} t_{ij} \right) + \ln \left( \sum_{i=s+1}^{N_{gray}} \sum_{j=1}^{s} t_{ij} \right) - \frac{\sum_{i=1}^{s} \sum_{j=s+1}^{N_{gray}} t_{ij} \ln t_{ij}}{\sum_{i=1}^{s} \sum_{j=s+1}^{N_{gray}} t_{ij}} - \frac{\sum_{i=s+1}^{N_{gray}} \sum_{j=1}^{s} t_{ij} \ln t_{ij}}{\sum_{i=s+1}^{N_{gray}} \sum_{j=1}^{s} t_{ij}} \tag{20}$$

According to the present invention, the entropy function of the matrix is then computed. This step is shown in block C of FIG. 25. The entropy function of the matrix is defined as the sum of the entropy functions of the second and third, or "off-diagonal" quadrants. Alternatively, the entropy function of the matrix is defined as the sum of the entropy functions of the first and fourth, or "diagonal" quadrants, of the matrix. A threshold gray level is selected such that the entropy function of the matrix is maximized. Decision diamond D of FIG. 25 asks whether the entropy function of the matrix is greater than the maximum entropy function as initialized in block A. If it is, then the maximum entropic threshold gray level is updated to the partitioned threshold gray level as shown in block E of FIG. 25. The maximum entropy function is then updated to the entropy function of the matrix as shown in block F of FIG. 25. If the entropy function of the matrix is not greater than the maximum entropy function, then decision diamond G of the ENTROPY module of FIG. 25 asks whether the partitioned threshold gray level equals the maximum threshold gray level. If so, the maximum entropic threshold gray level is returned as shown in block H of FIG. 25. If not, then the partitioned threshold gray level is incremented as illustrated in block I of FIG. 25, and the incremented partitioned threshold gray level is returned to block C, where the entropy function of the incremented, partitioned threshold gray level is computed. This process is repeated until the partitioned threshold gray level equals the maximum threshold gray level as illustrated in block G. The maximum entropic threshold gray level is then returned as shown in block H. The maximum entropic threshold gray level divides the original matrix into an upper and lower matrix corresponding to quadrants B and D, respectively, for the off-diagonal case.

The method of the second embodiment of the present invention also includes the step of searching the image for at least one candidate object using the entropically selected threshold gray level, wherein the candidate object has at least one candidate object attribute value. This step is shown in block D of FIG. 23. The searching step includes the sub-steps of scanning the image for at least one candidate object using the entropically selected threshold gray level and tracing the candidate object having boundary gray levels determined by the entropically selected threshold gray level. The searching step is illustrated by the flow chart SEARCH IMAGE, which is the same for the co-occurrence matrix as the flow chart shown in FIG. 5 for the histogram. In addition, the flow charts FIND OBJECT of FIG. 6 and TRACE OBJECT of FIG. 7 for the histogram of the first embodiment are the same for the co-occurrence matrix of the second embodiment. The method of the second embodiment further comprises the step of validating the candidate objects having the valid object predetermined attribute values, thereby identifying the valid object. This step is shown in block E of FIG. 23 and is also performed by TRACE OBJECT.

The method as described thus far can be used as a screening process to identify at least one valid object. As in the first embodiment, for a more stringent identification process, it is possible to recursively search the gray level space by using the co-occurrence matrix. The steps of the recursive process using a co-occurrence matrix are performed by the module ANALYZE and are shown in the flow chart of FIG. 27.

Figure 27:
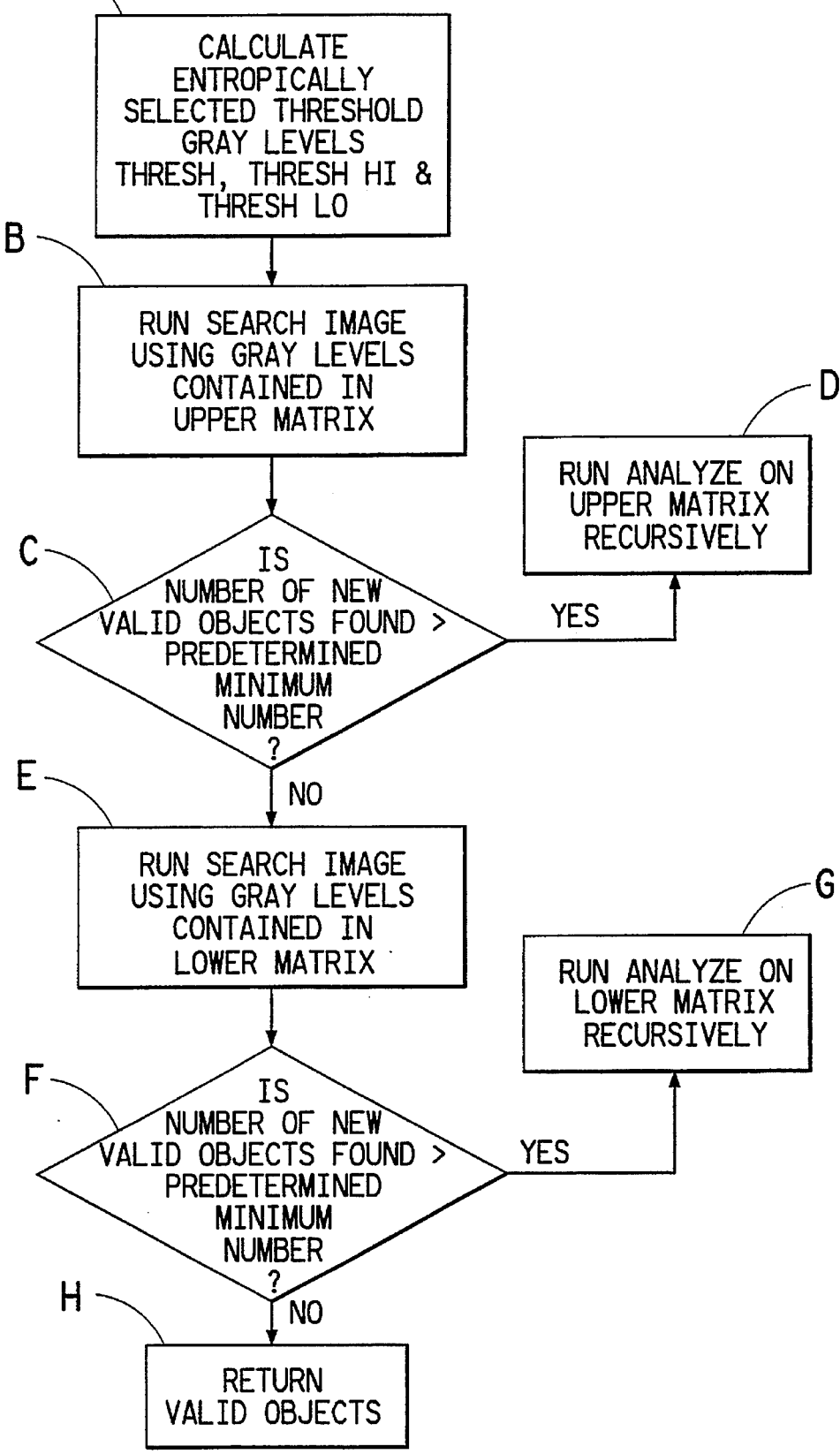
FIG. 27 is a flow chart illustrating the steps of the module ANALYZE used with the second embodiment of the present invention.

As shown in block A of FIG. 27, the first step of ANALYZE for a co-occurrence matrix is to calculate the entropically selected threshold gray levels, THRESH, THRESH HI and THRESH LO. ANALYZE then runs SEARCH IMAGE using the gray levels contained in the upper matrix as shown in block B. Decision diamond C then asks whether the number of new valid objects found by SEARCH IMAGE is greater than a predetermined minimum number. If so, then ANALYZE is run on the upper matrix recursively as shown in block D. The recursion continues until the number of new valid object found by SEARCH IMAGE is not greater than the predetermined minimum number. Then, SEARCH IMAGE is run using the gray levels contained in the lower matrix as shown in block E. Decision diamond F then asks whether the number of new valid objects found is greater than the predetermined minimum number. If so, then ANALYZE is run on the lower matrix recursively as shown in block G, and the recursion continues until the number of new valid objects found is not greater than the predetermined minimum number. At this point, ANALYZE returns the valid objects as shown in block H.

The remaining steps of the method of the first embodiment and the system as described above with respect to FIG. 22 for the first embodiment are equally applicable to the second embodiment. Thus, the modules as shown in FIGS. 8 and 11–20 may be run for the co-occurrence matrix embodiment without any loss of generality.

In accordance with a third, or iterative embodiment of the present invention, also referred to as IETNA, (iterative entropic thresholding in natural analysis) there is provided a method of identifying at least one valid object having at least one predetermined attribute value in a background. By iterative, it is meant the process of dividing a histogram into upper and lower histograms for a predetermined number of N divisions or iterations so as to create N+1 sub-histograms. A block diagram of the method according to the third embodiment of the present invention is shown in FIG. 28.

The method according to the third embodiment of the present invention comprises the step of generating an image of the object and the background. An image is generated as shown in block A of FIG. 28. As in the first and second embodiments, the image of the object and the background may be generated by a camera. The image is then digitized and stored by a frame grabber or a video digitizer.

The method of the present invention also comprises the step of generating a gray level histogram of the image. This step is shown in block B of FIG. 28. The steps of the module for generating the gray level histogram for the third embodiment are the same as those shown in the flow chart of FIG. 2.

Figure 29:
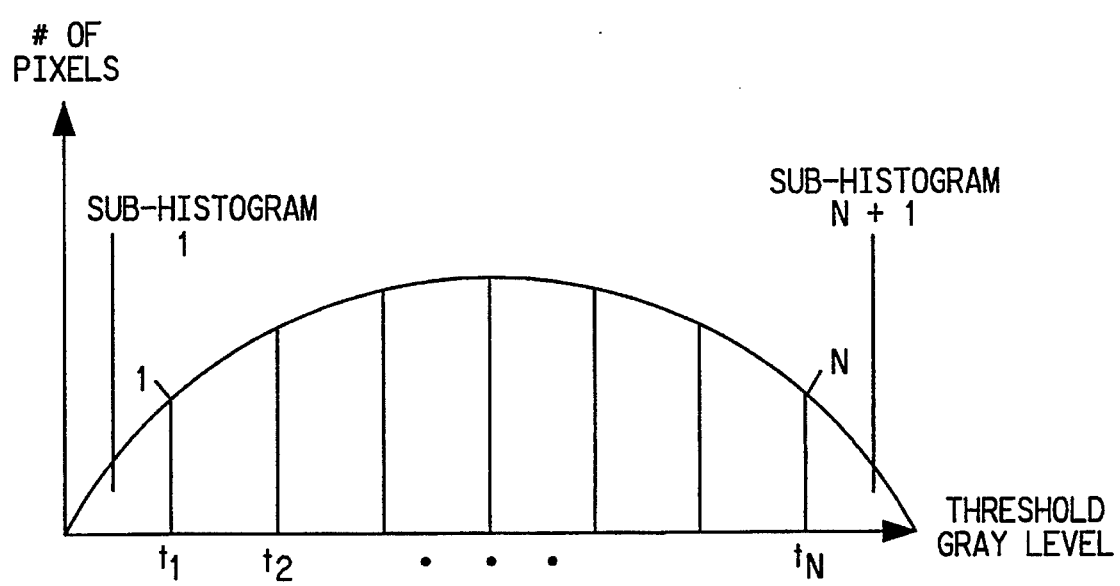
FIG. 29 is a gray level histogram which has been divided into N+1 sub-histograms in accordance with the third embodiment of the present invention.
Figure 28:
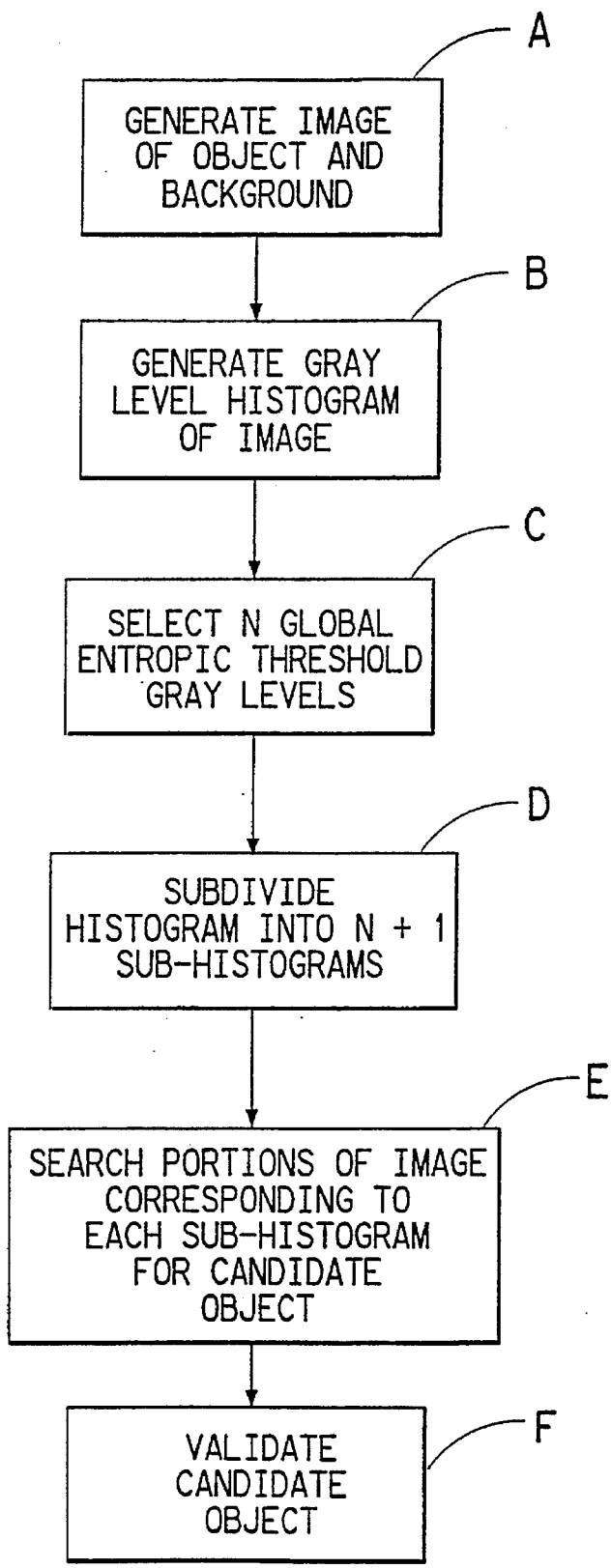
FIG. 28 is a block diagram showing the steps of the overall method of a third embodiment.

The method of the third embodiment of the present invention also includes the step of selecting N global entropic threshold gray levels as shown in block C of FIG. 28 and subdividing the gray level histogram into N+1 sub-histograms using each of the entropically selected threshold gray levels as shown in block D. To illustrate these steps, FIG. 29 shows a gray level histogram having N global entropic threshold gray levels, $t_1$–$t_N$. The gray level histogram is divided into N+1 sub-histograms using each of the global entropic threshold gray levels. The steps for selecting N global entropic threshold gray levels are performed by the module ENTROPY and are the same as those shown in the flow chart of FIG. 3.

The selecting step includes the sub-steps of sequentially partitioning the histogram at each gray level into a first and a second partition. The entropy function is then computed for each partition. The entropy function of the histogram is defined as the sum of the entropy functions of the first and second partitions. A global entropic threshold gray level is then selected such that the entropy function of the histogram is maximized. The gray level histogram is then subdivided using the global entropically selected threshold gray level as defined above which maximizes the entropy function of the histogram as an upper delimiter and a lower delimiter to create an upper histogram and a lower histogram. The partitioning, computing and selecting steps are then repeated, where the repetition of the selecting step selects a next successive global entropic threshold gray level. The subdividing step is then repeated using the next successive global entropic threshold gray level as the global entropic threshold gray level as defined in the selecting step to iteratively calculate the N global entropic threshold gray levels.

The iterative method of the present invention further includes the step of searching portions of the image corresponding to each sub-histogram using each entropically selected threshold gray level for at least one candidate object. The candidate object has at least one candidate object attribute value. The step of searching portions of the image is shown in block E of FIG. 28. The searching step includes the sub-steps of scanning the image for at least one candidate object using each global entropically selected threshold gray level and tracing the candidate object having boundary gray levels determined by each global entropically selected threshold gray level. The step of searching portions of the image is performed by the modules SEARCH IMAGE, FIND OBJECT AND TRACE OBJECT as described above for the first embodiment and as shown in FIGS. 5–7. In addition, the module CHK GRAY as shown in FIG. 8 may be run for the iterative method in order to retain the candidate objects which are relatively lighter than the background. To identify objects darker than the background, the image is inverted immediately after it has been generated.

The iterative method of the present invention also comprises the step of validating the candidate object having the valid object predetermined attribute value for each of the sub-histograms, thereby identifying the valid object. This step is shown in block F of FIG. 28. The validating step includes the sub-steps of calculating the candidate object attribute value and comparing the candidate object attribute value to the valid object predetermined attribute values to identify valid candidate objects. The validating step further includes the sub-step of checking for redundancies of the valid object to prevent multiple identification of the valid object. The redundancy checking sub-step is performed by the module CHK LIST as described above for the first embodiment with respect to FIGS. 11A–D and 13A and 13B, and the module SET STAT as described above with respect to FIGS. 12 and 14.

The iterative method of the third embodiment of the present invention further includes the step of performing a final check for redundancies of the valid object and resolving the redundancies to prevent multiple identification of the valid object. The final redundancy checking sub-step is performed by the module FINAL CHK as described above for the first embodiment with respect to FIGS. 15A–B and the module INT STAT as illustrated in FIG. 16.

The iterative method of the third embodiment of the present invention further includes the step of filtering the image after the validation step. The filtering step for inhomogeneous objects is performed by the module CALCON as shown in FIGS. 17A–D and for homogeneous objects is performed by the module CALCON as shown in FIGS. 18A–B as described above with respect to the first embodiment.

The iterative method of the third embodiment of the present invention further includes the step of determining the number of valid objects in a candidate clump. The determining step is performed by the modules UNCLUMP and PROCESS CLUMP as shown in FIGS. 19A–B and 20A–B, respectively, as described above with respect to the first embodiment.

The iterative method of the third embodiment may be implemented in an image analysis system such as that shown in FIG. 22. Also, it will be apparent to those skilled in the art that various modifications may be made to the third embodiment of the present invention without departing from the scope and spirit of the invention. For instance, it is possible to use a co-occurrence matrix as described above in the second embodiment instead of the histogram in the iterative method to do adaptive thresholding.

In accordance with a fourth, embodiment of the present invention, there is provided a parallel processing method of identifying at least one valid object having at least one predetermined attribute defined by at least one predetermined attribute value in a background. The steps of the overall method of the fourth embodiment are illustrated in FIG. 30.

The method according to the fourth embodiment of the present invention comprises the step of generating an image of the object and the background. An image is generated as shown in block A of FIG. 30. As in the first through third embodiments, the image of the object and the background may be generated by a camera. The image is then digitized and stored by a frame grabber or a video digitizer.

The method of the fourth embodiment of the present invention also comprises the step of generating a gray level histogram of the image. This step is shown in block B of FIG. 30. The module HISTOGRAM is run to perform this step. The steps in HISTOGRAM for generating the gray level histogram for the fourth embodiment are the same as those shown in the flow chart of FIG. 2.

Figure 30:
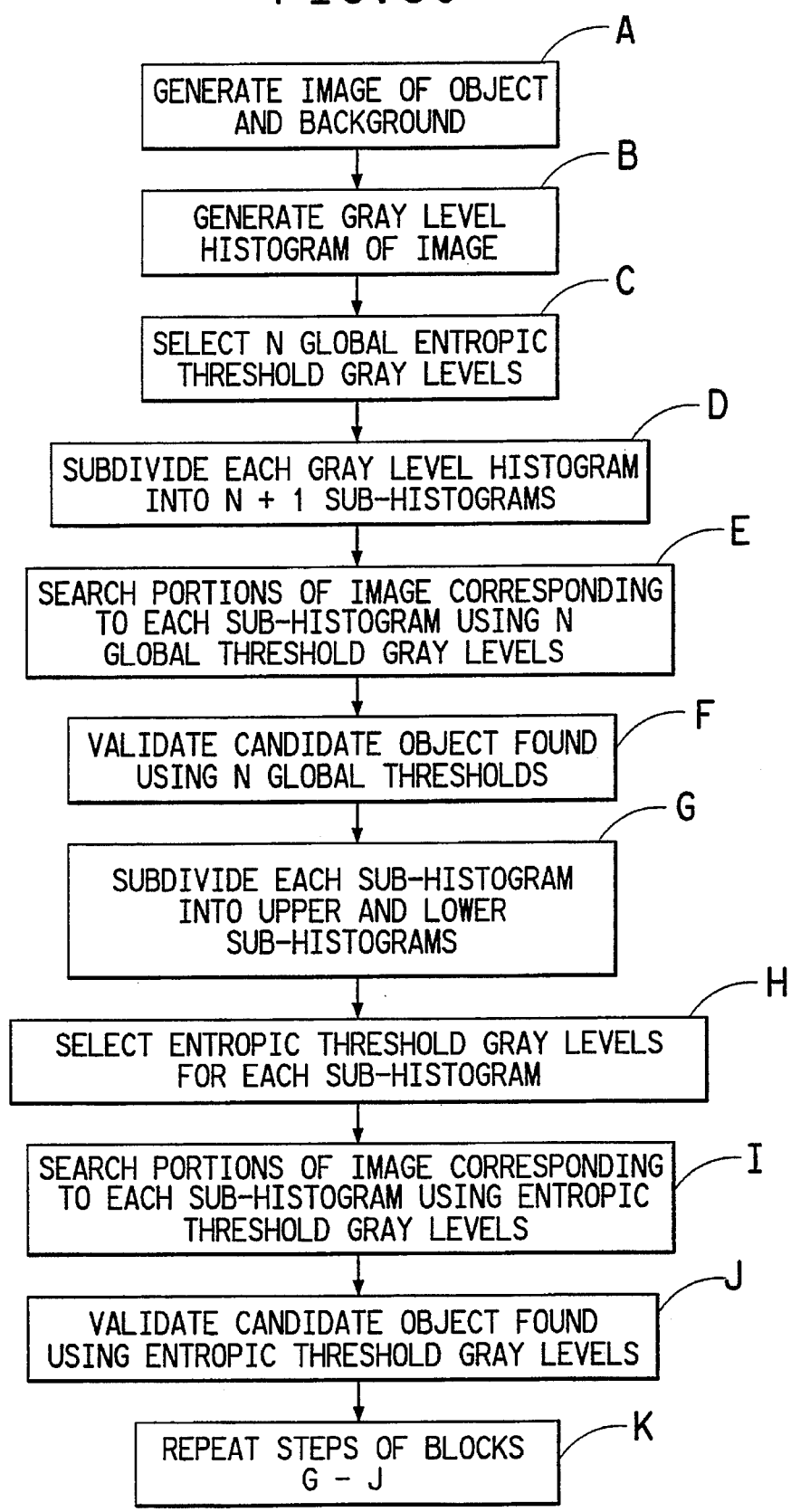
FIG. 30 is a block diagram showing the steps of the overall method of a fourth embodiment of the present invention.

The method of the fourth embodiment of the present invention also includes the step of selecting N global entropic threshold gray levels as shown in block C of FIG. 30. The selecting step includes the sub-steps of sequentially partitioning the gray level histogram at each gray level into a first and a second partition. The entropy function is then computed for each partition. The entropy function of the histogram is defined as the sum of the entropy functions of the first and second partitions. An entropic threshold gray level is then selected such that the entropy function of the histogram is maximized. The gray level histogram is then subdivided using the entropically selected threshold gray level as defined above which maximizes the entropy function of the histogram as an upper delimiter and a lower delimiter to create an upper histogram and a lower histogram. The partitioning, computing and selecting steps are then repeated, where the repetition of the selecting step selects a next successive entropic threshold gray level. The subdividing step is then repeated using the next successive entropic threshold gray level as the entropic threshold gray level as defined in the selecting step to iteratively calculate the N global entropic threshold gray levels.

The method of the fourth embodiment of the present invention comprises the step of subdividing the gray level histogram into N+1 sub-histograms using each of the global threshold gray levels as shown in block D. The N global entropic threshold gray levels and the N+1 sub-histograms are the same as the those illustrated in FIG. 29 for the iterative method.

The method of the fourth embodiment of the present invention further includes the step of searching portions of the image corresponding to each sub-histogram using each of the N global entropically selected gray levels for at least one candidate object, where each candidate object has at least one candidate object attribute value. This step is shown in block E of FIG. 30. The searching step using the global entropically selected gray levels includes the sub-steps of scanning portions of the image corresponding to each sub-histogram using each global entropically selected threshold gray level for at least one candidate object and tracing the candidate object having boundary gray levels determined by each global entropically selected threshold gray level.

The method of the fourth embodiment of the present invention further includes the step of validating the candidate object found in the search using the global entropic threshold gray levels having the valid object predetermined attribute values to identify the valid object. This step is shown in block F of FIG. 30.

The parallel processing method of the present invention further includes the step of subdividing each sub-histogram into an upper sub-histogram and a lower sub-histogram using each global entropic threshold gray level as an upper delimiter and a lower delimiter. This step is shown in block G of FIG. 30.

The parallel processing method of the present invention further includes the step of selecting an entropic threshold gray level for each sub-histogram to maximize the entropy function of each of the upper and lower sub-histograms. This step is shown in block H of FIG. 30. The step of selecting an entropic threshold gray level for each sub-histogram to maximize the entropy function of each of the upper and lower sub-histograms includes the sub-steps of sequentially partitioning each gray level sub-histogram at each gray level into a first and a second partition and computing the entropy function for each partition. The entropy function of each sub-histogram is defined as the sum of the entropy functions of the first and second partitions. The selecting step further includes the sub-step of selecting an entropic threshold gray level such that the entropy function of each sub-histogram is maximized.

The method of the parallel processing embodiment of the present invention further includes the step of searching portions of the image corresponding to each sub-histogram using the entropically selected threshold gray level selected for each sub-histogram which maximizes the entropy function of each of the upper and lower sub-histograms for at least one candidate object. The step of searching portions of the image is shown in block I of FIG. 30. The searching step includes the sub-steps of scanning the portions of the image corresponding to each sub-histogram using each entropically selected threshold gray level for at least one candidate object and tracing the candidate object having boundary gray levels determined by each entropically selected threshold gray level.

The method according to the fourth embodiment of the present invention also comprises the step of validating the candidate object found in the search using the entropically selected threshold gray level selected for each sub-histogram which maximizes the entropy function thereof having the valid object predetermined attribute values, thereby identifying the valid object. This step is shown in block J of FIG. 30. The validating step for candidate objects found using both the global entropic threshold gray levels and the entropic threshold gray levels include the sub-steps of calculating the candidate object attribute values and comparing the candidate object attribute values to the valid object predetermined attribute values to identify valid candidate objects. Both validating steps further include the sub-step of checking for redundancies of the valid object to prevent multiple identification of the valid object.

The steps of subdividing each sub-histogram, selecting an entropic threshold gray level for each sub-histogram, searching portions of the image corresponding to each sub-histogram using the entropically selected gray level of the selecting step for a candidate object and validating the candidate object are recursively repeated, where the repetition of the selecting step selects a next successive entropic threshold gray level, are then repeated. This step is shown in block K of FIG. 30. Each gray level sub-histogram is thereby recursively partitioned to identify valid objects until a predetermined minimum number of new valid objects is identified. As in the above-described embodiments, the predetermined minimum number may be zero.

The method according to the fourth embodiment of the present invention further includes the steps of performing a final check for redundancies of the valid object and resolving the redundancies to prevent multiple identification of the valid object, filtering the image after the validation step and determining the number of valid objects in a candidate clump.

The parallel processing method of the fourth embodiment may be implemented in an image analysis system such as that shown in FIG. 22. Also, it will be apparent to those skilled in the art that various modifications can be made in the parallel processing method of the present invention without departing from the scope and spirit of the invention. For instance, it is possible to use a co-occurrence matrix as described above in the second embodiment instead of a histogram in the parallel processing method to do adaptive thresholding.

Figure 31:
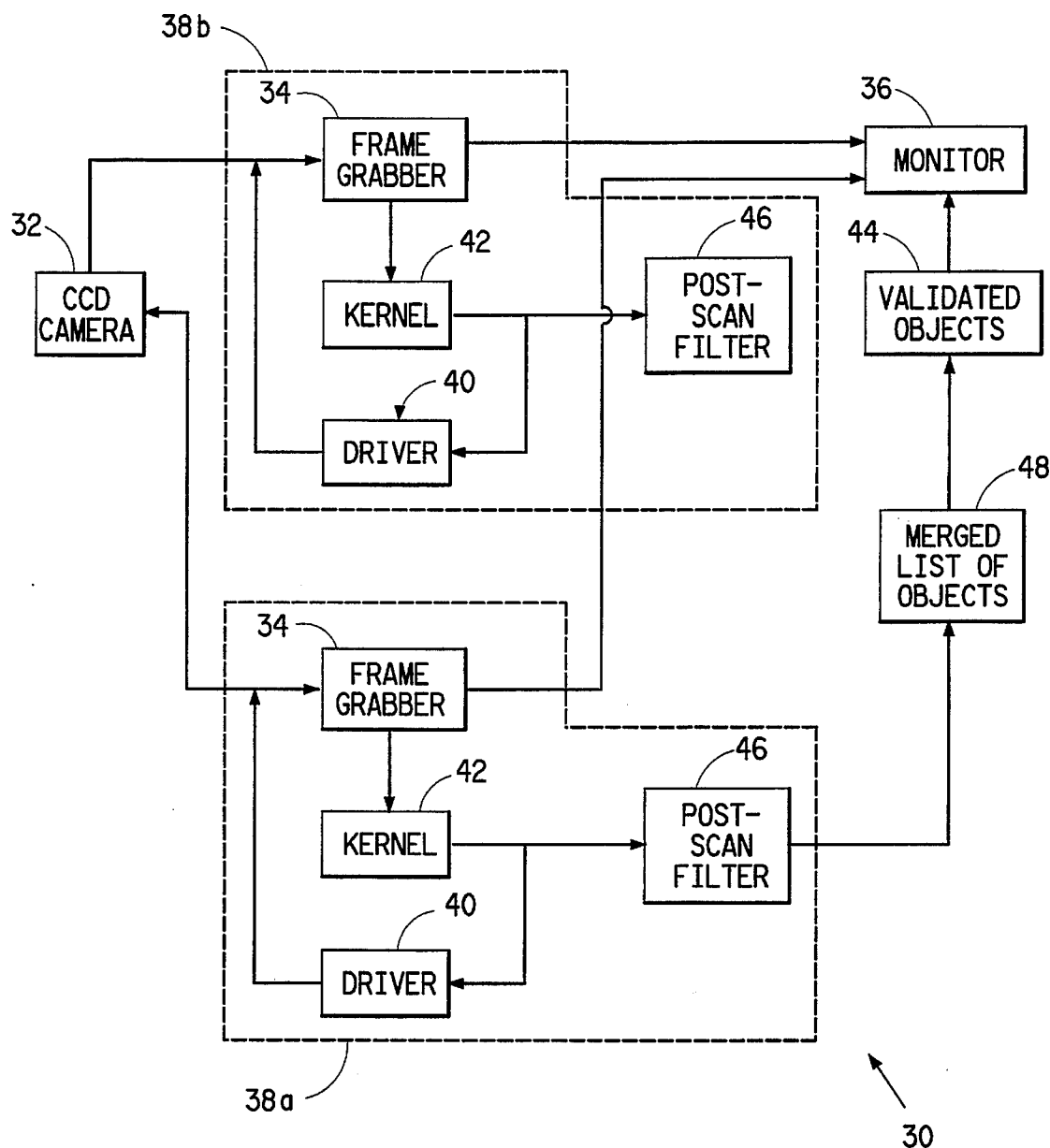
FIG. 31 is a block diagram of the system of the present invention in accordance with the fourth embodiment of the present invention.

According to the fourth embodiment of the present invention, there is provided a system for identifying at least one valid object having at least one predetermined attribute value in a background. The system is shown generally at 30 in FIG. 31. The system includes means for generating an image of the object and the background. As shown in FIG. 31, the means for generating an image of the object and the background comprises a camera 32. Although a CCD camera is generally used with the present invention, any type of camera may be used without departing from the general principles of the present invention. A CCD camera, Model XC77, commercially available from Sony, Inc. of Cyprus, Calif., has been proposed for use with the parallel processing system of the present invention.

The system according to the fourth embodiment also comprises means for digitizing and storing the image. The means for digitizing and storing the image comprises a frame grabber 34 as shown in FIG. 31. The frame grabber digitizes the video image and stores it in one frame, as known to one skilled in the image processing art. A frame grabber, Model 2851, which is commercially available from Data Translation, Inc. of Marlboro, Mass., has been proposed for use with the fourth embodiment present invention. Alternatively, the means for digitizing and storing the image may comprise a video digitizer, which also digitizes and stores the image, although not necessarily in one frame. The system of the present invention further comprises means for displaying the image. The means for displaying the image comprises a monitor 36 as shown in FIG. 31.

The system of the present invention also comprises computer means including a plurality of parallel processors. The plurality of parallel processors comprises a main processor 38a and at least one other parallel processor 38b as shown in FIG. 31. A 33 MHz 386 PC computer, commercially available from Dell Computers of Austin, Tex., has been proposed for use with a Quadputer parallel processing board, commercially available from Microway of Kingston, Mass., for the parallel processors of the present invention. Each parallel processor of the present invention comprises a driver 40, an entropic kernel 42 and a post-scan filter 46 as shown in FIG. 31. The driver stores the definition of a valid object. The entropic kernel of the main processor generates a gray level histogram of the image, selects N global entropic threshold gray levels, subdivides the gray level histogram into N+1 sub-histograms, searches portions of the image corresponding to each sub-histogram using the global entropically selected gray levels, validates the candidate objects having the predetermined attribute values found in the search using the global entropically selected gray levels, and merges the valid objects having the predetermined attribute values found in the search using the global entropically selected gray levels and merges the valid objects found by all the parallel processors. The entropic kernel for the other processors subdivides each sub-histogram into upper and lower sub-histograms using each global entropic threshold gray level, selects an entropic threshold gray level to maximize the entropy function of each upper and lower sub-histogram, searches portions of the image corresponding to each sub-histogram using the entropically selected threshold gray level for at least one candidate object and validates the candidate object having the valid object predetermined attribute values found using the entropically selected threshold gray level. The entropic kernel for the other processors also recursively repeats the subdividing of the sub-histograms, the selection of an entropic threshold gray level, the searching using the entropically selected threshold gray level and the validating for the candidate objects found using the entropically selected threshold gray level to recursively partition each gray level sub-histogram until a predetermined minimum number of valid objects is identified.

Each parallel processor of the present invention may comprise software for performing the functions of the driver and the kernel as described above. Alternatively, each parallel processor may comprise a programmable read-only memory (PROM) from which the software may be retrieved. Each parallel processor of the configuration shown in FIG. 31 has a separate kernel and a separate driver. However, alternate configurations may be used in this embodiment without departing from the scope or spirit of the invention. For instance, each parallel processor may have a separate kernel, but all the processors may share a common driver. Alternatively, each processor may have a separate driver, but all the processors may share a common kernel. Finally, all the processors may share a common kernel and a common driver. In all of these configurations, each processor is dedicated to a specific window in gray level space and recursively searches for instances of valid objects within its appointed window.

The validated objects from each parallel processor are merged to one list as shown in box 48. The merging step involves performing one final redundancy check to prevent multiple identification of a valid object. The validated objects are represented by box 44 in FIG. 31. A post-scan filter is shown at 46 in FIG. 31 and provides a final check to remove redundancies in overlapping objects as described above.

Figure 32:
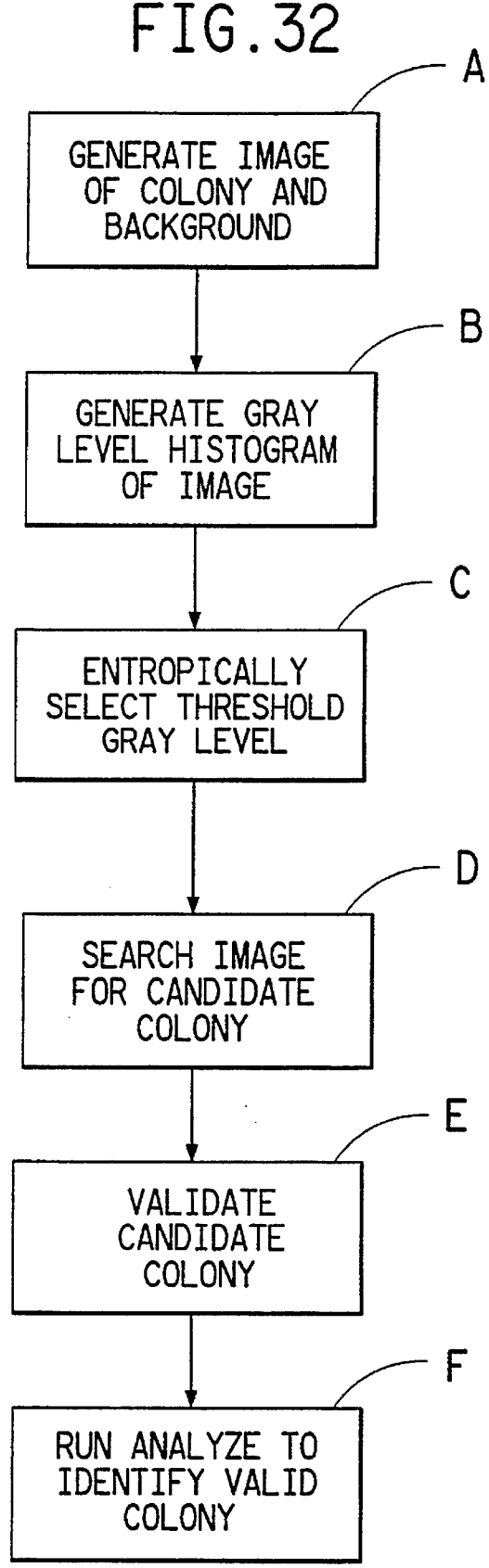
FIG. 32 is a block diagram showing the steps of the overall method of a fifth embodiment of the present invention.

According to a fifth embodiment of the present invention, there is provided a method of counting at least one biological colony having at least one predetermined attribute value in a background. The steps of the overall method of the fifth embodiment are illustrated in FIG. 32.

The method of the fifth embodiment of the present invention comprises the step of generating an image of the colony and the background. This step is shown in block A of FIG. 32. As in the above embodiments, the image of the colony and the background may be generated by a camera. The image is then digitized and stored by a frame grabber or a video digitizer.

The method of the fifth embodiment of the present invention also comprises the step of generating a gray level histogram of the image. This step is shown in block B of FIG. 32. The module HISTOGRAM is run to perform this step. The steps in HISTOGRAM for generating the gray level histogram for the fifth embodiment are the same as those shown in the flow chart of FIG. 2.

The method of the fifth embodiment of the present invention also includes the step of entropically selecting a threshold gray level such that the entropy function of the histogram is maximized. This step is shown in block C of FIG. 32. The selecting step includes the sub-steps of sequentially partitioning the gray level histogram at each gray level into a first and a second partition. The entropy function is computed for each partition, where the entropy function of the histogram is defined as the sum of the entropy functions for the first and second partitions. A threshold gray level is then selected such that the entropy function of the histogram is maximized. The module ENTROPY is used to perform these sub-steps. The steps of the module ENTROPY are the same as those shown in FIG. 3.

The method of the fifth embodiment also comprises the step of searching the image using the entropically selected threshold gray level for at least one candidate colony. This step is shown in block D of FIG. 32. The candidate colony has at least one candidate colony attribute value. The searching step includes the sub-steps of scanning the image for at least one candidate colony using the entropically selected threshold gray level and tracing the candidate colony having boundary gray levels determined by the entropically selected threshold gray level. The sub-steps of the searching step are performed by the module SEARCH IMAGE as shown in FIG. 5, FIND OBJECT as shown in FIG. 6 and TRACE OBJECT as shown in FIG. 7. The steps of these modules are the same as those shown in FIGS. 5–7, except that the term "object" is replaced with the term "colony". The module CHK GRAY as shown in FIG. 8 with the term "object" replaced by the term "colony" may be run for the colony counting embodiment in order to retain the candidate colonies which are relatively lighter than the background. To identify colonies darker than the background, the image is inverted immediately after it has been generated.

The method the fifth embodiment of the present invention also comprises the step of validating the candidate colony having the valid colony predetermined attribute value to identify the valid colony. This step is shown by block E of FIG. 32 and is performed by the module TRACE OBJECT. The validating step includes the sub-steps of calculating the candidate colony attribute values and comparing the candidate colony attribute values to the valid colony predetermined attribute values to validate the candidate colony. The validating step further includes the sub-step of checking for redundancies of the validate colony to prevent multiple identification of the valid colony. The redundancy checking sub-step is performed by the module CHK LIST as described above for the first embodiment in FIGS. 11A–D and 13A–B, and the module SET STAT as described with respect to FIGS. 12 and 14, except that the term "object" in these flow charts is replaced with the term "colony".

The method of the fifth embodiment of the present invention also comprises the step of subdividing the gray level histogram into an upper histogram and a lower histogram using the entropically selecting threshold gray level which was previously selected to maximize the entropy function of the histogram as an upper delimiter and a lower delimiter. The method also comprises the step of recursively repeating the selecting, searching, validating and subdividing steps for each of the upper and lower histograms, where the repetition of the selecting step selects a next successive entropic threshold gray level. This repetition recursively partitions the gray level histogram to identify the valid colonies until a predetermined minimum number of new valid colonies is counted. This recursive repetition is performed by the module ANALYZE, which is run as shown in block F in FIG. 32. The steps of the ANALYZE module for colony counting are the same as those shown in FIG. 10, except that the term "object" in these flow charts is replaced with the term "colony".

The colony counting method of the fifth embodiment of the present invention further includes the step of performing a final check for redundancies of the valid colony and resolving the redundancies to prevent multiple identification of the valid colony. The final redundancy checking sub-step is performed by the module FINAL CHK as described above for the first embodiment with respect to FIGS. 15A–B, and the module INT STAT as described with respect to FIG. 16, except that the term "object" in these flow charts is replaced with the term "colony".

The colony counting method of the fifth embodiment of the present invention further includes the step of filtering the image after the validation step. The filtering step for inhomogeneous colonies is performed by the module CALCON as shown in FIGS. 17A–D and for homogeneous colonies is performed by the module CALCON as shown in FIGS. 18A–B as described above with respect to the first embodiment, except that the term "object" in these flow charts is replaced with the term "colony".

The colony counting method according to the fifth embodiment of the present invention further includes the step of determining the number of valid colonies in a candidate clump. The determining step is performed by the module UNCLUMP as shown in FIGS. 19A–B and PROCESS CLUMP as shown in FIGS. 20A–B and as described above with respect to the first embodiment, except that the term "object" in these flow charts is replaced with the term "colony".

The colony counting method of the present invention may be implemented in an image analysis system such as that shown in FIG. 22. Also, it will be apparent to those skilled in the art that various modifications can be made in the colony counting method of the present invention without departing from the scope and spirit of the invention. For instance, it is possible to use a co-occurrence matrix as described above in the second embodiment instead of a histogram in the colony counting method to do adaptive thresholding. In addition, the parallel processing method may be used to do colony counting.

Figure 33:
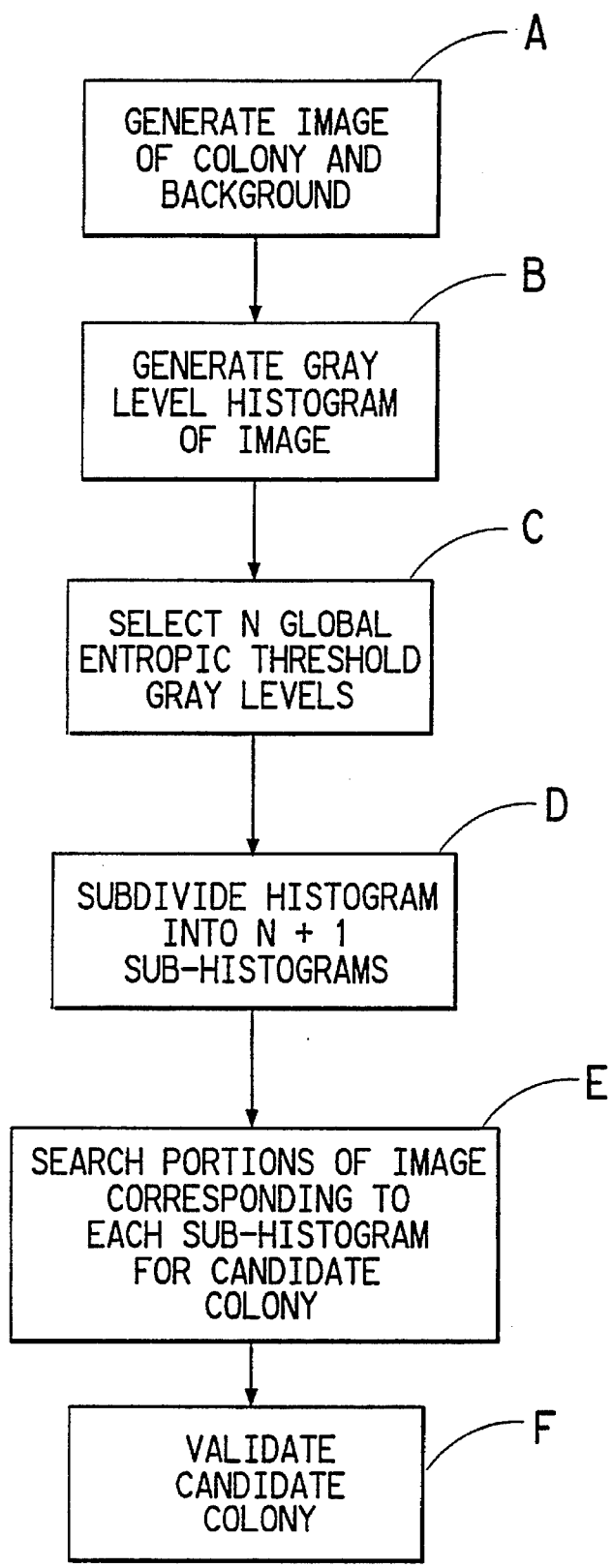
FIG. 33 is a block diagram showing the steps of the overall method of a sixth embodiment of the present invention.

According to a sixth embodiment of the present invention, there is provided a method of screening for at least one valid biological colony having at least one predetermined attribute value in a background. The steps of the screening method are illustrated in FIG. 33. The colony screening method employs the iterative techniques of the third embodiment as described above.

As shown in block A of FIG. 33, the colony screening method comprises the step of generating an image of the feature and the background. As in the above embodiments, the image of the colony and the background may be generated by a camera. The image is then digitized and stored by a frame grabber or a video digitizer.

The colony screening method of the present invention also comprises the step of generating a gray level histogram of the image. This step is shown in block B of FIG. 33. The module HISTOGRAM is run to perform this step. The steps in HISTOGRAM for generating the gray level histogram for the sixth embodiment are the same as those shown in the flow chart of FIG. 2.

The colony screening method of the present invention also includes the step of selecting N global entropic threshold gray levels. This step is shown in block C of FIG. 33. The selecting step includes the sub-steps of sequentially partitioning the gray level histogram at each gray level into a first and a second partition. The entropy function is computed for each partition, where the entropy function of the histogram is defined as the sum of the entropy functions for the first and second partitions. A global entropic threshold gray level is then selected such that the entropy function of the histogram is maximized. The selecting step further includes the sub-step of subdividing the gray level histogram using the global entropic threshold gray level which was used to maximize the entropy function of the histogram as an upper delimiter and a lower delimiter to create an upper histogram and a lower histogram. This step is shown in block C of FIG. 33. The partitioning, computing and selecting steps are then repeated for each of the upper and lower histograms, where the repetition of the selecting step selects a next successive global entropic threshold gray level. The subdividing step is then repeated using the next successive global entropic threshold gray level as the global entropically selected threshold gray level to iteratively calculate the N global entropic threshold gray levels. The module ENTROPY is used to perform these sub-steps. The steps of the module ENTROPY are the same as those shown in FIG. 3.

The colony screening method of the present invention also comprises the step of subdividing the original histogram into N +i histograms using the N global entropic threshold gray levels as shown in block D of FIG. 33.

The colony screening method of the present invention also comprises the step of searching portions of the image corresponding to each sub-histogram using each of the N global entropically selected threshold gray levels for at least one candidate colony. This step is shown in block E of FIG. 33. The candidate feature has at least one candidate colony attribute value. The searching step includes the sub-steps of scanning portions of the image corresponding to each sub-histogram for at least one candidate feature using the global entropically selected threshold gray level and tracing the candidate colony having a plurality of boundary gray levels determined by the entropically selected threshold gray level. The sub-steps of the searching step are performed by the module SEARCH IMAGE as shown in FIG. 5, FIND OBJECT as shown in FIG. 6 and TRACE OBJECT as shown in FIG. 7. The steps of these modules are the same as those shown in FIGS. 5–7, except that the term "object" is replaced with the term "colony". The module CHK GRAY as shown in FIG. 8 with the term "object" replaced with the term "colony" may be run for the colony screening embodiment in order to retain the candidate colonies which are relatively lighter than the background. To identify colonies darker than the background, the image is inverted immediately after it has been generated.

The colony screening method of the present invention also comprises the step of validating the candidate colony having the valid colony predetermined attribute value to identify the valid colony. This step is shown by block F of FIG. 33. The validating step includes the sub-steps of calculating the candidate colony attribute values and comparing the candidate colony attribute values to the valid colony predetermined attribute values to validate the candidate colony. The validating step further includes the sub-step of checking for redundancies of the validate colony to prevent multiple identification of the valid colony. The redundancy checking sub-step is performed by the module CHK LIST as described above for the first embodiment in FIGS. 11A–D and 13A–B, and the module SET STAT as described with respect to FIGS. 12 and 14, except that the term "object" in these flow charts is replaced with the term "colony".

The colony screening method of the present invention further includes the step of performing a final check for redundancies of the valid colony and resolving the redundancies to prevent multiple identification of the valid colony. The final redundancy checking sub-step is performed by the module FINAL CHK as described above for the first embodiment in FIGS. 15A–B and the module INT STAT as described with respect to FIG. 16, except that the term "object" in these flow charts is replaced with the term "colony".

The colony screening method of the present invention further includes the step of filtering the image after the validation step. The filtering step for inhomogeneous objects is performed by the module CALCON as shown in FIGS. 17A–D and for homogeneous objects is performed by the module CALCON as shown in FIGS. 18A–B as described above with respect to the first embodiment, except that the term "object" in these flow charts is replaced with the term "colony".

The colony screening method according to the sixth embodiment of the present invention further includes the step of determining the number of valid colonies in a candidate clump. The determining step is performed by the module UNCLUMP as shown in FIGS. 19A–B and the module PROCESS CLUMP as shown in FIGS. 20A–B as described above with respect to the first embodiment, except that the term "object" in these flow charts is replaced with the term "colony".

The colony screening method of the present invention may be implemented in an image analysis system such as that shown in FIG. 22. Also, it will be apparent to those skilled in the art that various modifications can be made in the colony screening method of the present invention without departing from the scope and spirit of the invention. For instance, it is possible to use a co-occurrence matrix as described above in the second embodiment instead of a histogram in the colony screening method to adaptively segment an image of the colonies and the background. In addition, it is possible to use parallel processors to do colony screening.

According to a seventh embodiment of the present invention, there is provided a method of counting at least one discrete feature in a carpet, where the discrete feature has at least one predetermined attribute value. The steps of the overall method of the seventh embodiment are illustrated in FIG. 34.

Figure 34:
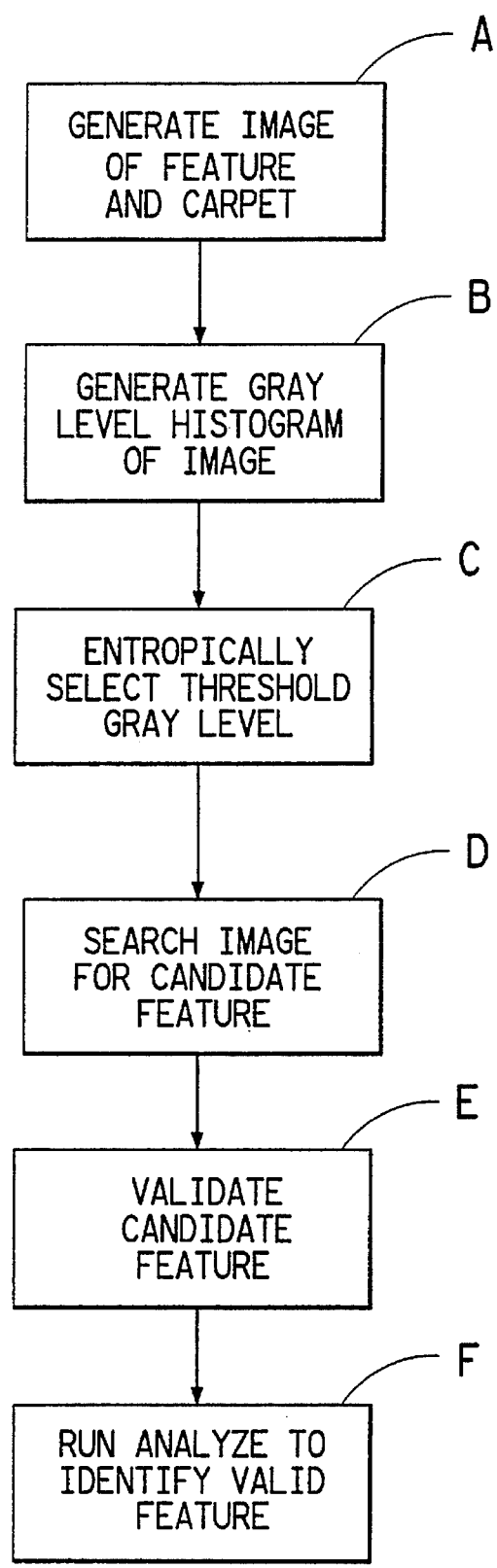
FIG. 34 is a block diagram showing the steps of the overall method of a seventh embodiment of the present invention.

As shown in block A of FIG. 34, the method comprises the step of generating an image of the feature and the carpet. As in the above embodiments, the image of the discrete feature and the carpet may be generated by a camera. The image is then digitized and stored by a frame grabber or a video digitizer.

The carpet discrete feature identification method of the seventh embodiment also comprises the step of generating a gray level histogram of the image. This step is shown in block B of FIG. 34. The module HISTOGRAM is run to perform this step. The steps in HISTOGRAM for generating the gray level histogram for the seventh embodiment are the same as those shown in the flow chart of FIG. 2.

The carpet feature identification method of the seventh embodiment also includes the step of entropically selecting a threshold gray level such that the entropy function of the histogram is maximized. This step is shown in block C of FIG. 34. The selecting step includes the sub-steps of sequentially partitioning the gray level histogram at each gray level into a first and a second partition. The entropy function is computed for each partition, where the entropy function of the histogram is defined as the sum of the entropy functions for the first and second partitions. A threshold gray level is then selected such that the entropy function of the histogram is maximized. The module ENTROPY is used to perform these sub-steps. The steps of the module ENTROPY are the same as those shown in FIG. 3.

The carpet feature identification method of the present invention also comprises the step of searching the image using the selected threshold grey level for at least one candidate feature. This step is shown in block D of FIG. 34. The candidate feature has at least one candidate feature attribute value. The searching step includes the sub-steps of scanning the image for at least one candidate feature using the entropically selected threshold gray level and tracing the candidate feature having boundary gray levels determined by the entropically selected threshold gray level. The sub-steps of the searching step are performed by the module SEARCH IMAGE as shown in FIG. 5, FIND OBJECT as shown in FIG. 6 and TRACE OBJECT as shown in FIG. 7. The steps of these modules are the same as those shown in FIGS. 5–7, except that the term "object" is replaced with the term "feature". The module CHK GRAY as shown in FIG. 8 with the term "object" replaced by the term "feature" may be run for the carpet feature embodiment in order to retain the candidate features which are relatively lighter than the background. To identify features darker than the background, the image is inverted immediately after it has been generated.

The method of the embodiment of the present invention also comprises the step of validating the candidate feature having the valid feature predetermined attribute value to identify the valid feature. This step is shown by block E of FIG. 34 and is performed by the module TRACE OBJECT as shown in FIG. 7. The validating step includes the sub-steps of calculating the candidate feature attribute values and comparing the candidate feature attribute values to the valid feature predetermined attribute values to validate the candidate feature. The validating step further includes the sub-step of checking for redundancies of the valid feature to prevent multiple identification of the valid feature. The redundancy checking sub-step is performed by the module CHK LIST as described above for the first embodiment in FIGS. 11A–D and 13A–B, and the module SET STAT as described with respect to FIGS. 12 an 14, except that the term "object" is replaced with the term "feature".

The carpet feature identification method of the present invention also comprises the step of subdividing the gray level histogram into an upper histogram and a lower histogram using the entropically selecting threshold gray level which was previously selected to maximize the entropy function of the histogram as an upper delimiter and a lower delimiter. The method also comprises the step of recursively repeating the selecting, searching, validating and subdividing steps for each of the upper and lower histograms, where the repetition of the selecting step selects a next successive entropic threshold gray level. This repetition recursively partitions the gray level histogram to identify the valid features until a predetermined minimum number of new valid features is counted. This recursive repetition is performed by the module ANALYZE, which is run as shown in block F in FIG. 34. The steps of the ANALYZE module for carpet feature identification are the same as those shown in FIG. 10, except that the term "object" in these flow charts is replaced with the term "feature".

The carpet feature identification method of the seventh embodiment of the present invention further includes the step of performing a final check for redundancies of the valid feature and resolving the redundancies to prevent multiple identification of the valid feature. The final redundancy checking sub-step is performed by the module FINAL CHK as described above for the first embodiment in FIGS. 15A–B, and the module INT STAT as described with respect to FIG. 16, except that the term "object" in these flow charts is replaced with the term "feature".

The carpet feature identification method of the seventh embodiment of the present invention further includes the step of filtering the image after the validation step. The filtering step for inhomogeneous features is performed by the module CALCON as shown in FIGS. 17A–D and for homogeneous features is performed by the module CALCON as shown in FIGS. 18A–B as described above with respect to the first embodiment, except that the term "object" in these flow charts is replaced with the term "feature".

The carpet feature identification method of the present invention may be implemented in an image analysis system such as that shown in FIG. 22. Also, it will be apparent to those skilled in the art that various modifications can be made in the carpet feature identification method of the present invention without departing from the scope and spirit of the invention. For instance, it is possible to use a co-occurrence matrix as described above in the second embodiment instead of a histogram in the carpet feature identification method to adaptively segment an image of the features and the carpet. In addition, either the iterative or the parallel processing method may be used to do carpet feature identification.

According to an eighth embodiment of the present invention, there is provided a method of counting at least one pigment element embedded in a polymer. The pigment element has at least one predetermined attribute value. The steps of the overall method of the eighth embodiment are illustrated in FIG. 35.

Figure 35:
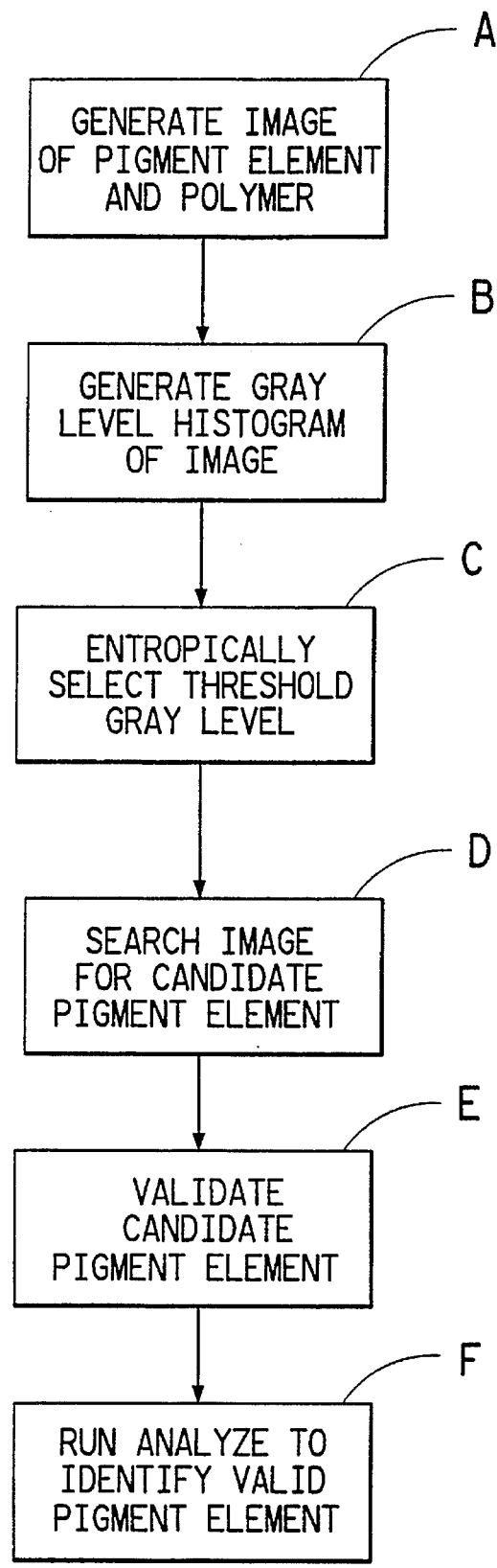
FIG. 35 is a block diagram showing the steps of the overall method of an eighth embodiment of the present invention.

As shown in block A of FIG. 35, the method comprises the step of generating an image of the pigment element and the polymer. As in the above embodiments, the image of the pigment element and the polymer may be generated by a camera. The image is then digitized and stored by a frame grabber or a video digitizer.

The method of the eighth embodiment of the present invention also comprises the step of generating a gray level histogram of the image. This step is shown in block B of FIG. 35. The module HISTOGRAM is run to perform this step. The steps in HISTOGRAM for generating the gray level histogram for the pigment element identification method are the same as those shown in the flow chart of FIG. 2.

The method of the eighth embodiment of the present invention also includes the step of entropically selecting a threshold gray level such that the entropy function of the histogram is maximized. This step is shown in block C of FIG. 35. The selecting step includes the sub-steps of sequentially partitioning the gray level histogram at each gray level into a first and a second partition. The entropy function is computed for each partition, where the entropy function of the histogram is defined as the sum of the entropy functions for the first and second partitions. A threshold gray level is then selected such that the entropy function of the histogram is maximized. The module ENTROPY is used to perform these sub-steps. The steps of the module ENTROPY are the same as those shown in FIG. 3.

The pigment element identification embodiment also comprises the step of searching the image using the entropically selected threshold grey level for at least one candidate pigment element. This step is shown in block D of FIG. 35. The candidate pigment element has at least one candidate pigment element attribute value. The searching step includes the sub-steps of scanning the image for at least one candidate pigment element using the entropically selected threshold gray level and tracing the candidate pigment element having boundary gray levels determined by the entropically selected threshold gray level. The sub-steps of the searching step are performed by the module SEARCH IMAGE as shown in FIG. 5, FIND OBJECT as shown in FIG. 6 and TRACE OBJECT as shown in FIG. 7. The steps of these modules are the same as those shown in FIGS. 5–7, except that the term "object" is replaced with the term "pigment element". The module CHK GRAY as shown in FIG. 8 with the term "object" replaced by the term "pigment element" may be run for the pigment element identification embodiment in order to retain the candidate pigment elements which are relatively lighter than the polymer. To identify pigment elements darker than the polymer, the image is inverted immediately after it has been generated.

The method of the pigment element identification embodiment of the present invention also comprises the step of validating the candidate element having the valid element predetermined attribute value to identify the valid pigment element. This step is shown by block E of FIG. 34 and is performed by the module TRACE OBJECT. The validating step includes the sub-steps of calculating the candidate pigment element attribute values and comparing the candidate pigment element attribute values to the valid pigment element predetermined attribute values to validate the candidate pigment element. The validating step further includes the sub-step of checking for redundancies of the valid pigment element to prevent multiple identification of the valid element. The redundancy checking sub-step is performed by the module CHK LIST as described above for the first embodiment in FIGS. 11A–D and 13A–B, and the module SET STAT as shown in FIGS. 12 and 14, except that the term "object" in these flow charts is replaced with the term "pigment element".

The method of the pigment element identification embodiment of the present invention also comprises the step of subdividing the gray level histogram into an upper histogram and a lower histogram using the entropically selecting threshold gray level which was previously selected to maximize the entropy function of the histogram as an upper delimiter and a lower delimiter. The method also comprises the step of recursively repeating the selecting, searching, validating and subdividing steps for each of the upper and lower histograms, where the repetition of the selecting step selects a next successive entropic threshold gray level. This repetition recursively partitions the gray level histogram to identify the valid pigment elements until a predetermined minimum number of new valid pigment elements is counted. This repetition is performed by the module ANALYZE, which is run as shown in block F in FIG. 35. The steps of the ANALYZE module for pigment element identification are the same as those shown in FIG. 10, except that the term "object" is replaced with the term "pigment element".

The pigment element identification method of the present invention further includes the step of performing a final check for redundancies of the valid pigment element and resolving the redundancies to prevent multiple identification of the valid pigment element. The final redundancy checking sub-step is performed by the module FINAL CHK as described above for the first embodiment in FIGS. 15A–B and the module INT STAT as shown in FIG. 16, except that the term "object" in these flow charts is replaced with the term "pigment element".

The pigment element identification method of the present invention further includes the step of filtering the image after the validation step. The filtering step for inhomogeneous pigment elements is performed by the module CALCON as shown in FIGS. 17A–D and for homogeneous pigment elements is performed by the module CALCON as shown in FIGS. 18A–B as described above with respect to the first embodiment, except that the term "object" in these flow charts is replaced with the term "pigment element".

The pigment element identification method of the present invention further may include the step of determining the number of valid pigment elements in a candidate clump. The determining step may be performed by the module UNCLUMP as shown in FIGS. 19A–B and the module PROCESS CLUMP as shown in FIGS. 20A–B as described above with respect to the first embodiment, except that the term "object" in these flow charts is replaced with the term "pigment element".

The pigment element identification method of the present invention may be implemented in an image analysis system such as that shown in FIG. 22. Also, it will be apparent to those skilled in the art that various modifications can be made in the pigment element identification method of the present invention without departing from the scope and spirit of the invention. For instance, it is possible to use a co-occurrence matrix as described above in the second embodiment instead of a histogram in the pigment element identification method to do adaptive thresholding. In addition, either the iterative or the parallel processing method may be used to do pigment element identification.

The invention will be further clarified by the following examples, which are intended to be purely exemplary of the invention.

EXAMPLE I

In this example, an application of the method and the image analysis system of the colony counting embodiment is described. Colony counting is a task routinely performed in microbiology laboratories for quantitating the amount of bacteria in a sample. The sample can be one of a number of different types such as blood, food, cosmetics, soil, etc. Colony counting has been performed using the present system to identify and quantitate:

(i) aerobic bacteria on a BHI (Brain Heart Infusion) agar plate (inhomogeneous colonies), and (ii) Salmonella colonies on a Hektoen Enteric agar plate (homogeneous colonies).

In addition, the system is capable of identifying and quantitating different species of bacteria on a plate containing more than one species. This is useful for identifying pathogenic bacteria in plate containing both pathogenic and non-pathogenic organisms.

The apparatus used in this Example to count colonies comprised a Petri dish holder to hold the plate, an optical system for illuminating the plate and an image acquisition system to generate an image of the sample on the plate as described above with respect to FIG. 22. A video signal from a camera was fed into a frame grabber which occupies a slot in a PC. The frame grabber digitized the image.

The Petri dish holder comprised a movable, machined member which can accept standard Petri dishes. The member had a countersunk circular indent capable of accepting the dishes and was slid into place via a bearing-based support. Below the holder, there was room to insert an appropriate background sheet to enhance image contrast.

The illumination source used comprised a Philip FCC 8TV/WE circular fluorescent lamp (8" diameter) which surrounded the Petri dish. The lamp was mounted approximately 1" above the dish and illuminated the dish uniformly from all sides. The distance between the lamp and the dish is important. If the lamp is too high, the resulting image will reveal significant "glaring" and "haloing" from the curved surfaces of the colonies. The colonies can be considered small 3D lenses, and oblique, grazing angle illumination is necessary so that light scattering from the lens-like surfaces does not enter the camera. The lamp was actively stabilized using a Mercer FLU0416-2 controller which kept the light level constant, to prevent fluctuations in output. In addition, the controller was remotely programmable to adjust the brightness of the lamp. This feature is especially useful for colony plates where the inherent contrast is variable. For low contrast plates, the light level can be increased to improve the contrast.

The optical system comprised a Stony XI-77 monochrome CAD video camera with a 16 mm F2.8 Nikkor lens. The camera was centered above the Petri dish at a distance of approximately 1.5 feet. The distance from the camera to the dish was such that the disk just filled the surface of the CCD sensor in order to maximize spatial resolution. A black DELRIN light shield extended from the camera to the plate to prevent stray light from entering the camera. The video signal from the camera went directly to the frame grabber on the PC.

The image acquisition system comprised a Data Translation DT2851 frame grabber board which occupied an expansion slot on the PC. A Dell 33 MHZ 386AT system was used to store images and execute the colony screening method of the present invention. The frame grabber board had a 512×512 pixel video buffer in which the digitized image was stored. In order to minimize "shot" noise from the camera, several image frames were averaged, and the resulting averaged image was stored and used for further analysis. The output of the frame grabber was connected to a Sony TRINITRON monitor to display the image.

The attributes for valid colonies as defined in the driver for this application are shown in Table 1. The range of attribute values for inhomogeneous colonies is shown in Table 2. The range of attribute values for homogeneous colonies is shown in Table 3.

The three-prong filter described above for filtering inhomogeneous colonies was used for sample (i) above. The artifact removal filter described for homogeneous objects in the specification was used for filtering sample (ii) above. The redundancy check for inhomogeneous objects described above was used for redundancy checking in sample (i). The redundancy check for homogeneous objects described above was used for redundancy checking in sample (ii).

Figure 36:
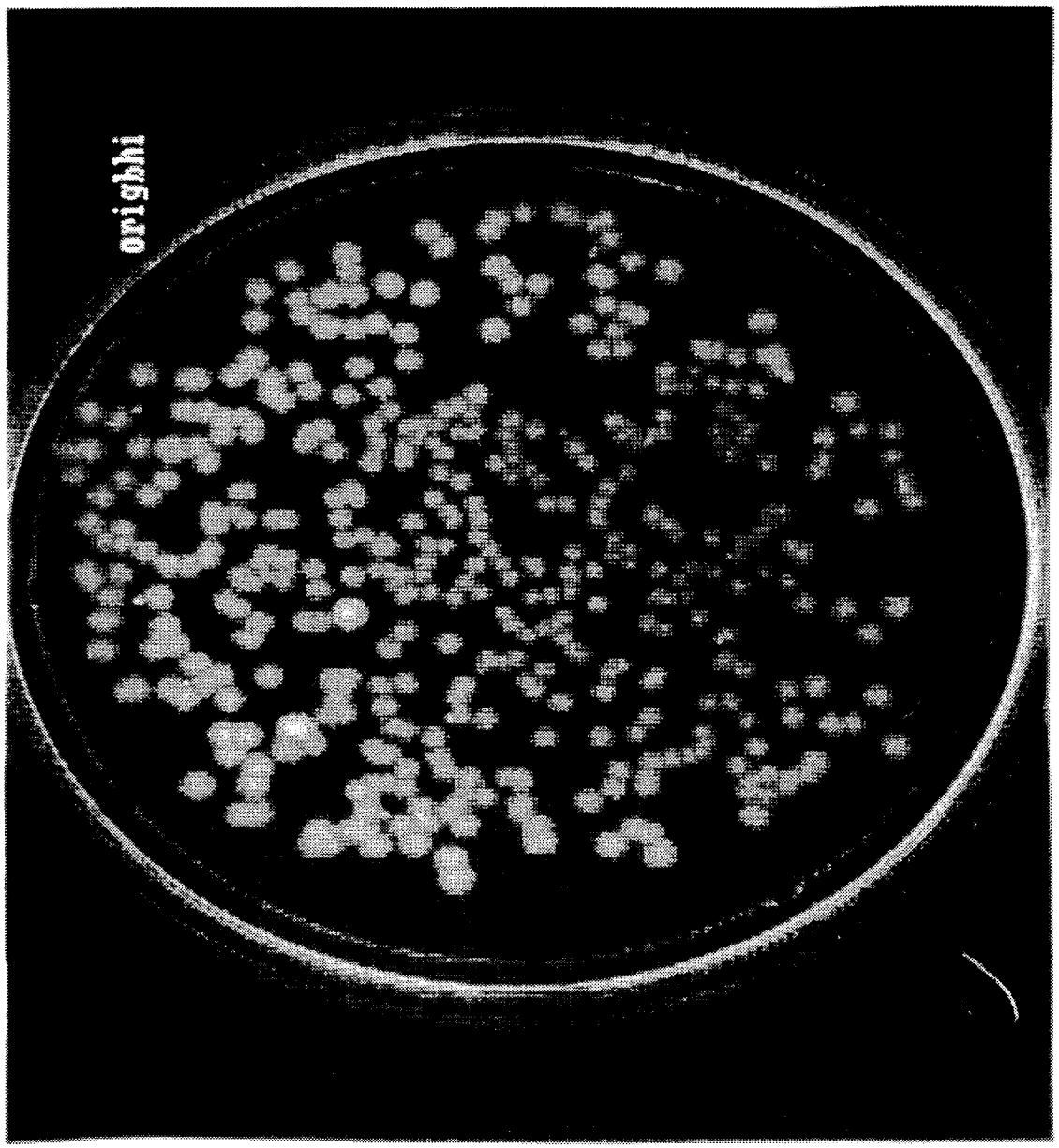
FIG. 36 is a photograph of an unprocessed image of aerobic bacteria present on BHI plates as described in Example I.
Figure 37:
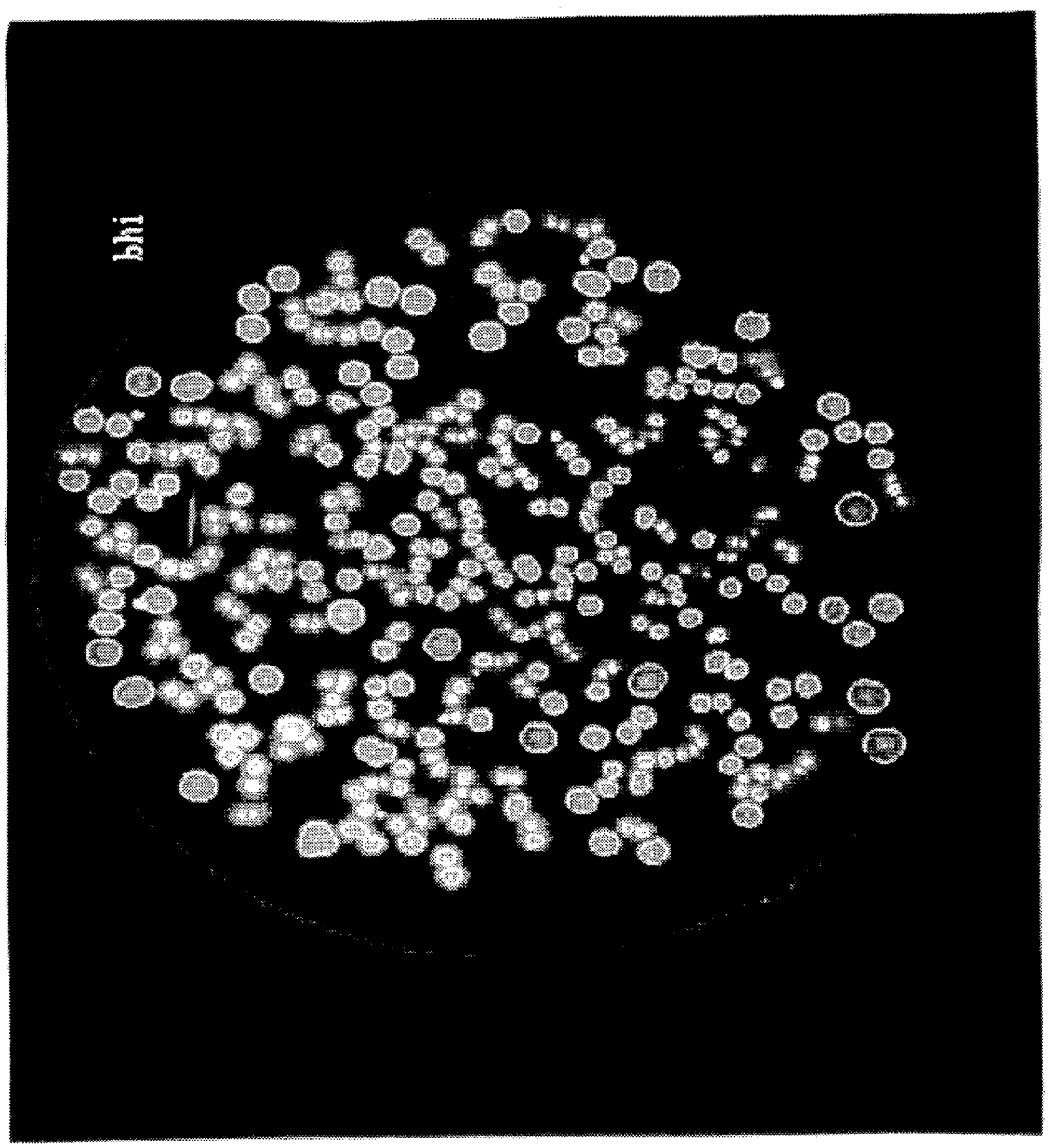
FIG. 37 is a photograph of a processed image which has white circles superimposed on identified colonies as described in Example I.
Figure 38:
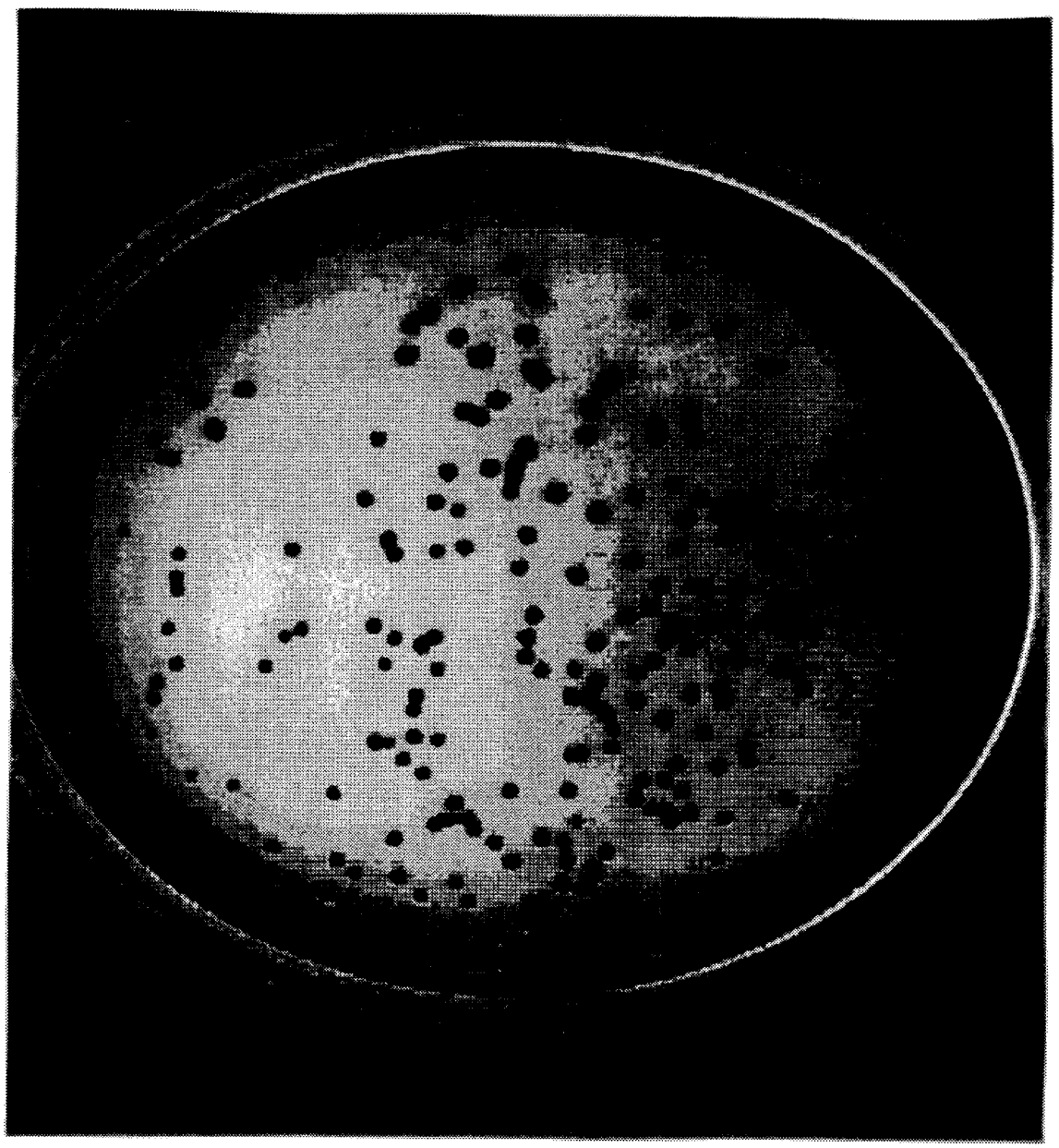
FIG. 38 is a photograph of an unprocessed image of Salmonella colonies on Hektoen plates as described in Example I.
Figure 39:
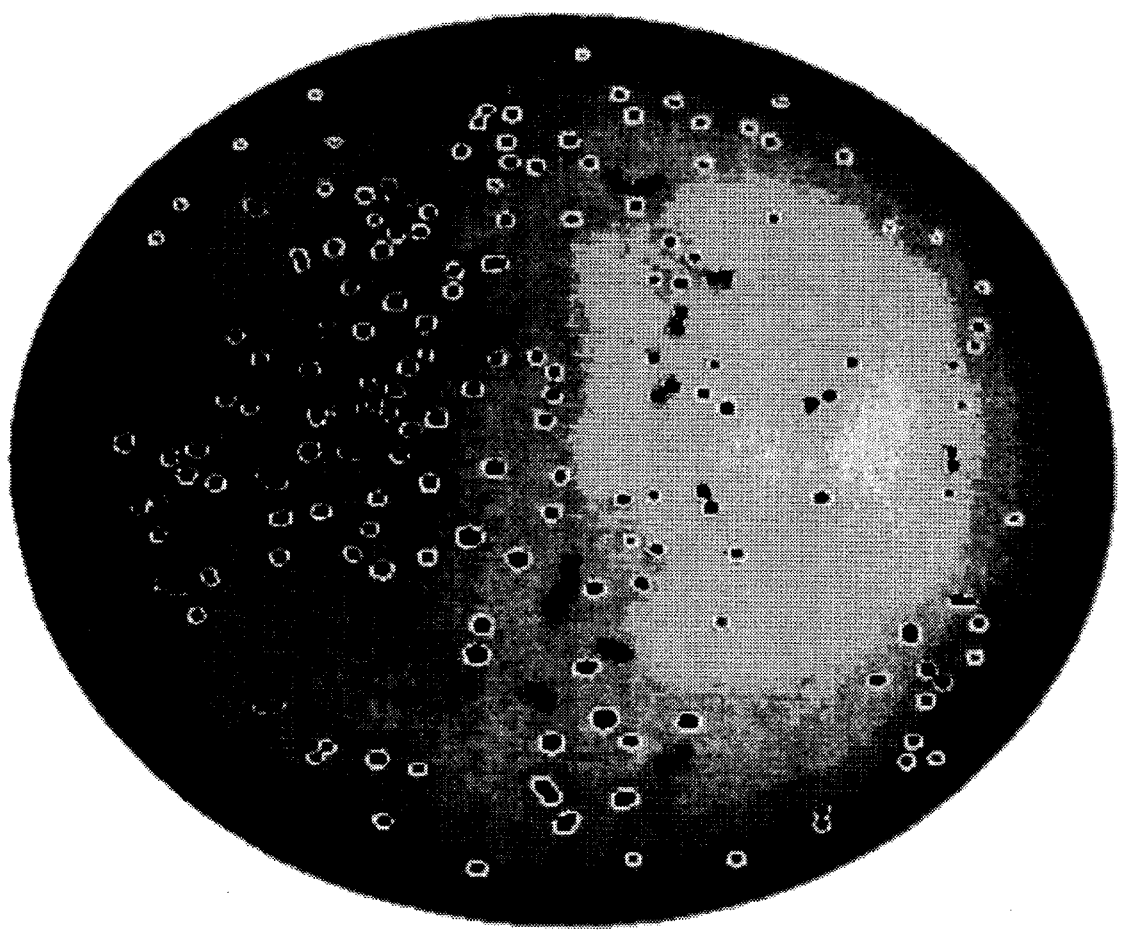
FIG. 39 is a photograph of a processed image which shows isolated dark colonies traced in white and clumped colonies traced in two shades of gray as described in Example I.

FIG. 36 is a photograph of an unprocessed image of the aerobic bacteria present on BHI plates. FIG. 37 is a photograph of the processed image which has white circles superimposed on the identified colonies. Evident is the excellent spatial resolution of the analysis system of the present invention as shown by its ability to resolve colonies which are very closely spaced in clusters. FIG. 38 is a photograph of an unprocessed image of the Salmonella colonies on Hektoen plates. The unprocessed plate shows dark colonies in a gray background. FIG. 39 is photograph of the processed image which shows isolated dark colonies traced in white, and clumped colonies traced in two shades of gray. Clumps identified as doublets are shown traced in dark gray, and clumps with three or more colonies are shown traced in a lighter gray.

Figure 40:
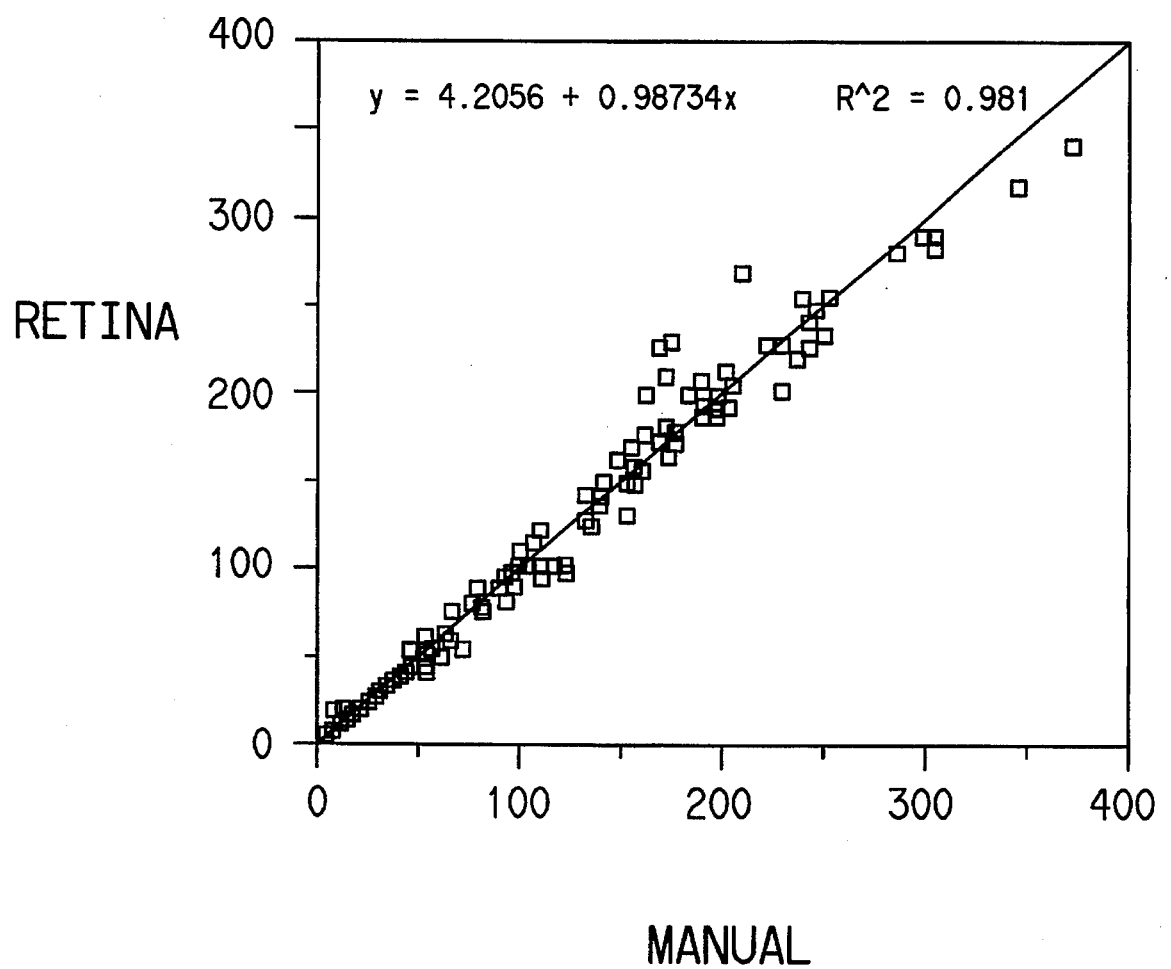
FIG. 40 is a graph comparing the results of Example I with those obtained by manually counting colonies.

For the BHI plates, 150 plates were processed with the image analysis system of the fifth embodiment, where the colony population ranged from 0–350 and compared to a manual counting of the same plates. A correlation curve is shown in FIG. 40. The square of the linear correlation coefficient for a least squares linear fit is shown to be 0.981. The average difference between the method according to the fifth embodiment of the present invention and manual counting was approximately 8%.

Table 1

Attributes of objects (1) xcm=x coordinate of object center of mass
(2) ycm=y coordinate of object center of mass
(3) perim=total length of perimeter of object
(4) npts=number of perimeter points in image
(5) obj_type=type of object (Exterior or Interior)
  Exterior=object never contained within another object
  Interior=object previously contained within another object
(6) area=area of object
(7) shape=shape factor of object
(8) status=status value of object which is used in artifact removal and redundancy checking in several different ways
(9) contrast=edge contrast of object
(10) edge=data structure containing coordinates of extremum points of object
(11) thresh=threshold at which object was detected
(12) max=maximum gray level of histogram partition in which object was detected
(13) clump_shape=maximum shape factor for a candidate clumped object
(14) clump_size=minimum area for a clump of candidate objects
(15) worst_shape=minimum shape factor for a clump of candidate objects

TABLE 2

| Range of Attribute values for inhomogeneous colonies | |
|---|---|
| Attribute | Valid Range |
| (1) xcm = x coordinate of object center of mass | Descriptor |
| (2) ycm = y coordinate of object center of mass | Descriptor |
| (3) perim = total length of perimeter of object | Descriptor |
| (4) npts = number of perimeter points in image | npts > 5 |
| (5) obj_type = type of object (Exterior or Interior)<br>Exterior = object never contained within another object<br>Interior = object previously contained within another object | Descriptor |
| (6) area = area of object | area > 0.0 |
| (7) shape = shape factor of object | shape > −0.8 |
| (8) status = status value of object which is used in artifact removal and redundancy checking in several different ways | Descriptor |
| (9) contrast = edge contrast of object | contrast > 125 |
| (10) edge = data structure containing | Descriptor |

TABLE 2-continued

| Range of Attribute values for inhomogeneous colonies | |
|---|---|
| Attribute | Valid Range |
| coordinates of extremum points of object | |
| (11) thresh = threshold at which object was detected | Descriptor |
| (12) max = maximum gray level of histogram partition in which object was detected | Descriptor |
| (13) clump_shape = maximum shape factor for a clump of candidate objects | clump_shape = −0.8 |
| (14) clump_size = minimum area for a clump of candidate objects | clump_size = 50.0 |
| (15) worst_shape = minimum shape factor for a clump of candidate objects | worst_shape = −5.0 |

Note: Only some of the attribute values require valid ranges. Others are "descriptors" which do not influence object validity.

TABLE 3

| Range of Attribute values for homogeneous colonies | |
|---|---|
| Attribute | Valid Range |
| (1) xcm = x coordinate of object center of mass | Descriptor |
| (2) ycm = y coordinate of object center of mass | Descriptor |
| (3) perim = total length of perimeter of object | Descriptor |
| (4) npts = number of perimeter points in object | npts > 3 |
| (5) obj_type = type of object (Exterior or Interior) Exterior = object never contained within another object Interior = object previously contained within another object | Descriptor |
| (6) area = area of object | area > 0.0 |
| (7) shape = shape factor of object | shape > −0.8 |
| (8) status = status value of object which is used in artifact removal and redundancy checking in several different ways | Descriptor |
| (9) contrast = edge contrast of object | contrast > 125 |
| (10) edge = data structure containing coordinates of extremum points of object | Descriptor |
| (11) thresh = threshold at which object was detected | Descriptor |
| (12) max = maximum gray level of histogram partition in which object was detected | Descriptor |
| (13) clump_shape = maximum shape factor for a clump of candidate objects | clump_shape = −0.3 |
| (14) clump_size = minimum area for a clump of candidate objects | clump_size = 30.0 |
| (15) worst_shape = minimum shape factor for a clump of candidate objects | worst_shape = −5.0 |

Note: Only some of the attribute values require valid ranges. Others are "descriptors" which do not influence object validity.

EXAMPLE II

In this Example, an application of the method and image analysis system of the colony screening embodiment is described. Colony screening is a task routinely performed in microbiology laboratories for identifying a specific type of bacteria in a sample. The sample can be one of a number of different types such as blood, food, cosmetics, soil, etc. The screening process involves "streaking" an agar plate with the sample of interest. As the sample is streaked across the plate, it effectively gets diluted, resulting in a wide range of sample concentrations over the plate. The question to be answered is whether or not the sample contains a pathogenic organism. The screening process results in a yes-no answer; absolute quantitation is not required. For this Example, the sample of interest was food, where a screening step was used to identify potentially contaminated food samples. By flagging contaminated samples, it was possible to perform effective quality control as well as separating out the contaminated food for more detailed analysis. The apparatus used to screen colonies was set up as described in Example I.

To illustrate the colony screening system, an example of a "streak" plate with Salmonella colonies on a Hektoen Enteric agar plate was provided. The goal was to flag this plate as a contaminated plate; absolute quantitation was not required. The complexity of this plate was shown in the varying background introduced in the streaking process. The attributes for valid colonies as defined in the driver for this Example are the same as those shown in Table 1. The range of attribute values for screening is shown in Table 4.

TABLE 4

| Range of Attribute values for screening | |
|---|---|
| Attribute | Valid Range |
| (1) xcm = x coordinate of object center of mass | Descriptor |
| (2) ycm = y coordinate of object center of mass | Descriptor |
| (3) perim = total length of perimeter of object | Descriptor |
| (4) npts = number of perimeter points in object | npts > 3 |
| (5) obj_type = type of object (Exterior or Interior) Exterior = object never contained within another object Interior = object previously contained within another object | Descriptor |
| (6) area = area of object | area > 0.0 |
| (7) shape = shape factor of object | shape > −0.8 |
| (8) status = status value of object which is used in artifact removal and redundancy checking in several different ways | Descriptor |
| (9) contrast = edge contrast of object | contrast > 100 |
| (10) edge = data structure containing coordinates of extremum points of object | Descriptor |
| (11) thresh = threshold at which object was detected | Descriptor |
| (12) max = maximum gray level of histogram partition in which object was detected | Descriptor |
| (13) clump_shape = maximum shape factor for a clump of candidate objects | Unused |
| (14) clump_size = minimum area for a clump of candidate objects | Unused |
| (15) worst_shape = minimum shape factor for a clump of candidate objects | Unused |

Note: Only some of the attribute values require valid ranges. Others are "descriptors" which do not influence object validity.

For the screening Example, the artifact removal filter algorithm comprised two steps:

(i) a candidate colony was deleted if it had an area less than a predetermined area; and (ii) a candidate colony was deleted if it had an edge contrast less than a predetermined minimum edge contrast.

The redundancy checking sub-steps for homogeneous objects described above was used for redundancy checking in this Example, with the proviso that for overlapping objects, the criterion used for determining which object to retain was always to keep the larger object. There was no unclumping performed in the screening method of this Example.

Figure 41:
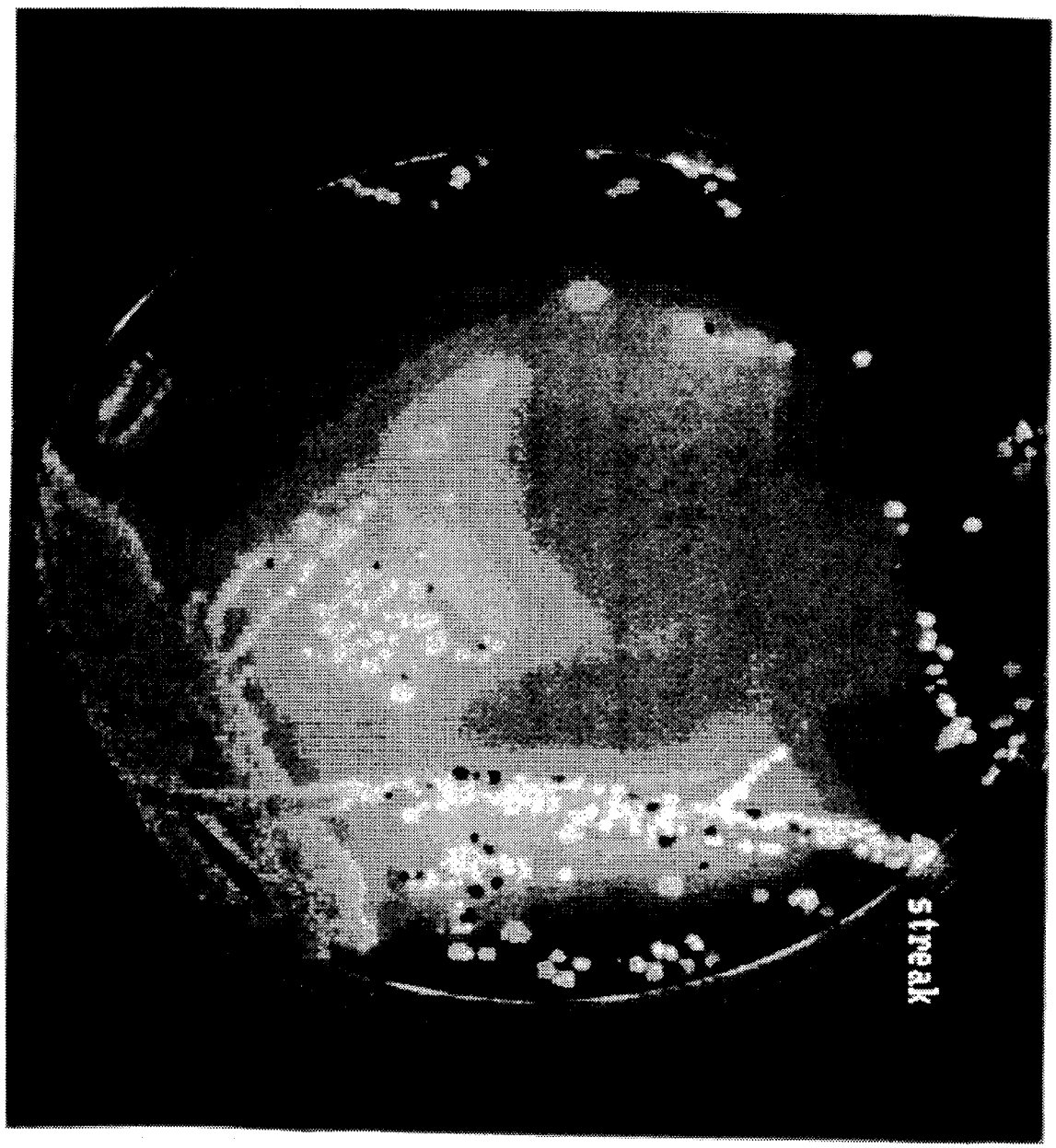
FIG. 41 is a photograph of an unprocessed image of a streak plate as described in Example II.
Figure 42:
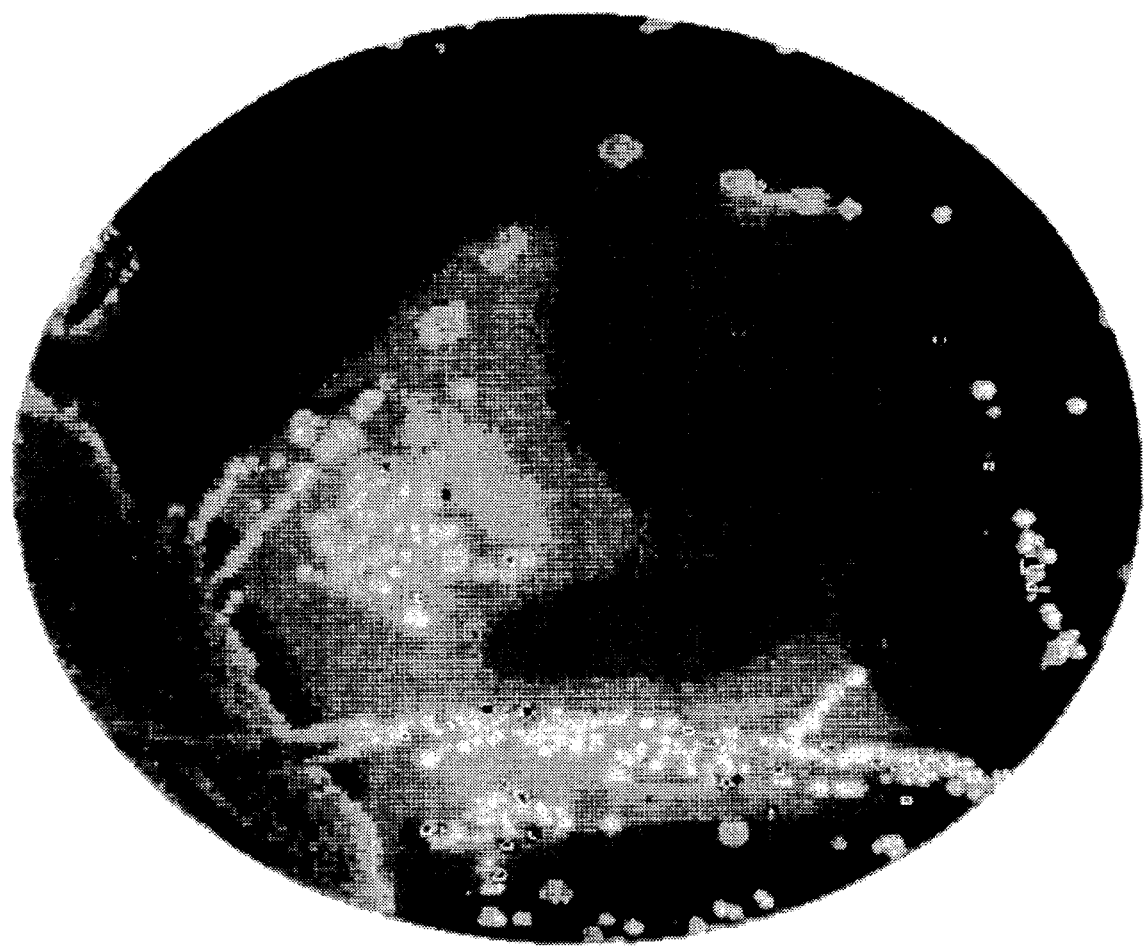
FIG. 42 is a photograph of a processed image of the streak plate as described in Example II.

FIG. 41 is a photograph of an unprocessed image of the "streak" plate. The dark colonies are the Salmonella colonies which needed to be identified. The large mass of background (light) colonies present at the lower right corner of the plate is typical of the noisy background present in the "streak" plate. FIG. 42 is a photograph of a processed image of the "streak" plate. The identified Salmonella colonies are traced with a white border. The only colonies missed were those in clumps. Clumped colonies were purposely not included, since otherwise the possibility of introducing artifacts is significantly enhanced on the messier streak plates. The argument is that for plates with significant numbers of pathogenic colonies, there will always be isolated colonies which can be identified positively to yield a "yes" answer to the question of whether the plate is contaminated. For plates with very few pathogenic colonies, the pathogenic colonies are highly likely to be unclumped (i.e., isolated) and will thus be identified.

On a sample set of 99 "streak" plates, 89 plates analyzed by IETNA agreed with manual determination of whether the plates were positive (i.e. contained the Salmonella organism) or negative (i.e. did not contain the Salmonella organism). There were four "false negatives" where IETNA as used for colony screening failed to flag any Salmonella organisms on plates where it was manually determined that such organisms were present. There were six "false positives" in this Example, where IETNA as used for colony screening flagged plates as containing Salmonella organisms. This is contrasted with manual determination which indicated that there were no such organisms present.

EXAMPLE III

In this Example, an application of the image analysis system and method of the carpet feature identification embodiment is described. A major factor influencing the appearance of carpets is the presence of discrete features, such as defects, on the carpet surface. Defects such as streaks, "chevrons" (which have a chevron like shape and appear fairly periodically across the carpet surface) can result from problems in the carpet processing cycle and need to be identified in a timely fashion to maintain high-quality product.

The present invention has been adapted towards this end as a general purpose "Discrete Feature Analyzer", where a variety of defects can be identified on the complex background of a carpet surface. For a specific defect, the attributes of the defect can be defined in the driver, and the present invention will then identify all instances of that particular defect.

The carpet sample used for analysis was a Suessen set, fluid-dyed, two-ply, 1150 denier sample obtained from. E. I. du Pont de Nemours and Company of Wilmington, Del. (hereinafter referred to as "DuPont"). This sample had several "blob" like defects distributed over the surface which needed to be identified.

The apparatus used to generate the carpet images consisted of a Macbeth Spectra Light SPL-65 light box, a Sony XC-77 CCD camera, a Data Translation 2851 frame grabber board and a PC. The light box ensured that the spectral energy distribution of the illuminating light matched the spectral energy distribution of sunlight. The camera viewed the carpet sample at an oblique angle to maximize the contrast of the defects.

The attributes for valid defects as defined in the driver are the same as those shown in Table 1. The range of attribute values for valid defects is shown in Table 5.

TABLE 5

Range of Attribute values for carpets

| Attribute | Valid Range |
|---|---|
| (1) xcm = x coordinate of object center of mass | Descriptor |
| (2) ycm = y coordinate of object center of mass | Descriptor |
| (3) perim = total length of perimeter of object | Descriptor |
| (4) npts = number of perimeter points in object | npts > 10 |
| (5) obj_type = type of object (Exterior or Interior) Exterior = object never contained within another object Interior = object previously contained within another object | Descriptor |
| (6) area = area of object | area > 0.0 |
| (7) shape = shape factor of object | shape > −10.0 |
| (8) status = status value of object which is used in artifact removal and redundancy checking in several different ways | Descriptor |
| (9) contrast = edge contrast of object | contrast > 0 |
| (10) edge = data structure containing coordinates of extremum points of object | Descriptor |
| (11) thresh = threshold at which object was detected | Descriptor |
| (12) max = maximum gray level of histogram partition in which object was detected | Descriptor |
| (13) clump_shape = maximum shape factor for a clump of candidate objects | Unused |
| (14) clump_size = minimum area for a clump of candidate objects | Unused |
| (15) worst_shape = minimum shape factor for a clump of candidate objects | Unused |

Note: Only some of the attribute values require valid ranges. Others are "descriptors" which do not influence object validity.

For identifying defects, the artifact removal comprised three steps:

(i) a candidate defect was deleted if it had an area less than a predetermined area;

(ii) a candidate defect was deleted if it had an edge contrast less than a predetermined minimum edge contrast;

(iii) a candidate defect was deleted if it had a shape factor less than a predetermined shape factor.

The redundancy check for homogeneous defects described above was used for redundancy checking in this Example with a proviso that for overlapping defects, the criterion used for determining which defects to retain was always to keep the larger defects. There was no unclumping performed in this Example.

Figure 43:
FIG. 43 is a photograph of an unprocessed image of the original carpet sample which shows a dark background with defects appearing as light regions as described in Example III.
Figure 44:
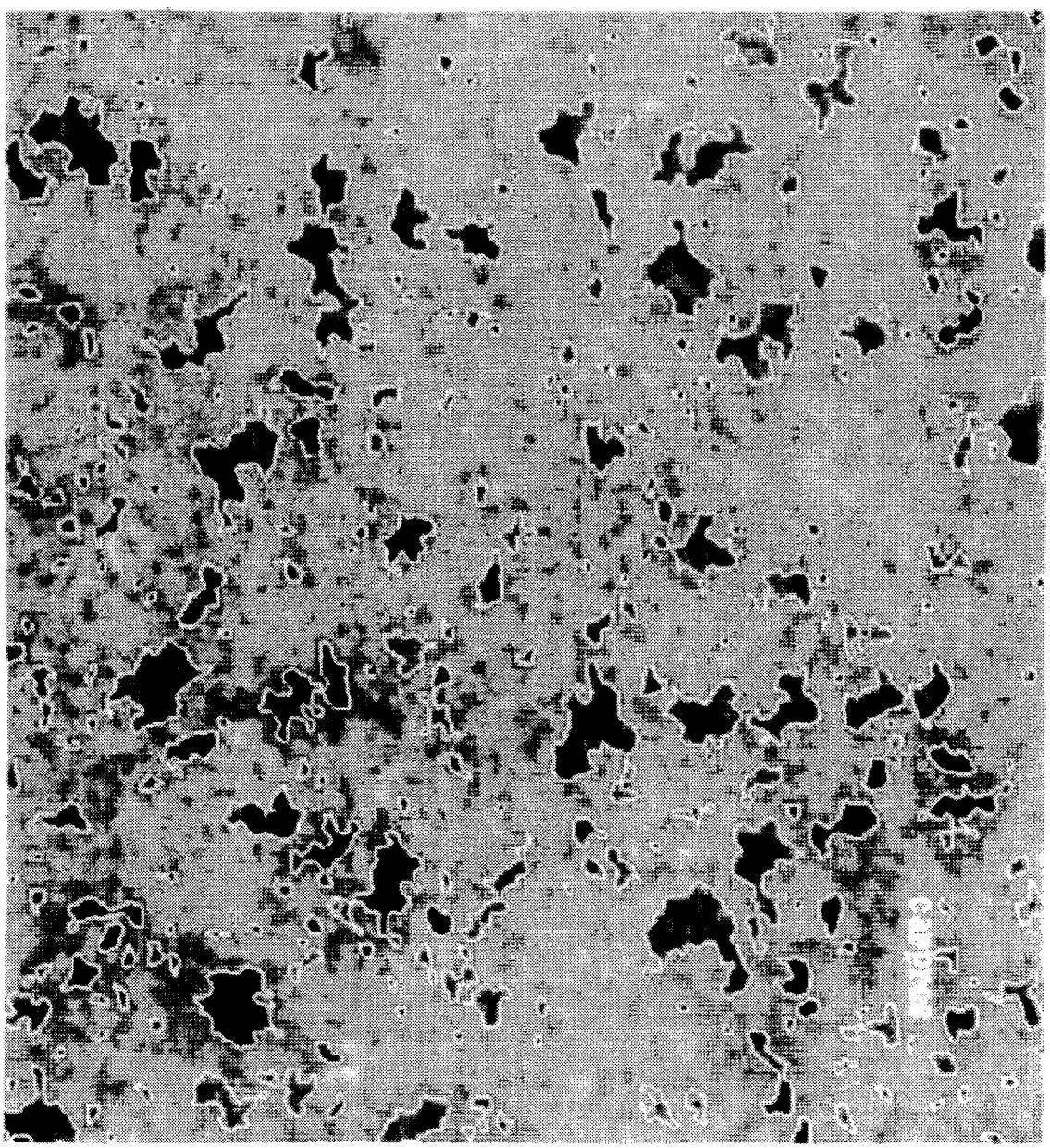
FIG. 44 is a photograph of a processed image which has been inverted in gray scale and shows the carpet defects as dark regions traced with a white border as described in Example III.

FIG. 43 is a photograph of an unprocessed image of the original carpet sample which shows a dark background with the defects appearing as light regions. FIG. 44 is a photograph of the processed image which has been inverted in gray scale and shows the carpet defects as dark regions traced with a white border. The processed image was also filtered spatially three times using the "low-pass" filter option provided by Data Translation. This filtered out bright, high-frequency features, such a sparkle, which are not considered defects for this analysis.

EXAMPLE IV

In this Example, an application of the method and system of the pigment element identification embodiment of the present invention is described. An important element in producing carpet fibers with uniform appearance is the amount of mixing of colored pigment elements within the fiber. To perform a quantitative study of the mixing of pigment elements with a molten polymer, it is important to be able to calculate the spatial and size distributions of the pigment elements across cross-sections of polymer emerging from a static mixer. The system of the eighth embodiment of the present invention is capable of performing these calculations by automatically identifying the pigment elements across the cross-section of the polymer.

The sample of interest contained a distribution of iron oxide pigment elements in a NRD159 carrier. NRD159 is a low molecular weight nylon derivative commercially available from Du Pont. The image of the pigment distribution was obtained from a micro-toned piece of polymer imaged through a Nikon microscope with a 20× objective. The image was focused onto a Sony XC-77 CCD camera which sent a video signal to a DEC MicroVax computer. The image was then digitized using a Date Translation DT2651 Frame Grabber board.

The attributes for valid pigments as defined in the driver are the same as shown in Table 1. The range of attribute values for valid objects (pigments) is shown in Table 6.

TABLE 6

Range of Attribute values for pigments

| Attribute | Valid Range |
|---|---|
| (1) xcm = x coordinate of object center of mass | Descriptor |
| (2) ycm = y coordinate of object center of mass | Descriptor |
| (3) perim = total length of perimeter of object | Descriptor |
| (4) npts = number of perimeter points in object | npts > 3 |
| (5) obj_type = type of object (Exterior or Interior) | Descriptor |
|    Exterior = object never contained within another object | |
|    Interior = object previously contained within another object | |
| (6) area = area of object | area > 0.0 |
| (7) shape = shape factor of object | shape > −7.0 |
| (8) status = status value of object which is used in artifact removal and redundancy checking in several different ways | Descriptor |
| (9) contrast = edge contrast of object | contrast > 0 |
| (10) edge = data structure containing coordinates of extremum points of object | Descriptor |
| (11) thresh = threshold at which object was detected | Descriptor |
| (12) max = maximum gray level of histogram partition in which object was detected | Descriptor |
| (13) clump_shape = maximum shape factor for a clump of candidate objects | Unused |
| (14) clump_size = minimum area for a clump of candidate objects | Unused |
| (15) worst_shape = minimum shape factor for a clump of candidate objects | Unused |

Note: Only some of the attribute values require valid ranges. Others are "descriptors" which do not influence object validity.

For pigment element identification, the artifact removal filter algorithm used was the same as that used for the screening process of Example II. The redundancy check algorithm for pigment element identification was the same as that used for the screening process of Example II.

Figure 45:
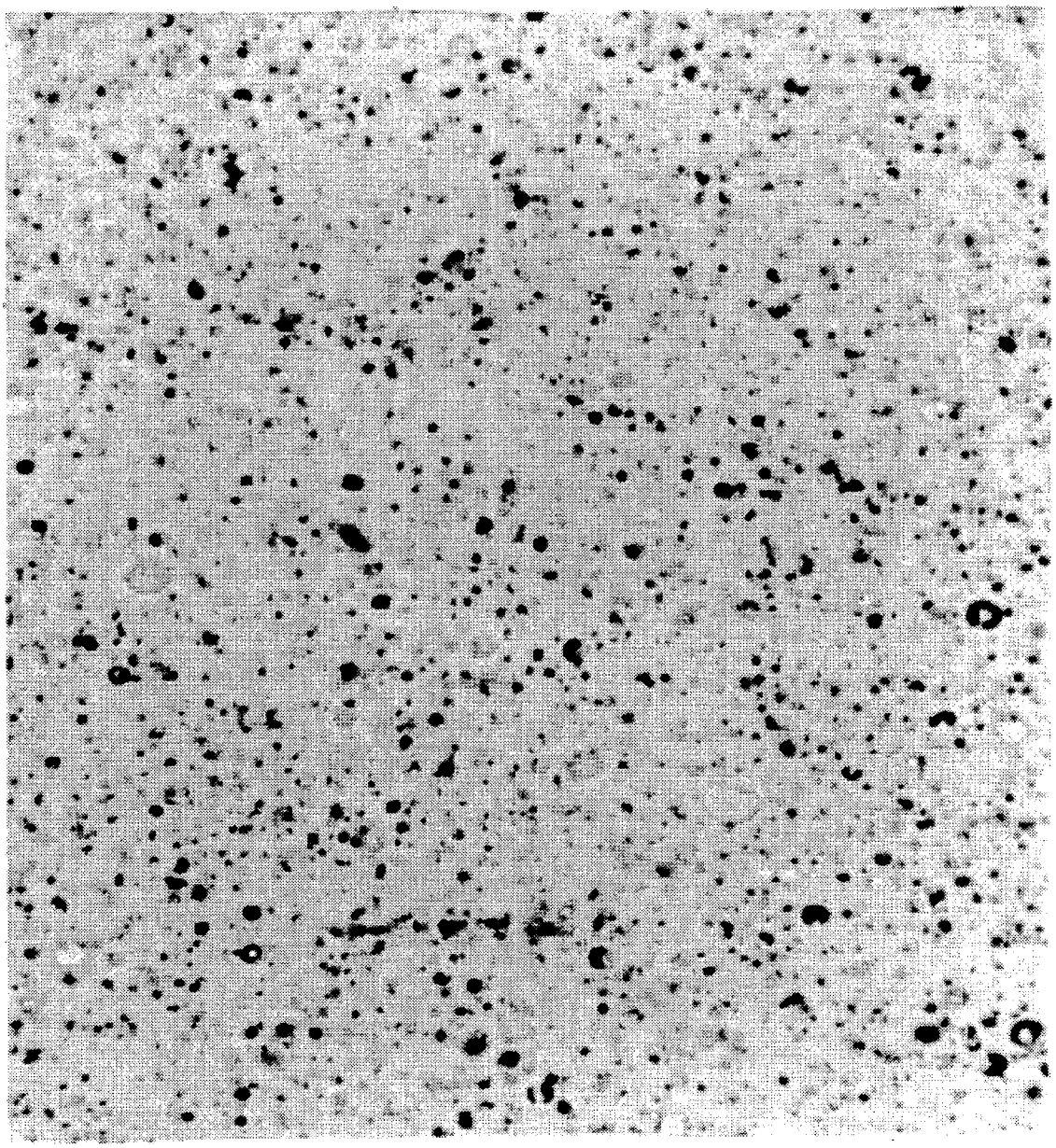
FIG. 45 is a photograph of an unprocessed image showing dark iron oxide pigments distributed across the cross-sectional area of NRD159 carrier as described in Example IV.
Figure 46:
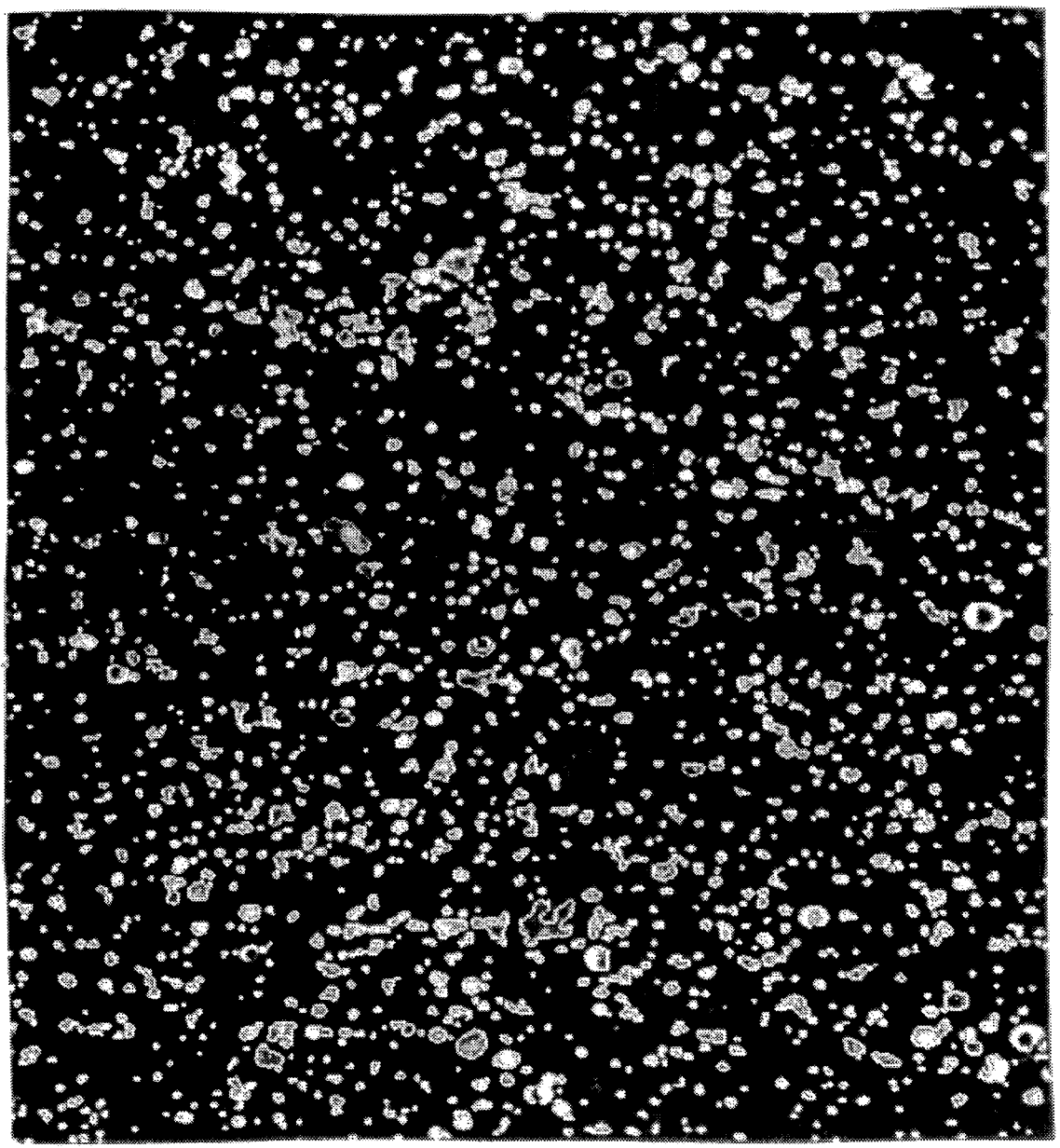
FIG. 46 is a photograph of a processed image which has been inverted in gray scale and shows the identified pigments traced in a white border as described in Example IV.

FIG. 45 is a photograph of an unprocessed image showing dark iron oxide pigments distributed across the cross-sectional area of NRD159 carrier. FIG. 46 is a photograph of the processed image which is inverted in gray scale and shows the identified pigment elements traced in a white border. The unprocessed image has pigment elements with a wide range of contrasts. Several of these pigment elements were not in the focal plane of the microscope. The adaptive nature of the invention allowed it to identify all the pigment elements. However, it would be possible to identify a subset of the pigment elements with a certain contrast range if so desired. This would effectively allow the modules of the present invention to "section" through various focal planes of material to identify pigment elements at different depths.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

I claim:

1. A method of identifying at least one valid object having at least one predetermined attribute value in a background, comprising the steps of:

(a) generating an image of the object and the background;

(b) generating a gray level histogram of the image, the gray level histogram having an entropy function;

(c) entropically selecting a threshold gray level such that the entropy function of the histogram is maximized;

(d) searching the image using the entropically selected threshold gray level for at least one candidate object, wherein the candidate object has at least one candidate object attribute value;

(e) validating the candidate object having the valid object predetermined attribute value to identify [the] a valid object;

(f) subdividing the gray level histogram into an upper histogram and a lower histogram using the entropic threshold gray level as defined by step (c) as an upper delimiter and a lower delimiter; and (g) recursively repeating steps (c)–(f) for each of the upper and lower histograms, wherein the repetition of step (c) selects a next successive entropic threshold gray level, thereby recursively partitioning the gray level histogram until a predetermined minimum number of new valid objects is identified.

2. A method of identifying at least one valid discrete feature in a carpet, the discrete feature having at least one valid feature predetermined attribute value, comprising the steps of:

(a) generating an image of the feature and the carpet;

(b) generating a gray level histogram of the image, the gray level histogram having an entropy function;

(c) entropically selecting a threshold gray level such that the entropy function of the histogram is maximized;

(d) searching the image using the entropically selected threshold gray level for at least one candidate feature, wherein the candidate feature has at least one candidate feature attribute value;

(e) validating the candidate feature having the valid feature predetermined attribute value to identify a valid feature;

(f) subdividing the gray level histogram into an upper histogram and a lower histogram using the entropically selected threshold gray level as defined in step (c) as an upper delimiter and a lower delimiter; and (g) recursively repeating steps (c)–(f) for each of the upper and lower histograms, wherein the repetition of step (c) selects a next successive entropic threshold gray level, thereby recursively partitioning the gray level histogram until a predetermined minimum number of new valid features is identified.

3. The method as claimed in claim 1, wherein the predetermined minimum number is zero.

4. The method as claimed in claim 1, wherein the selecting step includes the sub-steps of:

(i) sequentially partitioning the gray level histogram at each gray level into a first and a second partition, (ii) computing the entropy function for each partition, where the entropy function of the histogram is defined as the sum of the entropy functions for the first and second partitions, and (iii) selecting the threshold gray level such that the entropy function of the histogram is maximized.

5. A method of identifying at least one valid pigment element embedded in a polymer, the pigment element having at least one valid pigment element predetermined attribute value, comprising the steps of:

(a) generating an image of the pigment element and the polymer;

(b) generating a gray level histogram of the image, the gray level histogram having an entropy function;

(c) entropically selecting a threshold gray level such that the entropy function of the histogram is maximized;

(d) searching the image using the entropically selected threshold gray level for at least one candidate pigment element, wherein the candidate pigment element has at least one candidate pigment element attribute value;

(e) validating the candidate pigment element having the valid pigment element predetermined attribute value to identify a valid pigment element;

(f) subdividing the gray level histogram into an upper histogram and a lower histogram using the entropically selected threshold gray level as defined in step (c) as an upper delimiter and a lower delimiter; and (g) recursively repeating steps (c)–(f) for each of the upper and lower histograms, wherein the repetition of step (c) selects a next successive entropic threshold gray level, thereby recursively partitioning the gray level histogram until a predetermined minimum number of new valid elements is identified.

6. The method as claimed in claim 2, wherein the searching step includes the sub-steps of:

(i) scanning a portion of the image for at least one candidate object using the entropically selected threshold gray level, wherein the portion of the image comprises a plurality of pixels and each pixel has a gray level value less than the upper delimiter plus a predetermined increment, and (ii) tracing the candidate object having boundary gray levels determined by the entropically selected threshold gray level.

7. The method as claimed in claim 1, wherein the validating step includes the sub-steps of:

(i) calculating the candidate object attribute values, and (ii) comparing the candidate object attribute values to the valid object predetermined attribute values to validate candidate objects.

8. The method as claimed in claim 7, wherein the calculating sub-step further includes the sub-step of storing the candidate object attribute values.

9. The method as claimed in claim 1, wherein the validating step further includes the sub-step of checking whether the candidate objects are relatively lighter than the background.

10. The method as claimed in claim 1, wherein the validating step further includes the sub-steps of:

(i) inverting the image after step (a), and (ii) checking whether the candidate objects are relatively darker than the background.

11. The method as claimed in claim 1, wherein the validating step further includes the sub-step of checking for redundancies of the valid object and resolving the redundancies to prevent multiple identification of the valid object.

12. The method as claimed in claim 11, wherein the valid object comprises an homogeneous object and inhomogeneous object and further wherein the redundancy checking sub-step further includes the sub-steps of:

(i) comparing the areas of a plurality of valid objects and designating one of the valid objects as a large valid object and another of the valid objects as a small valid object, and (ii) determining whether the small valid object is contained within the large valid object as defined by the four extremum points of the large valid object.

13. The method as claimed in claim 12, wherein the redundancy checking sub-step is performed to resolve redundancies in the inhomogeneous objects and further includes the sub-step of deleting the large object when the large object contains more than one small object.

14. The method as claimed in claim 12, wherein the redundancy checking sub-step is performed to resolve redundancies in the inhomogeneous objects and further includes the sub-steps of:

(i) calculating the average edge contrast of the large and small valid objects, and (ii) deleting the object having the smaller edge contrast when the large valid object contains only one small valid object.

15. The method as claimed in claim 12, wherein the redundancy checking sub-step is performed to resolve redundancies in the homogeneous objects and further includes the sub-steps of:

(i) calculating the average edge contrast of the large and small valid objects, and (ii) deleting the large object where the average edge contrast of the large object is less than the average edge contrast of the small object and is less than a predetermined minimum edge contrast.

16. The method as claimed in claim 12, wherein the redundancy checking sub-step is performed to resolve redundancies in the homogeneous objects and further includes the sub-steps of:

(i) calculating the edge contrast of the large and small valid objects, and (ii) deleting the small valid object where the average edge contrast of the large valid object is greater than the average edge contrast of the small valid object and is greater than a predetermined minimum edge contrast.

17. The method as claimed in claim 1, further including the step of performing a final check for redundancies of the valid object and resolving the redundancies to prevent multiple identification of the valid object.

18. The method as claimed in claim 17, wherein the valid objects comprise a plurality of homogeneous objects or a plurality of inhomogeneous objects and further wherein the final redundancy checking step further includes the sub-steps of:

(i) comparing the areas of a plurality of valid objects and designating one of the valid objects as a large valid object and the other of the valid objects as a small valid object, and (ii) deleting the large valid object when the small valid object and the large valid object overlap.

19. The method as claimed in claim 1, further including the step of filtering the image after step (e), and wherein the valid object comprises a homogenous valid object or an inhomogeneous valid object.

20. The method as claimed in claim 1, further including the step of filtering the image after step (g) and wherein the valid object comprises a homogeneous valid object or an inhomogeneous valid object.

21. The method as claimed in claim 20, wherein the filtering step includes the sub-step of deleting the inhomogeneous valid object if both of the following conditions are met:
   (i) the inhomogeneous valid object has an area less than a predetermined minimum area,
   (ii) the inhomogeneous valid object is located within a predetermined minimum pixel distance from the edge of the image boundary.

22. The method as claimed in claim 20, wherein the filtering step includes the sub-step of determining when the number of inhomogeneous valid objects retained after the final redundancy check is performed is greater than or equal to a predetermined maximum number.

23. The method as claimed in claim 22, wherein the filtering step further includes the sub-step of deleting the inhomogeneous valid object if:
   (i) the inhomogeneous valid object was never contained in another valid object,
   (ii) the inhomogeneous valid object has an area less than a predetermined minimum area, and
   (iii) at least one of the following conditions is met:
      (A) the inhomogeneous valid object is located outside a predetermined minimum pixel distance from the edge of the image boundary, and
      (B) the inhomogeneous valid object has an area greater than or equal to a predetermined minimum area.

24. The method as claimed in claim 22, wherein the filtering step further includes the sub-step of deleting the inhomogeneous valid object if:
   (i) the inhomogeneous valid object was never contained in another valid object,
   (ii) the inhomogeneous valid object has an area greater than or equal to a predetermined minimum area,
   (iii) both of the following conditions are met:
      (A) the inhomogeneous object has an edge contrast less than a predetermined minimum edge contrast, and
      (B) the inhomogeneous object has a center of mass gray level less than the entropically selected threshold gray level for the lower histogram of step (f), and
   (iv) at least one of the following conditions is met:
      (A) the inhomogeneous valid object is located outside a predetermined minimum pixel distance from the edge of the image boundary, and
      (B) the inhomogeneous valid object has an area greater than or equal to a predetermined minimum area.

25. The method as claimed in claim 20, wherein the filtering step includes the sub-step of determining when the number of inhomogeneous valid objects retained after the final redundancy check is performed is greater than a predetermined minimum number and less than a predetermined maximum number.

26. The method as claimed in claim 25 wherein the filtering step includes the sub-step of deleting the inhomogeneous valid object if:
   (i) the inhomogeneous object was never contained within another valid object,
   (ii) the inhomogeneous object area is less than a predetermined area, and
   (iii) at least one of the following conditions is met:
      (A) the inhomogeneous valid object is located outside a predetermined minimum pixel distance from the edge of the image boundary, and
      (B) the inhomogeneous valid object has an area greater than or equal to a predetermined minimum area.

27. The method as claimed in claim 25, wherein the filtering step includes the sub-step of deleting the inhomogeneous valid object if:
   (i) the inhomogeneous valid object was previously contained in another valid object:
   (ii) all of the following conditions are met:
      (A) the inhomogeneous valid object edge contrast is less than a predetermined minimum edge contrast,
      (B) the inhomogeneous valid object center of mass gray level is less than the entropically selected threshold gray level as defined in step (c), and
      (C) the inhomogeneous valid object area is less than or equal to a predetermined minimum area, and
   (iii) at least one of the following conditions is met:
      (A) the inhomogeneous valid object is located outside a predetermined minimum pixel distance from the edge of the image boundary, and
      (B) the inhomogeneous valid object has an area greater than or equal to a predetermined minimum area.

28. The method as claimed in claim 25, wherein the filtering step includes the sub-step of deleting the inhomogeneous valid object if:
   (i) the inhomogeneous valid object was never contained in another valid object,
   (ii) the inhomogeneous valid object area is greater than or equal to a predetermined minimum area,
   (iii) both of the following conditions are met:
      (A) the inhomogeneous valid object edge contrast is less than a predetermined minimum edge contrast, and
      (B) the inhomogeneous object center of mass gray level is less than the entropically selected threshold gray level as defined in step (c), and
   (iv) at least one of the following conditions is met:
      (A) the inhomogeneous valid object is located outside a predetermined minimum pixel distance from the edge of the image boundary, and
      (B) the inhomogeneous valid object has an area greater than or equal to a predetermined minimum area.

29. The method as claimed in claim 20, wherein the filtering step includes the sub-step of determining when the number of inhomogeneous valid objects retained after the final redundancy check is performed is less than or equal to a predetermined minimum number.

30. The method as claimed in claim 29, wherein the filtering step includes the sub-step of deleting the inhomogeneous valid object if:
   (i) the object was never contained in another valid object,
   (ii) the object area is less than a predetermined minimum area, and
   (iii) at least one of the following conditions is met:
      (A) the inhomogeneous valid object is located outside a predetermined minimum pixel distance from the edge of the image boundary, and
      (B) the inhomogeneous valid object has an area greater than or equal to a predetermined minimum area.

31. The method as claimed in claim 29, wherein the filtering step includes the sub-step of deleting the inhomogeneous valid object if:

(i) the inhomogeneous valid object was never contained in another valid object, (ii) the inhomogeneous valid object area is greater than or equal to a predetermined minimum area, (iii) both of the following conditions are met:
 (A) the inhomogeneous valid object edge contrast is less than a predetermined minimum edge contrast, and
 (B) the inhomogeneous valid object area is greater than a predetermined minimum area and less than a predetermined maximum area, and (iv) at least one of the following conditions is met:
 (A) the inhomogeneous valid object is located outside a predetermined minimum pixel distance from the edge of the image boundary, and
 (B) the inhomogeneous valid object has an area greater than or equal to a predetermined minimum area.

32. The method as claimed in claim 29, wherein the filtering step includes the sub-step of deleting the inhomogeneous valid object if:

(i) the inhomogeneous valid object was previously contained in another valid object, (ii) both of the following conditions are met.
 (A) the inhomogeneous valid object center of mass gray level is less than the entropically selected threshold gray level of step (c),
 (B) the inhomogeneous object area is greater than a predetermined minimum area, and
 (c) the inhomogeneous object area is greater than or equal to a predetermined maximum area, (iii) at least one of the following conditions is met:
 (A) the inhomogeneous valid object is located outside a predetermined minimum pixel distance from the edge of the image boundary, and
 (B) the inhomogeneous valid object has an area greater than or equal to a predetermined minimum area.

33. The method as claimed in claim 29, wherein the filtering step includes the sub-step of deleting the inhomogeneous valid object if:

(i) the inhomogeneous valid object was previously contained within another valid object, (ii) at least one of the following conditions is met:
 (A) the inhomogeneous valid object center of mass gray level is greater than or equal to the entropically selected threshold gray level as defined in step (c),
 (B) the object area is less than or equal to a predetermined minimum area, and
 (C) the inhomogeneous object area is greater than or equal to a predetermined maximum area, (iii) the inhomogeneous object center of mass gray level is less than the entropically selected threshold gray level for the lower histogram of step (f), and (iv) at least one of the following conditions is met:
 (A) the inhomogeneous valid object is located outside a predetermined minimum pixel distance from the edge of the image boundary, and
 (B) the inhomogeneous valid object has an area greater than or equal to a predetermined minimum area.

34. The method as claimed in claim 20, wherein the filtering step includes the sub-step of deleting the homogenous valid object if both of the following conditions are met:

(i) the homogenous valid object is located within a predetermined minimum pixel distance from the edge of the image boundary, and (ii) the homogeneous valid object has an area less than a predetermined minimum area.

35. The method as claimed in claim 20, wherein the filtering step includes the sub-step of deleting the homogeneous valid object if:

(i) the homogeneous valid object has an area smaller than a predetermined minimum area, and (ii) at least one of the following conditions is met:
 (A) the homogeneous valid object is located outside a predetermined minimum pixel distance from the edge of the image boundary, and
 (B) the homogenous valid object area is greater than or equal to a predetermined minimum area.

36. The method as claimed in claim 20, wherein the filtering step includes the sub-step of deleting the homogeneous valid object if:

(i) the homogeneous valid object has an area greater than or equal to a predetermined minimum area, and (ii) at least one of the following conditions is met:
 (A) the homogenous object is located outside a predetermined minimum pixel distance from the edge of the image boundary, and
 (B) the homogenous object area is greater than or equal to a predetermined minimum area, and (iii) both of the following conditions are met:
 (A) the homogeneous object edge contrast is less than a predetermined minimum edge contrast, and
 (B) the homogeneous object area is less than a predetermined minimum area.

37. The method as claimed in claim 20, wherein the filtering step includes the sub-step of deleting the homogeneous valid object if:

(i) the homogeneous valid object has an area greater than or equal to a predetermined minimum area, (ii) at least one of the following conditions is met:
 (A) the homogenous object is located outside a predetermined minimum pixel distance from the edge of the image boundary, and
 (B) the homogenous object area is greater than or equal to a predetermined minimum area, (iii) at least one of the following conditions is met:
 (A) the homogeneous object edge contrast is greater than or equal to a predetermined minimum edge contrast, and
 (B) the homogenous object area is greater than or equal to a predetermined maximum area, and (iv) both of the following conditions are met:
 (A) the homogenous object center of mass gray level is less than the entropically selected threshold gray level of step (c), and
 (B) the homogeneous object edge contrast is less than a predetermined minimum edge contrast.

38. The method as claimed in claim 20, wherein the filtering step includes the sub-step of deleting the homogeneous valid object if:

(i) the homogeneous valid object has an area greater than or equal to a predetermined minimum area, (ii) at least one of the following conditions is met:
 (A) the homogenous object is located outside a predetermined minimum pixel distance from the edge of the image boundary, and
 (B) the homogenous object area is greater than or equal to a predetermined minimum area, (iii) at least one of the following conditions is met:
 (A) the homogeneous object edge contrast is greater than or equal to a predetermined minimum edge contrast, and (B) the homogenous object area is greater than or equal to a predetermined maximum area, (iv) at least one of the following conditions is met:
  (A) the homogenous object center of mass gray level is greater than or equal to the entropically selected threshold gray level of step (c), and
  (B) the homogeneous object edge contrast is greater than or equal to a predetermined minimum edge contrast, and (v) both of the following conditions are met:
  (A) the homogenous object shape factor is less than a predetermined shape factor, and
  (B) the homogeneous object edge contrast is less than a predetermined minimum edge contrast.

39. The method as claimed in claim 20, wherein the filtering step includes the sub-step of deleting the homogeneous valid object if:

(i) the homogeneous valid object has an area greater than or equal to a predetermined minimum area, (ii) at least one of the following conditions is met:
  (A) the homogenous object is located outside a predetermined minimum pixel distance from the edge of the image boundary, and
  (B) the homogenous object area is greater than or equal to a predetermined minimum area, (iii) at least one of the following conditions is met:
  (A) the homogeneous object edge contrast is greater than or equal to a predetermined minimum edge contrast, and
  (B) the homogeneous object area is greater than or equal to a predetermined maximum area, (iv) at least one of the following conditions is met:
  (A) the homogeneous object center of mass gray level is greater than or equal to the entropically selected threshold gray level of step (c),
  (B) the homogeneous object edge contrast is greater than or equal to a predetermined minimum edge contrast, and (v) at least one of the following conditions is met:
  (A) the homogeneous object shape factor is greater than or equal to a predetermined shape factor, and
  (B) the homogeneous object edge contrast is greater than or equal to a predetermined minimum edge contrast, and (vi) the homogenous object edge contrast is less than a predetermined absolute minimum edge contrast.

40. The method as claimed in claim 1, wherein the image comprises at least one isolated object identified by the degree of circularity thereof and at least one candidate clump of valid objects, the candidate clump having an area greater than the mean area of the isolated valid objects and a shape factor less than a predetermined clump shape factor, further including the steps of:

(i) identifying the candidate clump, and (ii) determining the number of valid objects in the candidate clump.

41. The method as claimed in claim 40, wherein the determining sub-step includes the sub-steps of:

(i) creating a distance buffer, wherein the distance buffer comprises a plurality of distance values representing the distance of each perimeter point of the candidate clump to the center of mass of the candidate clump, the distance values including a plurality of valleys and peaks;

(ii) searching the buffer for a first valley using a hysteresis-based, valley-finding algorithm, (iii) shifting the distance buffer by a distance equal to the distance to the first valley from a first distance value as defined by a first predetermined point on the perimeter of the candidate clump, and (iv) counting the number of peaks in the shifted buffer using a hysteresis-based, peak-finding algorithm to calculate a first value for the number of valid objects in the clump.

42. The method as claimed in claim 41, wherein the counting sub-step further includes the sub-step of dividing the number of peaks by two to obtain a result, rounding the result up to the next higher integer and adding one to the next higher integer.

43. The method as claimed in claims 41, wherein the determining step further includes the sub-step of calculating the area of the candidate clump and dividing the area of the candidate clump by the mean area of isolated valid object to calculate a second value for the number of valid objects in the clump.

44. The method as claimed in claims 43, wherein the determining step further includes the sub-step of calculating the area of the candidate clump and dividing the area of the candidate clump by the mean area of the isolated valid objects minus one-half the standard deviation of the mean area of the isolated valid object to calculate a third value for the number of valid objects in the clump.

45. The method as claimed in claim 44, wherein the determining step further includes the sub-steps of:

(i) computing the average value of the second and third values, (ii) comparing the average value to the first value, and (iii) selecting the average value as the number of valid objects if the average value is greater than the first value.

46. The method as claimed in claim 44, wherein the determining step further includes the sub-steps of:

(i) computing the average value of the second and third values, (ii) comparing the average value to the first value, and (iii) selecting the first value as the number of valid objects if the average value is less than or equal to the first value.

47. The method as claimed in claim 44, wherein the determining step further includes the sub-steps of:

(i) computing the average value of the second and third values, (ii) comparing the average value to the first value, and (iii) selecting the average value as the number of valid objects if the first value is greater than three.

48. The method as claimed in claim 44, wherein the determining step further includes the sub-steps of:

(i) computing the average value of the second and third values, (ii) comparing the average value to the first value, and (iii) selecting the first value as the number of valid objects if the average value is less than or equal to three.

49. The method as claimed in 45 or 47, further including the step of tracing the clump in a singular color indicative of the number of valid objects in the candidate clump.

50. The method as claimed in 46 or 48, further including the step of tracing the clump in a color plurality of colors indicative of the number of valid objects in the candidate clump, wherein all the points of the perimeter of the clump of valid objects between the adjacent valleys on the distance buffer are traced in the same color.

51. A system for identifying at least one valid object having at least one predetermined attribute value in a background, comprising:
(a) means for generating an image of the object and the background; and
(b) computer means including:
(i) a driver for storing the definition of the valid object, and
(ii) an entropic kernel for:
(A) generating a gray level histogram of the image,
(B) entropically selecting a threshold gray level such that the entropy function of the histogram is maximized,
(C) searching the image using the entropically selected threshold gray level for at least one candidate object, wherein the candidate object has at least one candidate object attribute value,
(D) validating the candidate object having the valid object predetermined attribute value to identify a valid object,
(E) subdividing the gray level histogram into an upper histogram and a lower histogram using the entropic threshold gray level as defined by step (B) as an upper delimiter and a lower delimiter, and
(F) recursively repeating steps (B)– (E) for each of the upper and lower histograms, wherein the repetition of step (B) selects a next successive entropic threshold gray level, thereby recursively partitioning the gray level histogram until a predetermined minimum number of new valid objects is identified.

52. The system as claimed in claim 51, wherein the image generating means comprises a camera.

53. The system as claimed in claim 51, wherein the computer means further includes a frame grabber for storing the image.

54. The system as claimed in claim 51, wherein the computer means further includes a video digitizer for 55. The system as claimed in claim 51, wherein the computer means further includes a post-scan filter for removing redundancies in overlapping valid objects.

56. A method of counting at least one valid biological colony having at least one predetermined attribute value in a background, comprising the steps of:
(a) generating an image of the colony and the background;
(b) generating a gray level histogram of the image, the gray level histogram having an entropy function;
(c) entropically selecting a threshold gray level such that the entropy function of the histogram is maximized;
(d) searching the image using the entropically selected threshold gray level for at least one candidate colony, wherein the candidate colony has at least one candidate colony attribute value;
(e) validating the candidate colony having the valid colony predetermined attribute value to identify a valid colony;
(f) subdividing the gray level histogram into an upper histogram and a lower histogram using the entropically selected threshold gray level as defined in step (c) as an upper delimiter and a lower delimiter; and
(g) recursively repeating steps (c)–(f) for each of the upper and lower histograms, wherein the repetition of step (c) selects a next successive entropic threshold gray level, thereby recursively partitioning the gray level histogram until a predetermined minimum number of new valid colonies is counted.

57. The method as claimed in claim 56, wherein the selecting step includes the sub-steps of:
(i) sequentially partitioning the gray level histogram at each gray level into a first and a second partition,
(ii) computing the entropy function for each partition, where the entropy function of the histogram is defined as the sum of the entropy functions for the first and second partitions, and
(iii) selecting a threshold gray level such that the entropy function of the histogram is maximized.

58. The method as claimed in claim 56, wherein the searching step includes the sub-steps of:
(i) scanning the image for at least one candidate colony using the entropically selected threshold gray level, and
(ii) tracing the candidate colony having at least one boundary gray level determined by the entropically selected threshold gray level.

59. The method as claimed in claim 56, wherein the validating step includes the sub-steps of:
(i) calculating the candidate colony attribute values, and
(ii) comparing the candidate colony attribute values to the valid colony predetermined attribute values to validate the candidate colony.

60. The method as claimed in claim 56, wherein the validating step further includes the sub-step of checking for redundancies of the validated colony and resolving the redundancies to prevent multiple identification of the valid colony.

61. The method as claimed in claim 56, further including the step of performing a final check for redundancies of the valid object and resolving the redundancies to prevent multiple identification of the valid object.

62. The method as claimed in claim 56, further including the step of filtering the image after step g.

63. The method as claimed in claim 56, further including the step of determining the number of valid colonies in a candidate clump, wherein the candidate clump comprises a plurality of valid colonies.

64. A method of identifying at least one valid object having at least one predetermined attribute value in a background, comprising the steps of:
(a) generating an image of the object and the background;
(b) generating a histogram representative of the entire image, the gray level histogram having an entropy function;
(c) generating a plurality of gray level upper and lower histograms of the image from the histogram, each gray level upper and lower histogram having a respective entropy function;
(d) automatically selecting a threshold gray level value for each upper and lower histogram such that the entropy function of each histogram is maximized;
(e) searching the image using the automatically selected threshold gray level value for each upper and lower histogram for at least one candidate object, wherein the candidate object has at least one candidate object attribute value; and
(f) validating the candidate object having the valid object predetermined attribute value to identify the valid object.

* * * * *